United States Patent [19]

Gort et al.

[11] 4,108,539

[45] Aug. 22, 1978

[54] REFLECTING LENS SYSTEM

[75] Inventors: Alfred Frans Gort, Loveland, Colo.; Charles E. Moore, Rochester, N.Y.

[73] Assignee: Hewlett-Packard Company, Palo Alto, Calif.

[21] Appl. No.: 742,938

[22] Filed: Nov. 18, 1976

[51] Int. Cl.[2] .......................................... G02B 17/08
[52] U.S. Cl. .................................... 350/201; 350/27; 350/29
[58] Field of Search ................. 33/1 T, 281, 283, 284; 250/231 SE; 356/4, 5, 28, 141, 147, 152, 169, 170, 172, 120, 148, 149, 249; 324/78 R, 160, 175; 350/27, 29, 199–201

[56] References Cited

FOREIGN PATENT DOCUMENTS

| 724,026 | 8/1942 | Fed. Rep. of Germany | 350/201 |
| 2,500,070 | 10/1975 | Fed. Rep. of Germany | 350/199 |
| 824,859 | 1/1952 | Fed. Rep. of Germany | 350/201 |
| 960,680 | 10/1956 | Fed. Rep. of Germany | 350/199 |

Primary Examiner—Paul A. Sacher

Attorney, Agent, or Firm—Michael L. Sherrard

[57] ABSTRACT

A tacheometer utilizes a gallium arsenide laser diode in a phase shifting distance encoder, a sinusoidal interpolator in a phase shifting shaft angle encoder, a mercury pool in a phase shifting two axis off-level encoder, a shared phase to digital decoder and a digital processor, to measure angles and distances corrected for off-level, speed of light variations, refraction and the earth's curvature. A reflecting telescope is coupled to the shaft angle encoder and is incorporated in both the phase shifting distance encoder and the alignment system. The reflecting telescope has a doublet objective lens with an embedded secondary reflective surface facing a primary mangin mirror. A biconcave element of the doublet objective lens also functions as a corrector for the secondary reflective surface. A compact objective lens system is thus realized, having minimal interference between the corrector for the secondary reflective surface and the optical path through the doublet objective lens.

4 Claims, 29 Drawing Figures

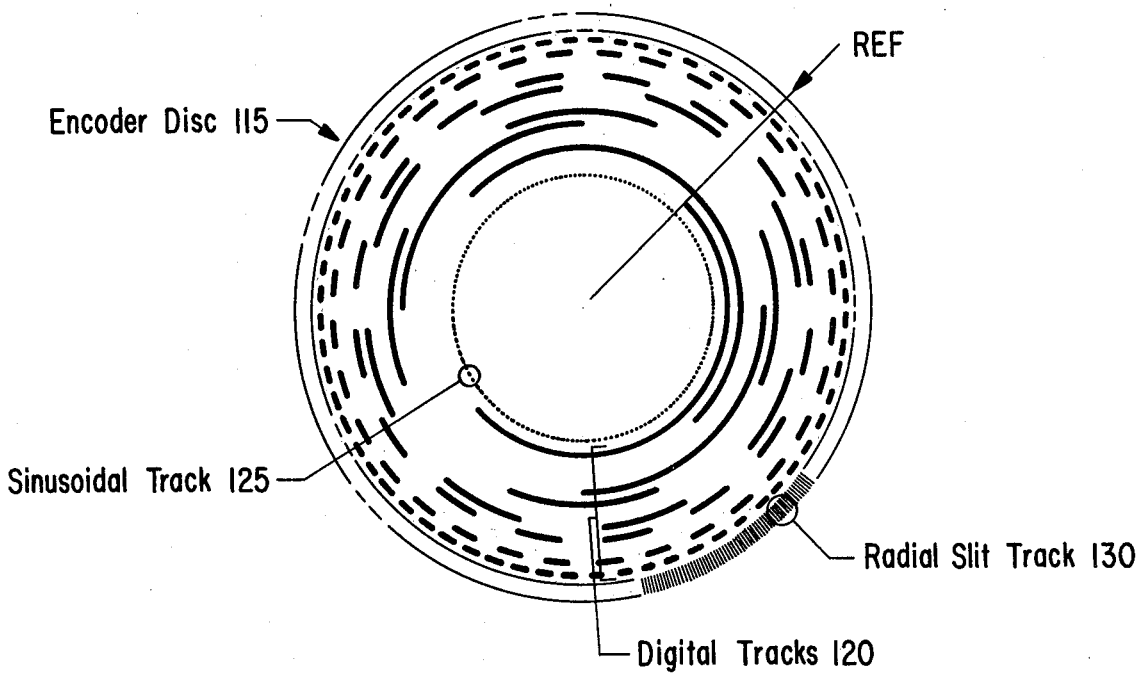
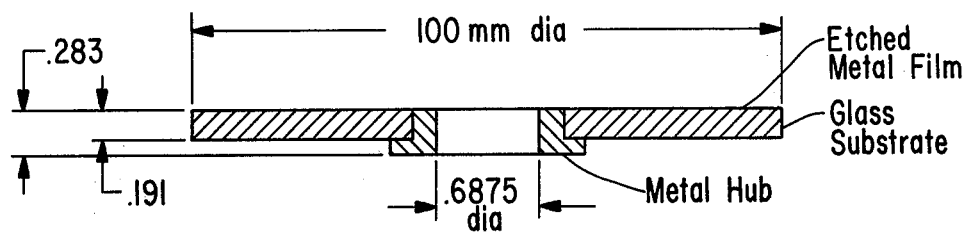
Note 1  Blank areas are metalized. Black areas are transparent.
Note 2  RADIAL SLIT TRACK is a bar pattern with 4096 bars and spaces of equal width and a 3mm radial height.
Note 3  SINUSOIDAL TRACK is a transparent track sinusoidally modulated in width. The pattern is repeated 128 times on a diameter of 44.0 mm.
Note 4  8 DIGITAL TRACKS incorporate a GRAY-CODE.
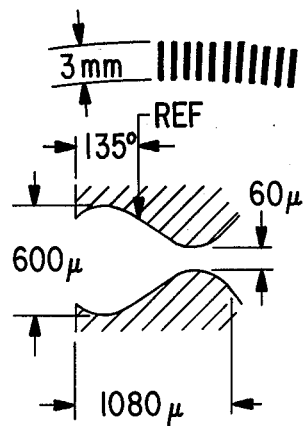
FIG 4

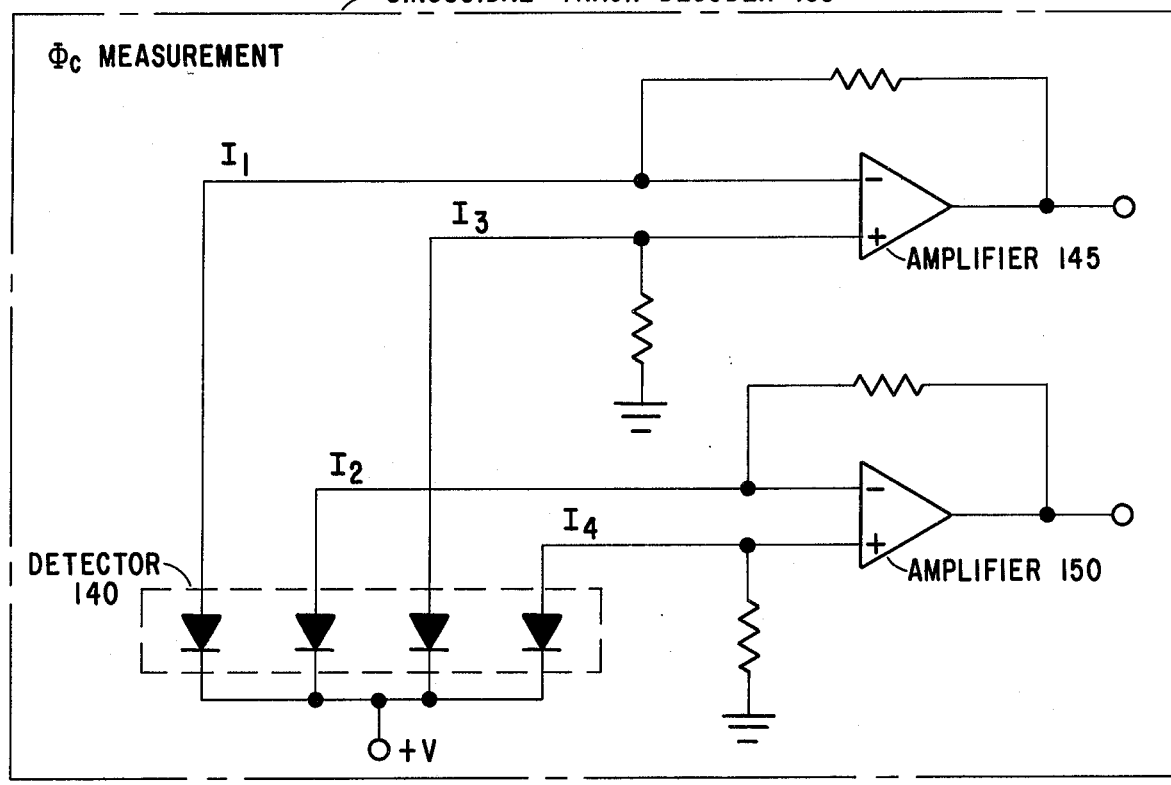
FIG 8
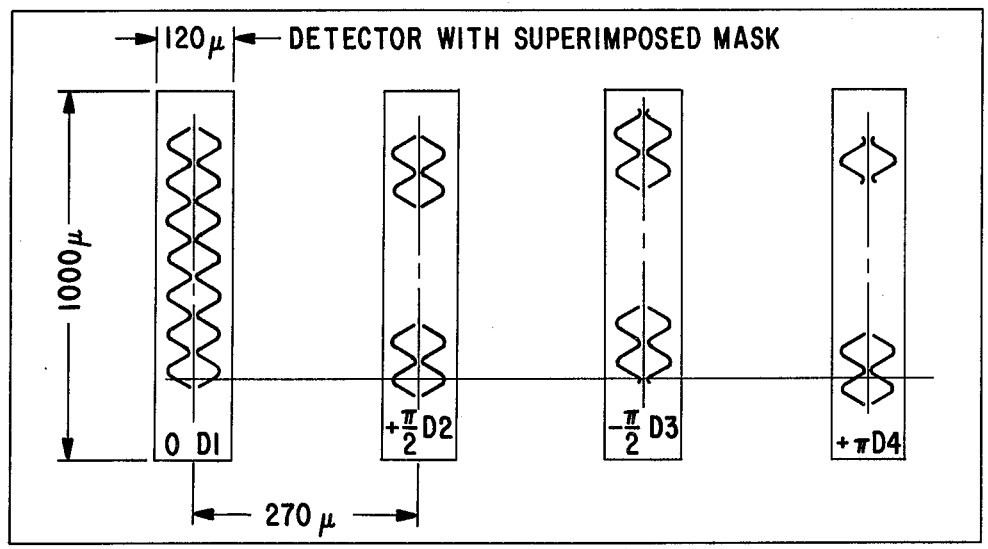
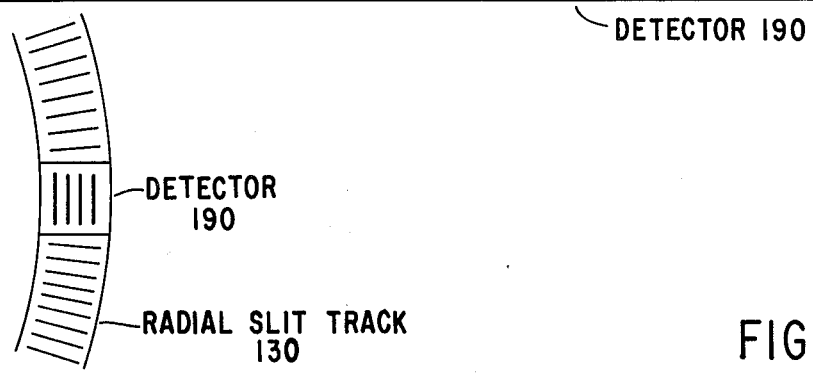
FIG 10

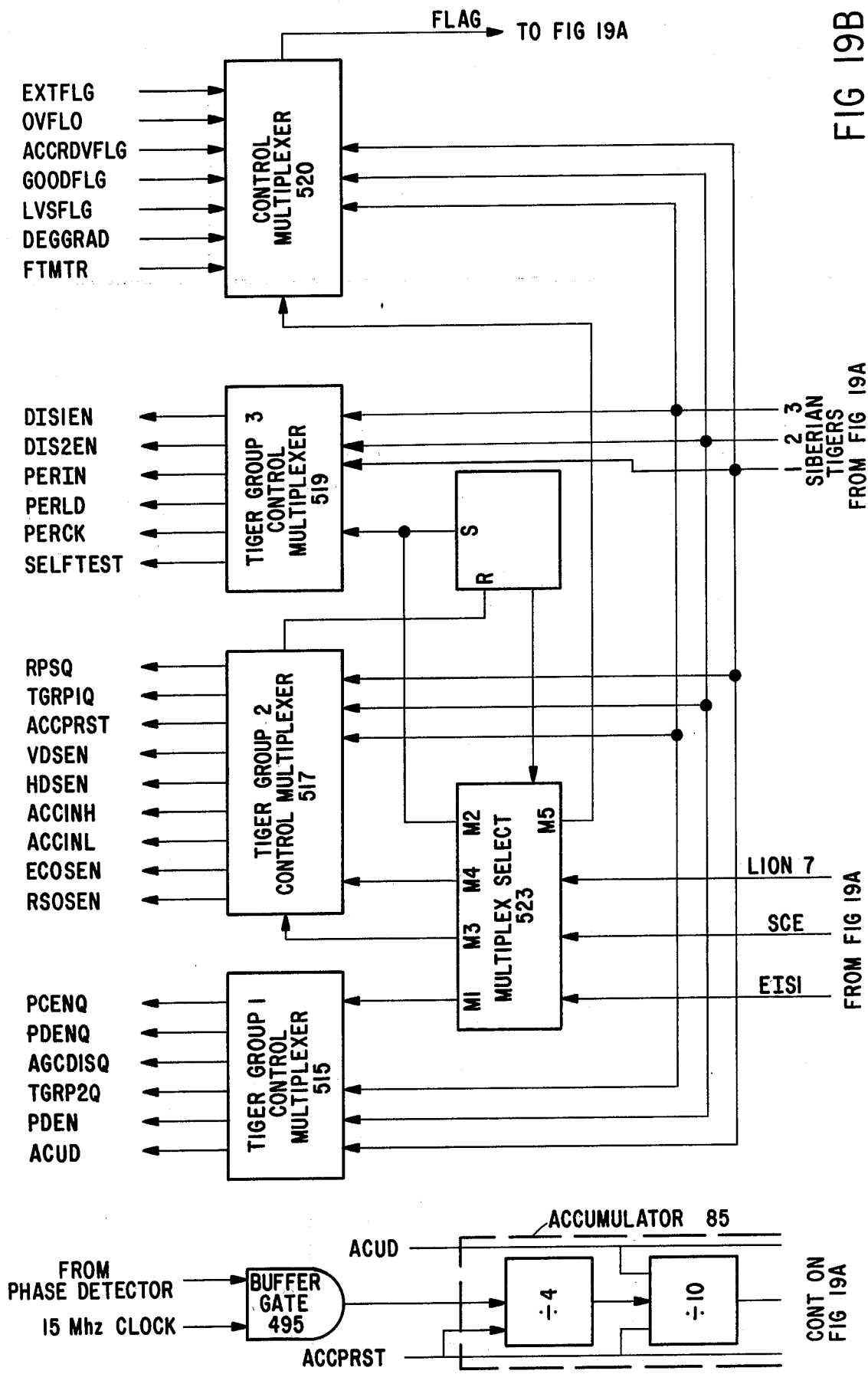

| POWER SUPPLY VOLTAGES AND CURRENTS | |
|---|---|
| + 3.7 V | 100 mA |
| + 8.0 V | 40 mA |
| −13.0 V | 10 mA |
| −200 V | 0.5 mA |

TOTAL CONSUMPTION: 920 mW

REFLECTING LENS SYSTEM

TABLE OF CONTENTS

Reference to Related Patents
Background and Summary
Description of the Drawings
System Architecture
Keyboard
Theodolite
Level Sensor
Distance Module
Balance and Beam Break Circuitry
Phase Detector
Processor and Display
Accumulator and Input/Output Module
Optics
Detailed Sequences

REFERENCE TO RELATED PATENTS

This application is related to the subject matter of U.S. Pat. No. 3,619,058, entitled DISTANCE MEASURING APPARATUS issued Nov. 9, 1971 to William R. Hewlett and Gregory Justice and to the subject matter of U.S. Pat. No. 3,900,259, entitled TIME INTERVAL PHASE DETECTION IN DISTANCE MEASURING APPARATUS issued Aug. 19, 1975 to Claude M. Mott and Richard J. Clark.

The digital processing modules utilized in this application are related to the subject matter of U.S. Pat. No. 3,863,060, entitled GENERAL PURPOSE CALCULATOR WITH CAPABILITY FOR PERFORMING INTERDISCIPLINARY BUSINESS CALCULATIONS issued Jan. 18, 1975 to Frances Rode et al and to the subject matter of U.S. patent application entitled ADAPTABLE PROGRAMMED CALCULATOR HAVING PROVISION FOR PLUG-IN KEYBOARD AND MEMORY MODULES, filed Dec. 26, 1972 by Freddie W. Wenninger et al.

BACKGROUND AND SUMMARY

Tacheometers, the generic term for theodolite/distance measuring instrument combinations, are powerful surveying tools capable of measuring the angles and the distances between points. Typically, this is done by leveling the instrument, optically aligning a gimbaled telescopic sight upon a target, measuring the shaft angles of the sight once aligned, and measuring the distance between the instrument and the target. Shaft angles can be measured by graduated vernier techniques or by more advanced digital encoding techniques described in more detail in the section below entitled THEODOLITE. Techniques for referencing the instrument to level are also described therein. Techniques for measuring distances include parallax methods as well as phase shift techniques such as described in more detail in the section below entitled DISTANCE MODULE. The major drawback of the prior art in tacheometers has been that a small, lightweight, and highly accurate tacheometer has heretofore been unobtainable.

The present invention utilizes a sinusoidal signal interpolator technique to encode shaft angles and 2 axis level angles as phase shifted signals. The distance module similarly encodes distance as a phase shifted signal, allowing both angle and distance measurements to be decoded by a shared phase detector and accumulator. A processor and keyboard allow an operator to select desired measurement sequences and calculations, including the determination of angles and distances that are corrected for off-level conditions detected by the 2-axis level sensor, refraction, earth curvature, and a speed of light correction factor selected by the operator.

DESCRIPTION OF THE DRAWINGS

FIG. 4 is an illustration of the encoder disc used in the shaft angle encoders of the tacheometer of FIG. 1.

FIG. 8 is a detailed schematic of the sinusoidal track decoder.

FIG. 10 is an illustration of the radial slit track detectors of FIG. 5.

SYSTEM ARCHITECTURE

Figure 1:
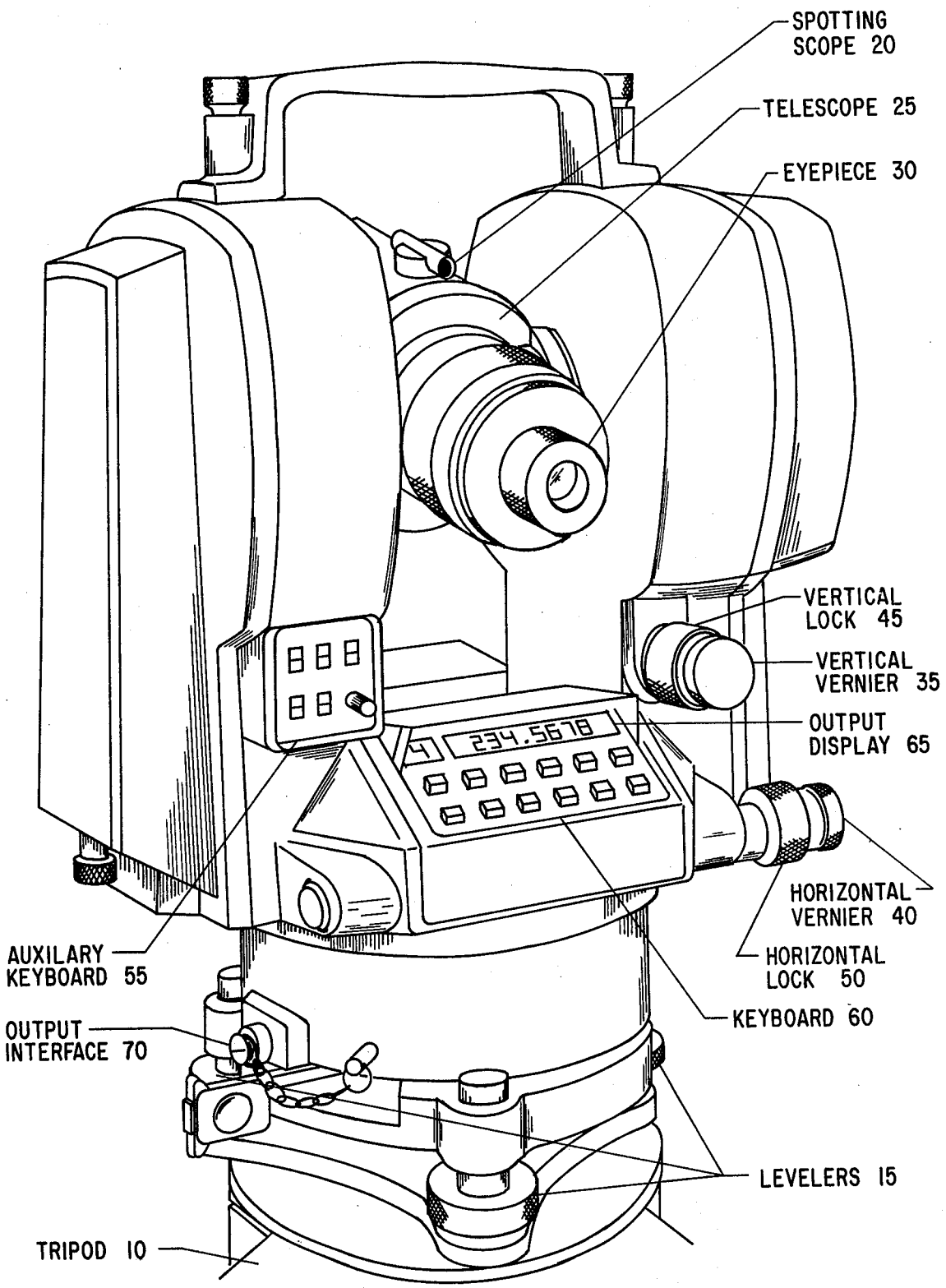
FIG. 1 is a prespective view of a tacheometer constructed in accordance with the preferred embodiment of the present invention.

A tacheometer constructed in accordance with the present invention is illustrated in FIG. 1. The tacheometer is mounted upon a tripod 10 and can be leveled thereon by levelers 15. The operator first sights the target (a cube reflector) through spotting scope 20 and then sights the telescope 25 upon the target through eyepiece 30. Vernier alignment can be made with the vertical vernier 35 and the horizontal vernier 40, and locked in place with vertical and horizontal locks 45 and 50. The operator activates the instrument by switching on a power switch from the auxiliary keyboard 55 and selects the desired measurement sequences via the keyboard 60. The outputs are then displayed on output display 65.

Figure 2:
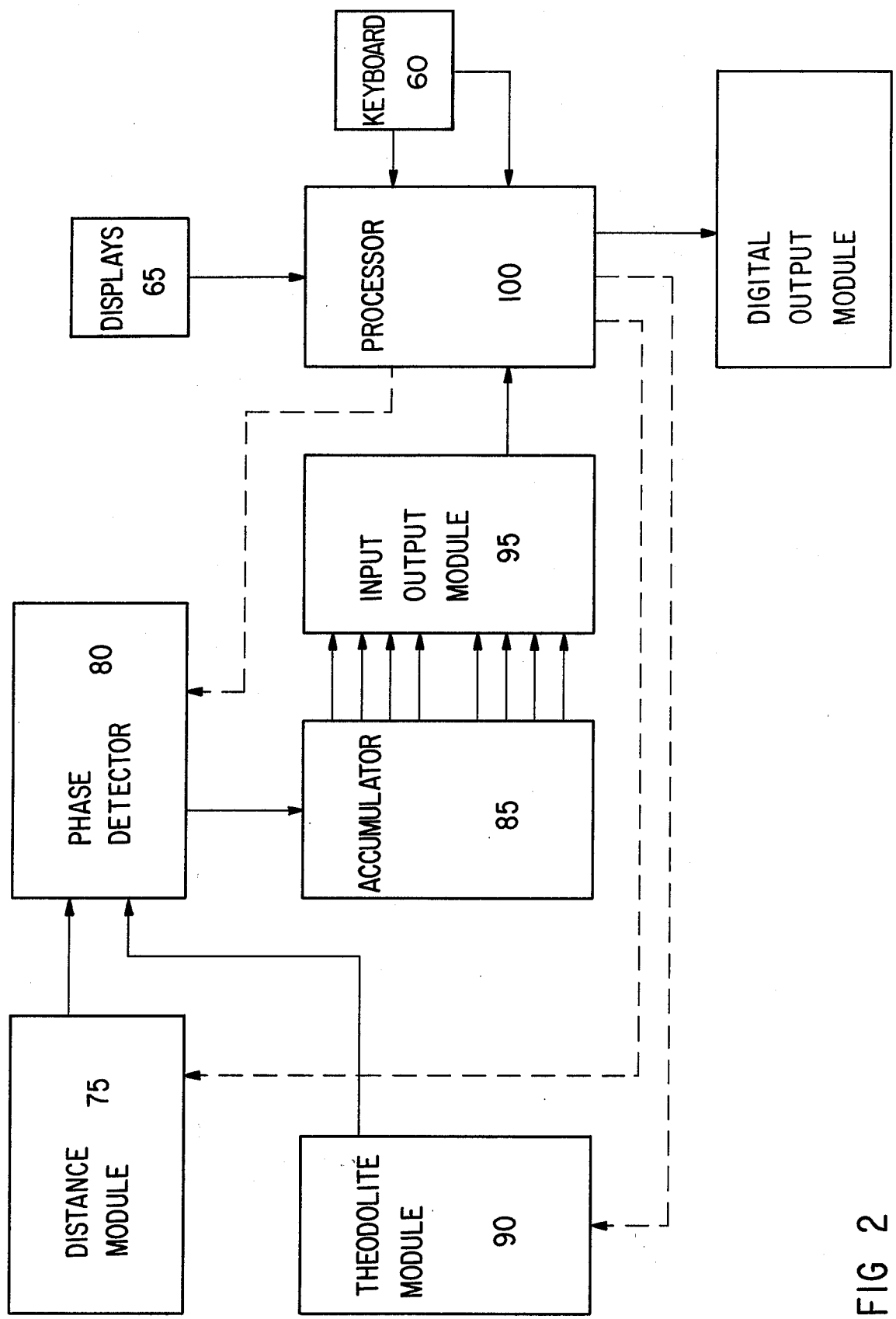
FIG. 2 is a block diagram of the electronics within the tacheometer of FIG. 1.

A block diagram of the tacheometer electronics is shown in FIG. 2. The distance module 75 transmits a modulated light beam downrange to a cube reflector which reflects the beam back to the instrument. The phase shift between the transmitted and received beams is proportional to the distance between the reflector and and instrument. This phase difference is measured by the phase detector 80 and accumulator 85. Horizontal and vertical angles are measured by the theodolite module 90. Angles are encoded as phase shifts and also measured by the phase detector 80 and the accumulator 85. The input/output module 95 interfaces the processor 100 with the measurement modules. Measurement sequences are controlled, measurements are accepted, and logical flags are interrogated by the processor. Keyboard 60 provides a control interface with the processor 100 by which the operator may select various measurement sequences and processor calculations. The output appears on the display 65.

KEYBOARD

Figure 3:
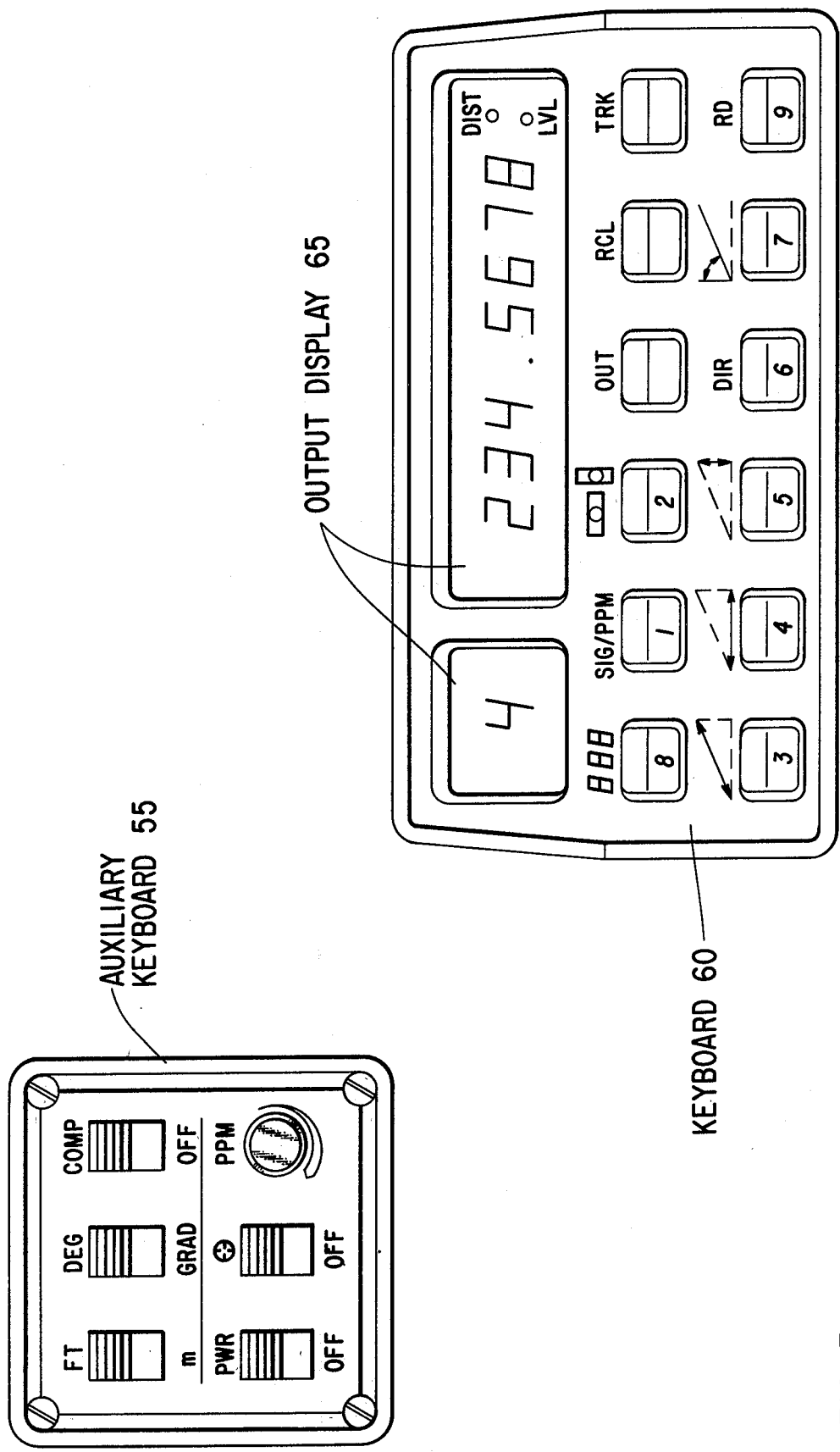
FIG. 3 is an illustration of the keyboards and display of the tacheometer of FIG. 1.

The tacheometer keyboard 60, the auxiliary keyboard 55, and the output display 65, are illustrated in FIG. 3. The tacheometer has two keyboards 60 and two output displays 65, on opposite sides of the instrument, with only one active pair at one time. The auxiliary keyboard 55 comprises switches for selecting an output display of distance converted to feet or meters and angles converted to degrees or grads. The "COMP" switch is used to selectively activate processor compensation of distances and angles for an off-level condition sensed by the 2 axis level sensor, described below in the section entitled LEVEL SENSOR. Power switches for the instrument and the telescope graticule illumination are on the second row of the auxiliary keyboard 55 as is the "PPM" dial for selecting a parts-per-million correction factor to compensate for changes in the velocity of light caused by changes in the index of refraction of air due to variations in the air temperature and pressure. The PPM potentiometer is shown coupled to the environmental correction multistable multivibrator (one shot) 455 in FIG. 17.

Refer now to the 12 key keyboard 60, in FIG. 3. The "DIR" key (#6) measures the angle of the telescope 25 with respect to the horizontal circle ($\sigma$) in the theodolite module 90 in FIG. 2. If the COMP switch on the auxiliary keyboard 55 is activated, the processor will correct the reading for out of level. The "RD" key (#9) measures the relative direction by subtracting the last DIR reading from the current reading. This allows an operator to sight on a reference point, push the DIR key, then sight on a second point, push the RD key, and obtain the horizontal angle therebetween. Key number 7 measures the vertical angle ($\phi$) in a manner similar to the function of the DIR key. The vertical measurement is also corrected for an off-level condition when the COMP switch is on. Key number 3 measures the slope distance. The distance module 75 sequences through 3 modulation frequencies. Outputs from these are logically combined to give a readout in either feet or meters on the output display 65. Key number 4 measures the projected distance. The tacheometer measures the slope distance, the vertical angle ($\phi$), and the level angles if the COMP switch in on, then calculates the projected distance. Key number 5 is the elevation difference key. This key performs a sequence similar to the projected distance key but calculates the elevation difference. The projected distance key and the elevation key also correct for earth curvature and refraction. This is required because the gravity vector is not parallel for distant points. The track key "TRK" takes periodic readings from any of the numbered keys. For example, by pushing TRK, then key 3, the tacheometer will measure the slope distance about once a second so that a slowly moving target can be tracked. Key number 2 reads out both level angles simultaneously in either seconds or centicentigrads. Two three-digit numbers are displayed side by side. It is possible to very accurately level the instrument while tracking this function, or simply verify that the instrument is safely within its limits and let the tacheometer compensate internally for off-level condition. Key number one displays the signal strength, obtained from the AGC one shot 450 illustrated in FIG. 17 and discussed in the section entitled PHASE DETECTOR, and the PPM correction dialed in from the PPM control on the auxiliary keyboard 55, side by side. The PPM correction is adjusted by tracking this function while adjusting the PPM pot to obtain the desired correction. Key number 8 is a self-test selector. The tacheometer self checks a set of internal functions and displays all eights on the output display 65 if the test is completed satisfactorily. The basic functions, keys 1, 2, 3, 4, 5, 6, 7, and 9, have dedicated storage locations in memory where the last measurement is stored. For instance, pushing key 4 will measure the level angles, slope distance and vertical angle, then calculate projected distance and elevation difference. By now keying the recall key "RCL" followed by key 2, 3, 5, or 7, the component measurements used in the projected distance measurement can be recovered. The output key "OUT" is used to send the output to a peripheral device. An HP9815 calculator described in copending U.S. patent application Ser. No. 597,957 entitled PROGRAMMABLE CALCULATOR filed July 21, 1975 by Bradley W. Miller et al, can be interfaced with the output interface 70 shown in FIG. 1.

The output display 65 has two indicator lights on the right hand side of the display. The DIST light is on only if a signal is being returned to the distance module, indicating that a distance measurement is in progress. If too strong a signal is being received, the light will also fail to light, indicating to the operator the need to fit an attentuator cap over the reflector. The level sensor light (LVL) flashes if the instrument is outside the range limits of the level sensor and will be on continuously when within range. This light therefore functions as a pilot light also. The first digit of the display (the left hand display) displays the key number of the function processed when an output is displayed to identify the output.

THEODOLITE

Figure 5:
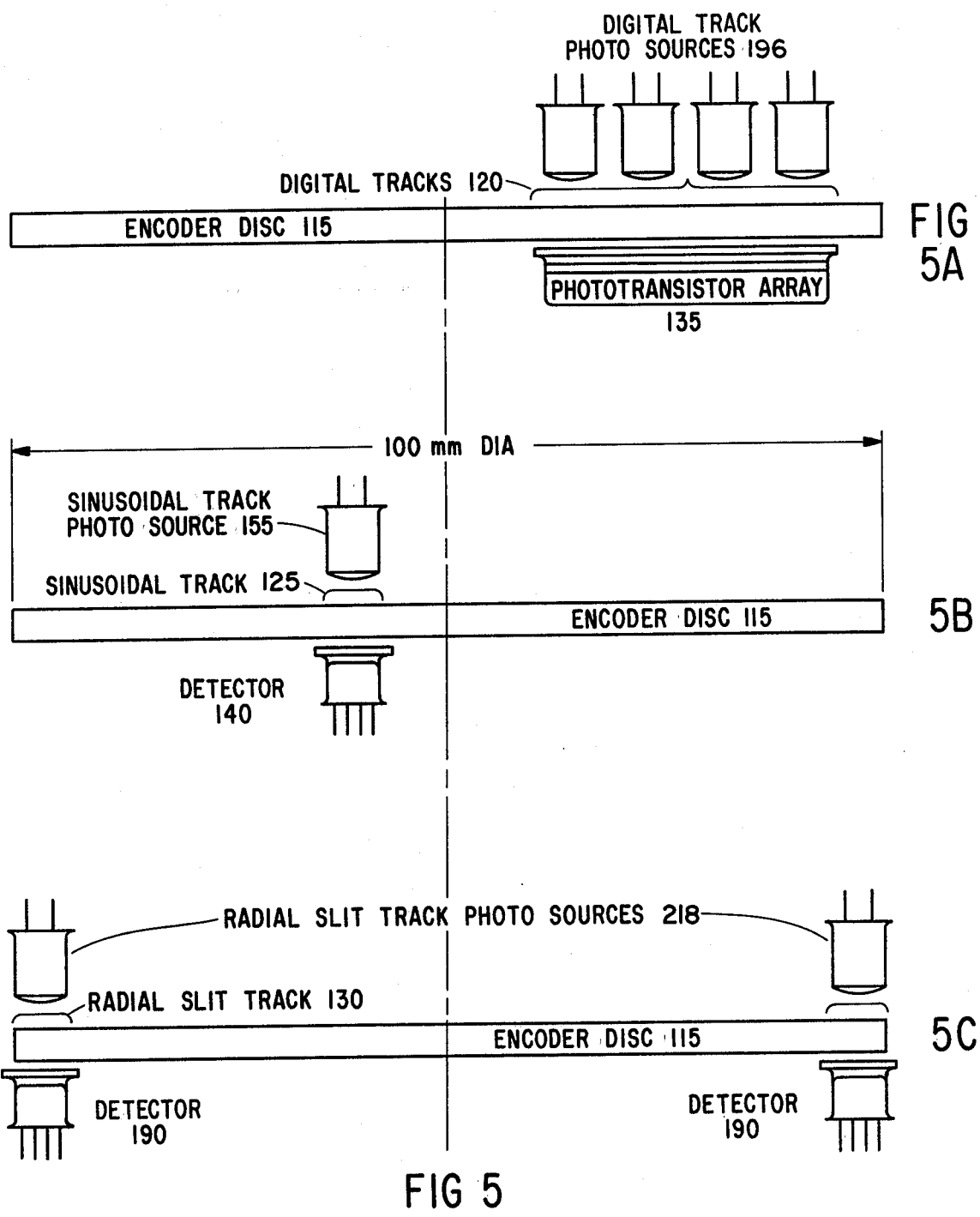
FIG. 5 is an optical layout of the encoder disc of FIG. 4.

The function of the Theodolite Module 90 of FIG. 2 of the present invention is to measure the vertical angle phi ($\phi$) and the horizontal angle theta ($\theta$) of the telescope 25 relative to the reference plane of the tacheometer. It is desirable to have a theodolite which is small in size, highly accurate and compatable with digital electronics. Previous theodolites, such as those described in U.S. Pat. No. 3,541,572 issued to V. G. Shults, Nov. 17, 1970 and U.S. Pat. No. 3,675,238 issued to Karl Heinz Butscher on July 4, 1972, are less than optimum solutions to these three requirements. Our theodolite uses two shaft angle encoders, one for the horizontal angle and one for the vertical angle, in combination with a 2 axis level sensor which is used to precisely determine the gravitationally defined level reference plane and to transform the vertical and horizontal measurements obtained from the vertical and horizontal shaft angle encoders to the gravitational plane. The two shaft angle encoders are identical in construction. Each consists of a flat transparent plate (the encoder disc) coated with a optically opaque metallic film defining a plurality of circular tracks thereupon, each track having predefined optical characteristics. The encoder disc 115 is illustrated in FIG. 4. There are three types of circular tracks upon the encoder disc 115; the digital tracks 120, the sinusoidal track 125, and the radial slit track 130. As illustrated in the FIGS. 5A, 5B, and 5C, light is emitted on one side of the encoder disc, transmitted through the circular tracks upon encoder disc 115, and detected upon the opposite side of encoder disc. The decoding of the signals transmitted through the digital tracks 120 gives a rough measurement of the angle to be measured. By logically combining this output with the output detected from the sinusoidal track and the radial slit track this angular measurement is interpolated in two stages to give a final angular resolution of less than 1 arc second.

The eight digital tracks 120 upon encoder disc 115 utilizes a Gray Code which is well known to persons skilled in the art of theodolites. This code is characterized by having only one transition per one bit of information. The use of eight separate photo-transistors, denoted as photo-transistor array 135 in FIG. 5A, produces a direct 8 bit Gray Code which can be directly interfaced with a conventional digital processor, giving an angular resolution of approximately 1.4°.

Figure 6:
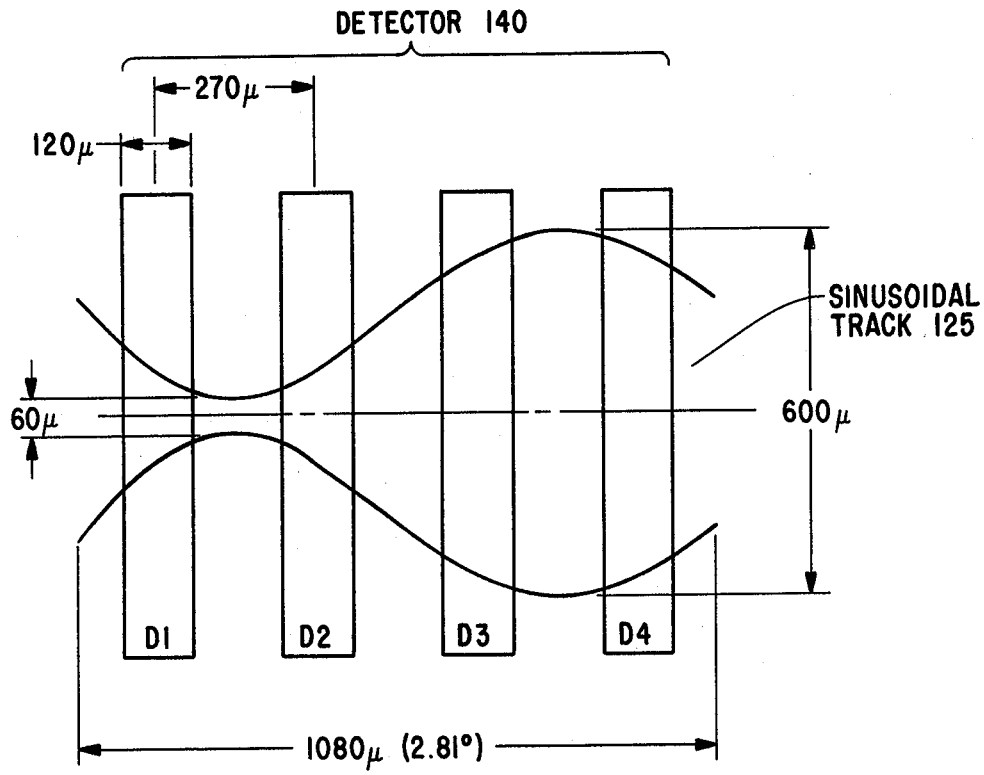
FIG. 6 is an illustration of the sinusoidal track and detector of the encoder disc of FIG. 4.

The sinusoidal track 125 (of FIG. 4) is a 128 period transparent track sinusoidally modulated in width. The detector 140 illustrated in FIG. 5B comprises four rectangular photo-sensitive diodes, D1–D4, upon a single chip spaced 90° apart in respect to the period upon the sinusoidal track 125. FIG. 6 illustrates the relationship between the detector 140 and the sinusoidal track 125. The utilization of the four diode array upon detector 140 allows the use of a differential ratio technique which eliminates offset and gain errors.

Figure 7:
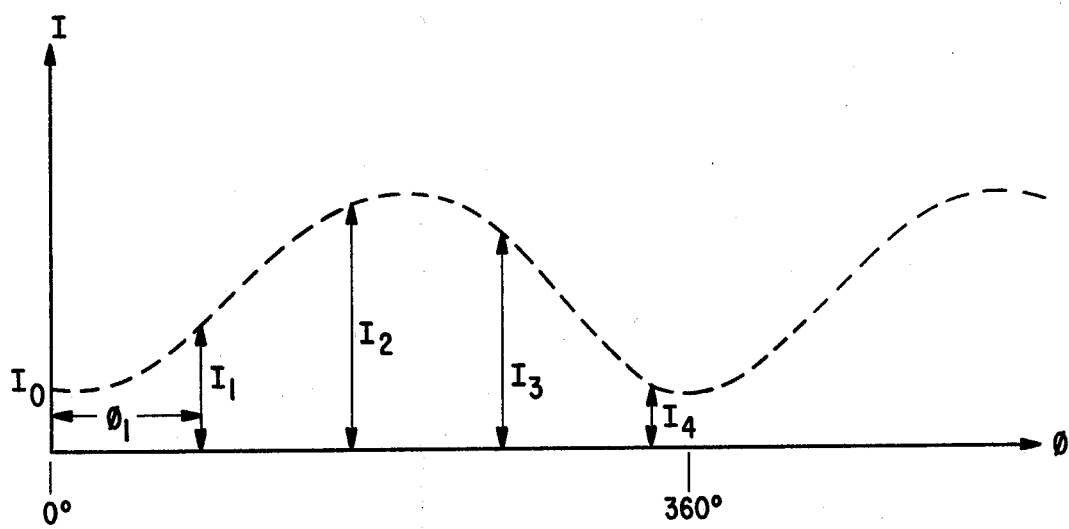
FIG. 7 is a graph of light intensity as a function of angle received by the diode elements of the detector of FIG. 6.

The intensity of the light received by the four diodes in the detector 140 is illustrated in FIG. 7. The eight track digital system described above unambiguously defines the period of the 128 track sinusoidal pattern to be interpolated. The interpolation angle, $\phi_1$, to be measured, is related to the intensities detected by the four diode detectors in detector 140 by the following relationships:

$$I_1 = I_0 + \sin \phi_1$$

$$I_2 = I_0 + \sin (\phi_1 + \pi/2) = I_0 + \cos \phi_1$$

$$I_3 = I_0 + \sin (\phi_1 = \pi) = I_0 - \sin \phi_1$$

$$I_4 = I_0 + \sin (\phi_1 + 3\pi/2) = I_0 - \cos \phi_1$$

Referring now to FIG. 8, the outputs $I_1$ and $I_3$ from the first and third diodes in detector 140 and the outputs $I_2$ and $I_4$ from the second and fourth diodes in detector 140 are differenced in amplifiers 145 and 150 respectfully.

$$I_1 - I_3 = 2 \sin \phi_1$$

$$I_2 - I_4 = 2 \cos \phi_1$$

The sinusoidal track photo source 155 (in FIG. 5) is modulated with a signal proportional to sin $\omega t$, (375Hz), thus the two signals output from amplifiers 145 and 150 are:

A sin $\phi_1$ sin $\omega t$ and

A cos $\phi_1$ sin $\omega t_1$ respectively.

Figure 9A:
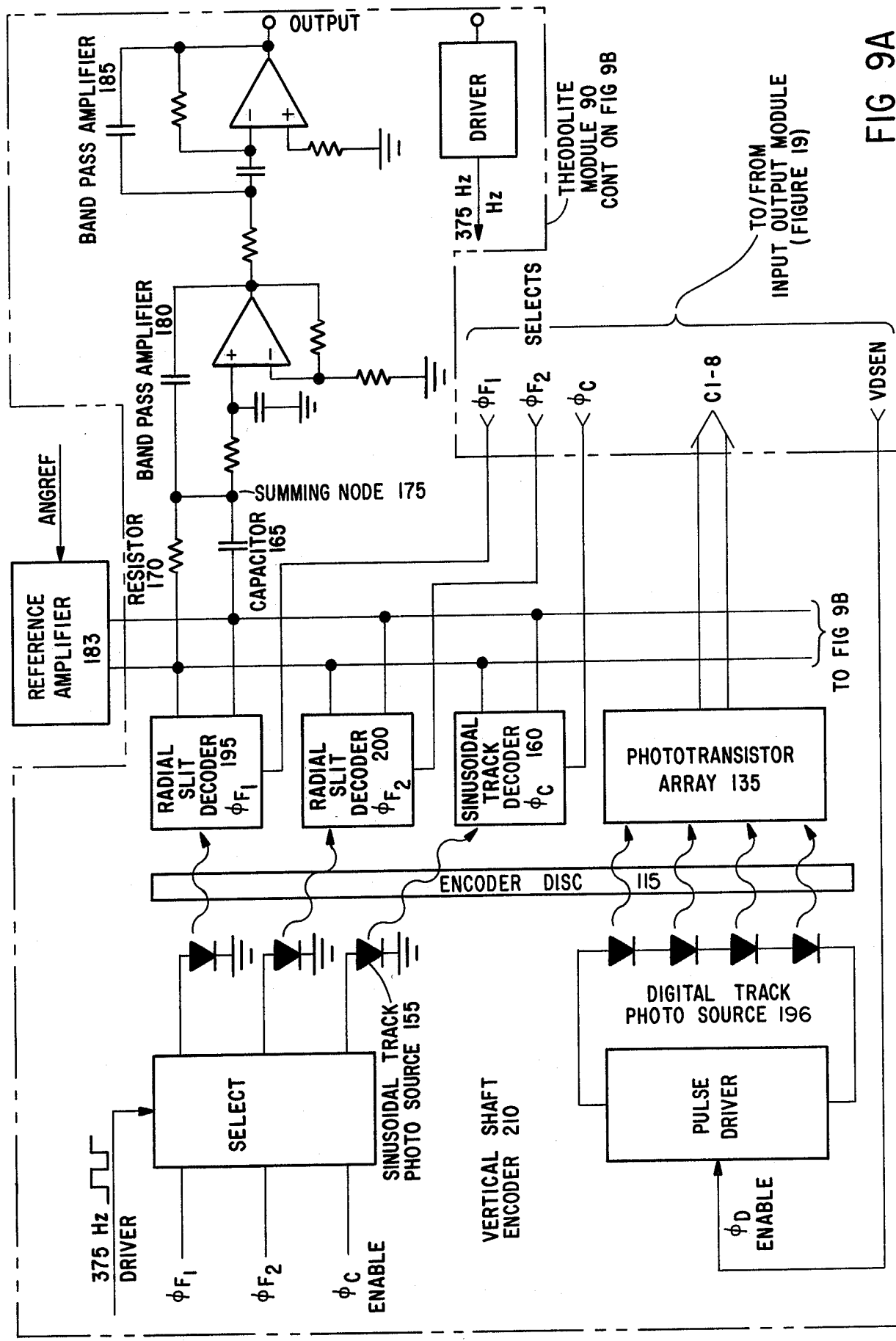
FIGS. 9A and 9B are detailed block diagrams of the theodolite module of FIG. 2.
Figure 9B:
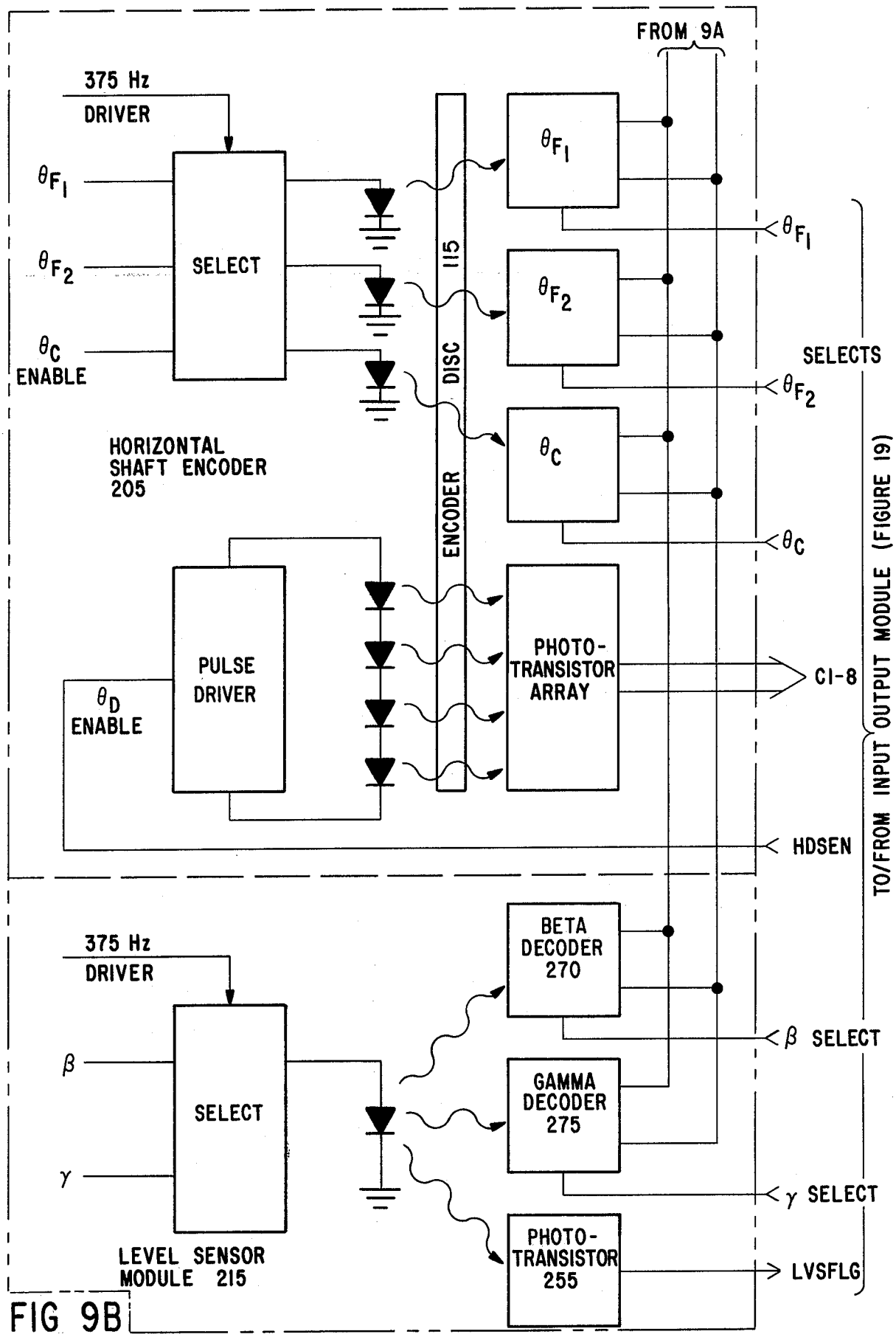

Referring now to FIG. 9, the sinusoidal track decoder 160 illustrated in FIG. 8 is now shown interconnected within the theodolite module 90. A first output signal from sinusoidal track decoder 160 is coupled to capacitor 165. The capacitor introduces a 90° phase shift to the signal. The second signal output from the sinusoidal track decoder 160 is coupled to resistor 170, which matches the impedance of capacitor 165 but introduces no phase shift. The two signals are subsequently summed at summing mode 175. The phase shift and the summing result in an output signal which is proportional to:

A sin ($\omega t + \phi_1$).

The phase difference between the signal (sin $\omega t$) modulating the sinusoidal track photo-source 155 and the signal at the summing node 175 (sin ($\omega t + \phi_1$)) is therefore directly proportional to the angle $\phi_1$, the interpolation angle desired. In the current embodiment, the driver modulation of the sinsuoidal track photo-source 155 is a 375Hz squarewave. Since the squarewave introduces high order harmonics, two band-pass amplifiers 180 and 185 are used to suppress the undesired harmonics and retain only the desired fundamental frequency. The output of band-pass amplifier 185 therefore is a sinewave shifted in phase by an amount proportional to the angular displacement to be measured, having a peak-to-peak voltage of approximately 2 volts. As can be seen from FIG. 9, the resistor 170, capacitor 165 and band-pass amplifiers 180 and 185, are time shared between the various decoder assemblies in the Theodolite Module 90.

A second order interpolation is implemented upon the radial slit track 130 of FIG. 4. The technique is the same as described as used for the decoding of the sinusoidal track 125, except in the case of the radial slit track 130, the circular track comprises 4096 bars and slits and the detectors 190 comprise four photo-diodes each with a superimposed sinusoidal mask thereupon. As illustrated in FIG. 10, each detector diode has a mask comprising 13 sinusoidal periods, such that the output amplitude is averaged over 13 periods. This reduces the sensitivity to dust and improves the accuracy since it averages out pattern imperfections over the thirteen periods. The diode masks are shifted by increments of 90° with respect to the period of one bar and space. The diode elements D1–D4 are offset 90° apart in phase in respect to the radial slit track 130. The same detector is used as on the sinusoidal track 110, except for the sinusoidal overlay mask. Referring to FIG. 9, two radial slit decoders 195 and 200 are illustrated. These decoders are spaced 180° apart upon the radial slit track 130, and the average value of the two readings is used to indicate the actual phase angle upon the radial slit track 130. The difference between the two outputs from the radial slit decoders 195 and 200 is also used to correct for eccentricity errors, described below.

The horizontal shaft angle encoder 205 illustrated in FIG. 9 is identical in operation to the vertical shaft angle encoder 210 which has been described above.

Figure 11:
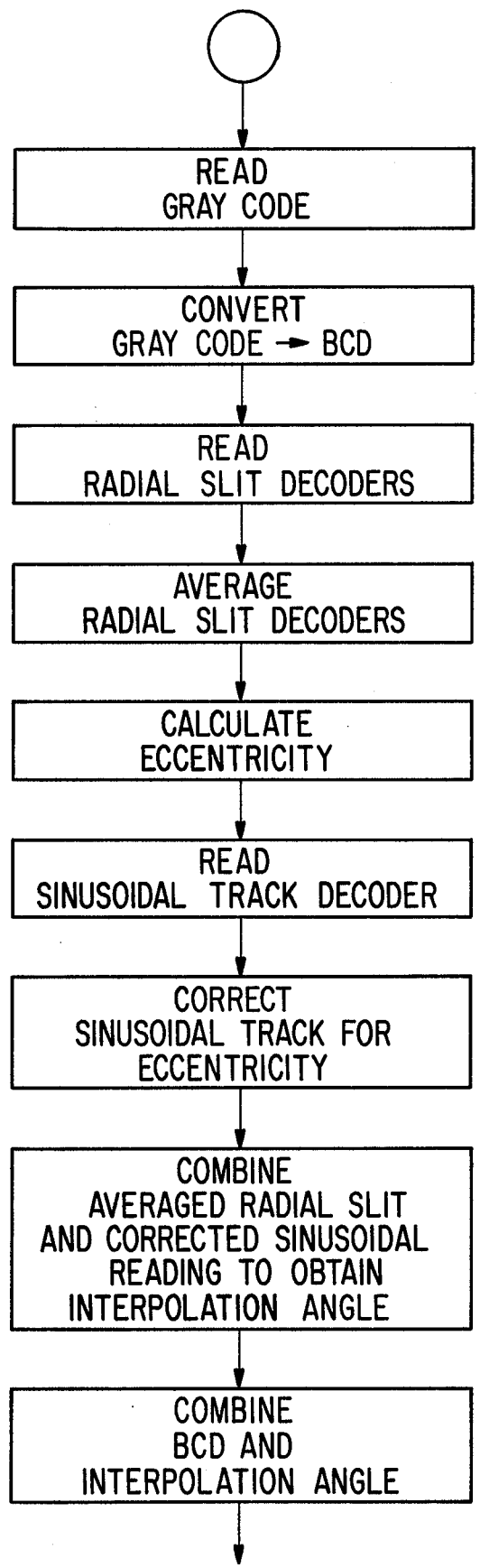
FIG. 11 is a flow chart for combination of the angular measurements.

Referring to FIG. 9, the processor will sequentially enable the decoders and the corresponding photosources for the measurement it requires via the 'select' lines. The outputs from the Gray Code on the phototransistor arrays, such as photo-transistor array 135, will be directly output to the input/output section of the processor on data lines C1–C8. The outputs from the sinusoidal and radial slit decoders such as decoders 160, 195 and 200 will be multiplexed upon the shared output to the phase detector 80. The algorithm for combining the Gray Code, the sinusoidal track information, and the radial slit track information, is shown in FIG. 11. First the digital Gray Code is read and converted to a binary coded decimal. The two radial slit outputs are read, averaged and the eccentricity correction required is calculated. Next the sinusoidal track information is read, corrected for the eccentricity error detected above, and then combined with the radial slit track information and the Gray Code angle to unambiguously define the shaft angle to a resolution of better than 1 arc-second.

Band-pass amplifiers 180 and 185 inherently introduce a certain amount of phase shift which may vary as a function of time and temperature. This shift is measured by introducing the 375Hz squarewave directly via reference amplifier 183 during a reference measurement cycle. A correction is applied to subsequent measurements by the processor.

Figure 12:
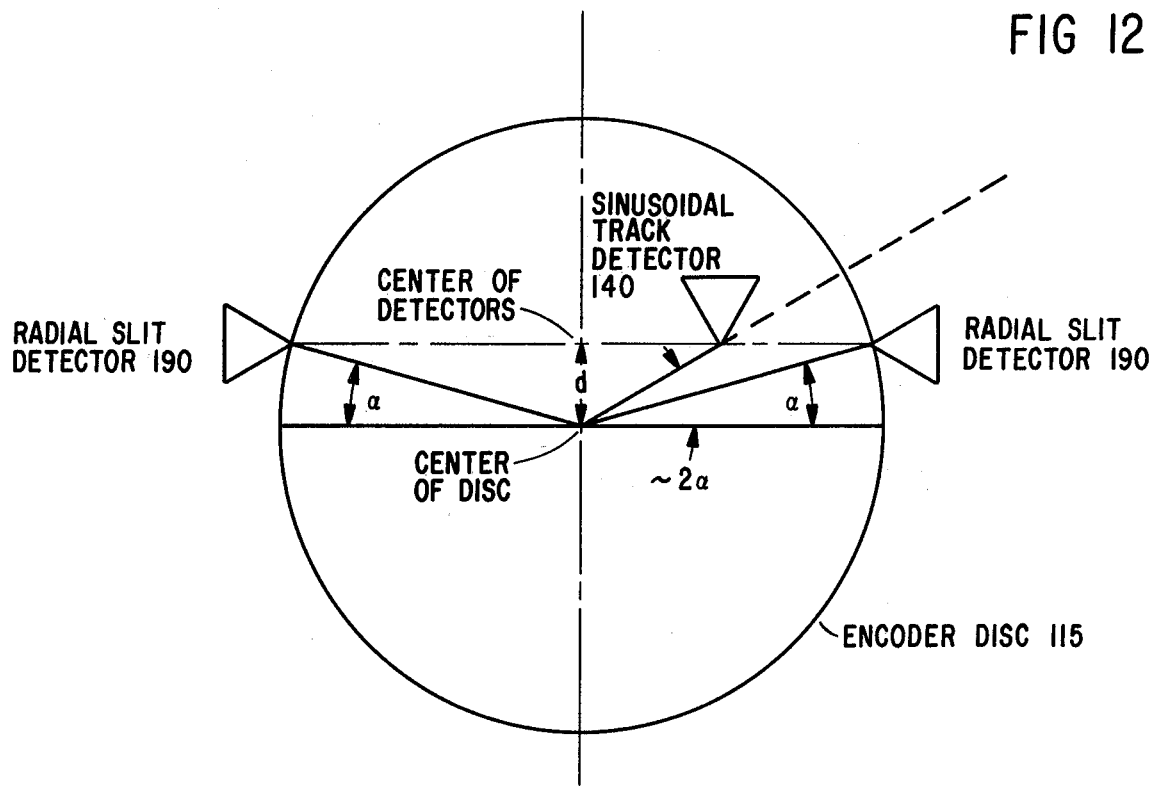
FIG. 12 is an illustration of the eccentricity error measurement.

Eccentricity errors can be caused by bearing clearance, misalignment of the encoder disc on the shaft and artwork errors on the encoder disc. The eccentricity effects that we are concerned about in the present invention are on the order of a 1 mil, where the outer track is only 3 mils in period. A 1 mil uncertainty in the interpolation of the sinusoidal track may result in the incorrect selection of the proper period on the radial slit track, so the sinusoidal track detection needs to be corrected for the eccentricity effects. We are measuring this with the fine resolution of the radial slit tracks. The eccentricity is measured by taking the difference between the two radial slit track measurements. If there is no eccentricity, the measurements will be exactly 180° apart. If there is an eccentricity error, as illustrated in FIG. 12, the true center of the encoder disc 115 will be displaced by a distance $d$ from the center axis of the detectors and the radial slit track measurements will not be displaced by exactly 180°, but will be displaced by an angle approximately $2\alpha$ smaller than 180°. On FIG. 12, extrapolating a line radially out from the center of encoder disc 115 through the sinusoidal track detector 140 would result in an error of determining the period of the radial slit track 130 to be interpolated. The angular displacement of the sinusoidal track detector 250 is approximately $2\alpha$, therefore correcting the measurement from detector 140 by $2\alpha$ results in a correction of the eccentricity error without the requirement for a second sensor on the sinusoidal track. This requires, of course, that the three sensors, the two for the radial slit track and the one on the sinusoidal track, be linearly aligned. The calculations and corrections for the eccentricity are all done by the processor as is the combining of the angular measurements.

LEVEL SENSOR

The function of the level sensor 215, shown in FIG. 9, is to measure the angular orientation of the instrument relative to a gravitational defined level, so that the vertical and horizontal angles which have been detected by the vertical and horizontal shaft encoders 205 and 210, can be transformed to a gravitational reference plane. The mathematics for correcting the vertical and horizontal angles once the true level has been determined by a 2 axis level sensor is a straight forward application of spherical geometry. See for example the section of "Relations in any Spherical Triangle" in the Chemical Rubber Company's standard mathematical tables, 14th Edition, published in 1964 by the Chemical Rubber Company. The use of a level sensor to correct the vertical and horizontal angles measured by a theodolite, as taught by the present invention, furthers the objectives of the present invention by allowing the theodolite to self compensate for out-of-level conditions.

Figure 14:
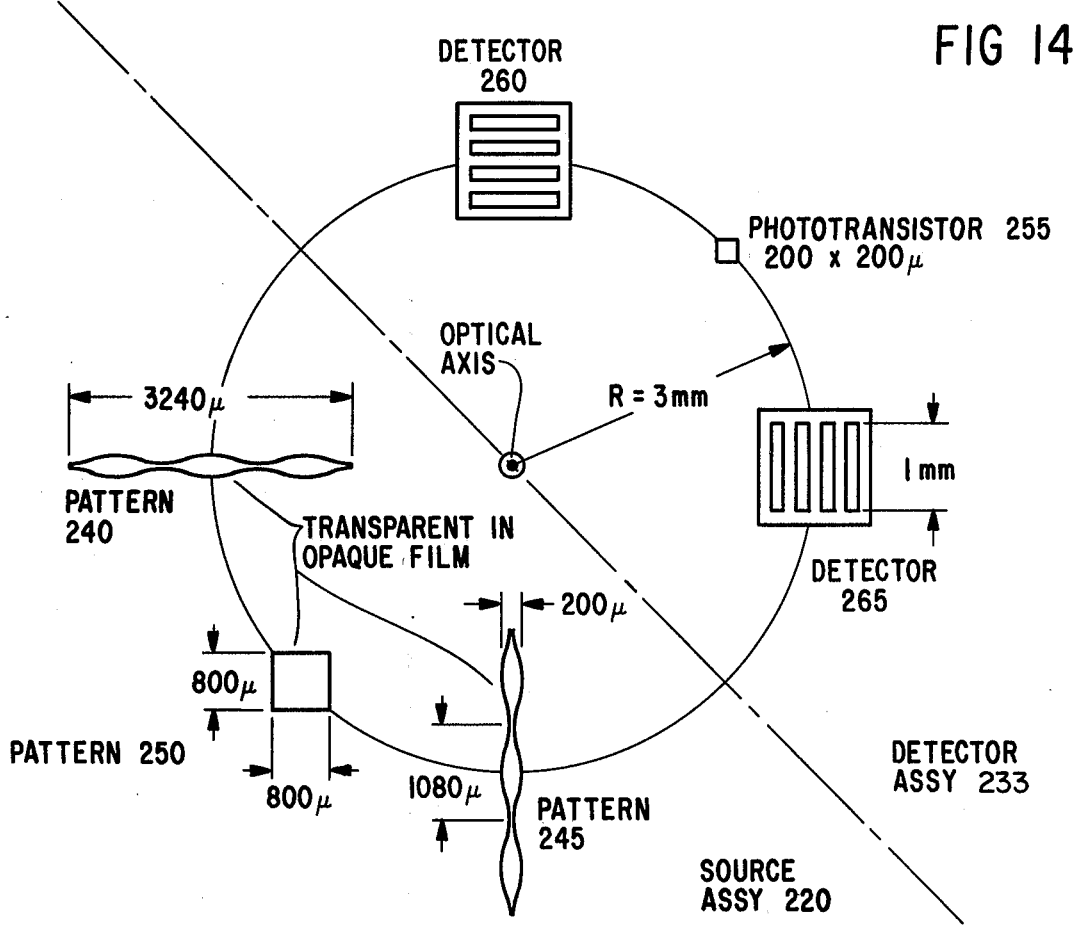
FIG. 14 is a detailed illustration of the detector and source assemblies of FIG. 13.
Figure 13:
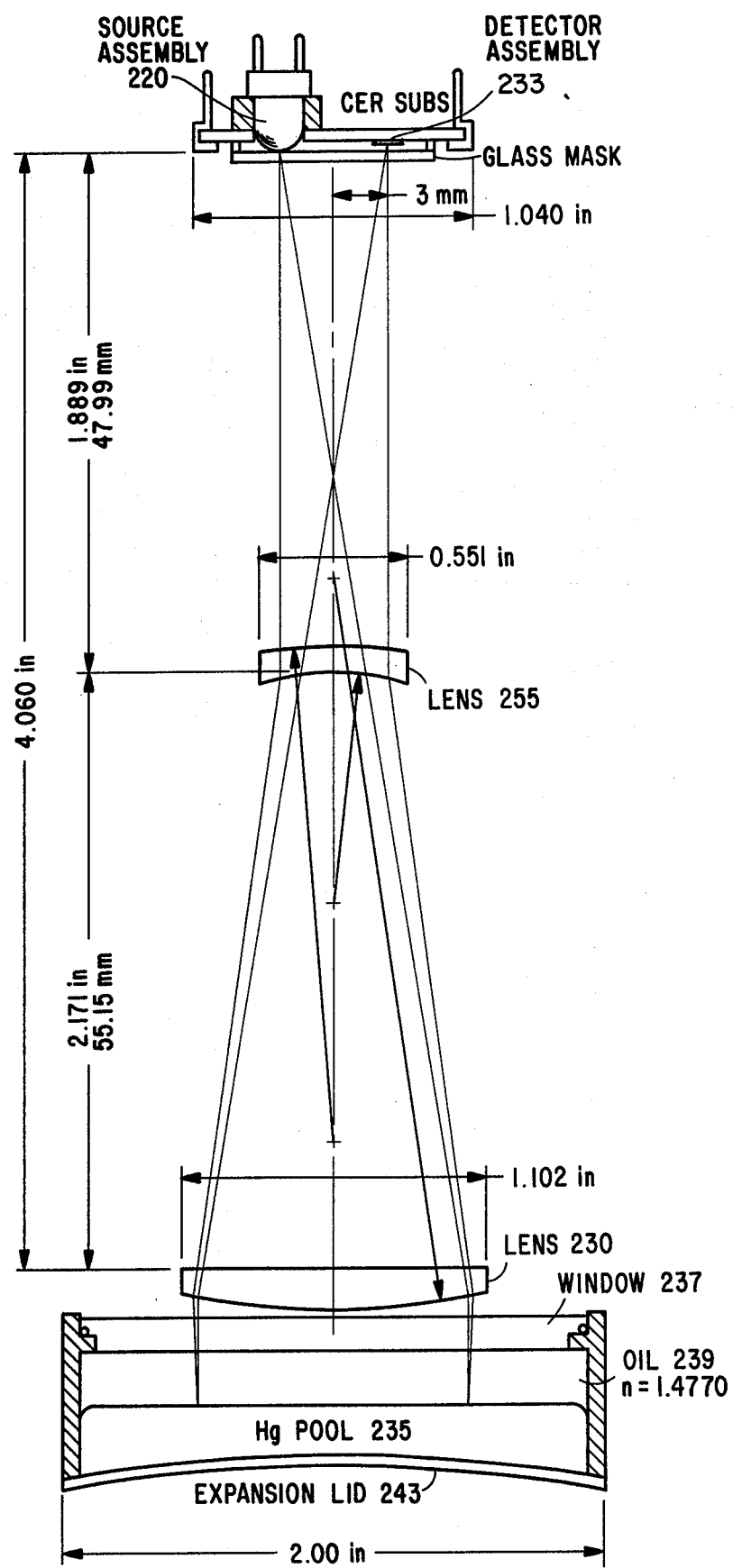
FIG. 13 is an illustration of the optical layout of the level sensor of the theodolite of FIG. 9.

The accuracy of theodolites in the prior art is dependent upon the accurate leveling of the theodolite assembly itself, using the prior art leveling techniques such as bubbles or pendulum methods such as that described in U.S. Pat. No. 3,617,131 issued to Hiromi Taguichi, Nov. 2, 1971. The present invention uses a lens to collimate a beam of light which is reflected from a mercury pool and then focused on a detector assembly. The displacement of the source image upon the detector assembly due to the gravitionally determined plane of the mercury pool provides a measure of the angular displacement of the theodolite assembly from the gravitional reference on 2 axes. Referring to FIG. 13, the source assembly 220 produces an image which is transmitted through lens 225 and collimated by lens 230. The collimated source image is reflected from mercury pool 235 which provides a gravitationally defined reference plane. The reflected source image is thereupon transmitted through lens 230 and and lens 225 and focused upon the detector assembly 235 which is symmetrically disposed in relation to the source assembly 220 about the symmetrical axis of the lens system. The function of lens 225 is to keep the dimensions of the instrument package small. The displacement measurement technique is identical to that described above in the discussion of the shaft angle encoders. FIG. 14 shows the detector assembly 233 and the source assembly 220 constructed upon a single plane. The source assembly 220 has three patterns thereupon. Two of the patterns are on orthogonal axes for determining the level of the assembly. One is denoted the gamma axis pattern 240, the other is denoted the beta axis pattern 245. A third pattern 250 is a rectangular pattern used to determine whether the level sensor is within the limits of its detection capabilities. The present level detector has a range of approximately ±3 min. from true level. The detectors are symmetrically disposed from the center axis of the lens assembly upon a radius of approximately 3mm relative to the source patterns on the source assembly 220. The photo-transistor 255 will output a signal if the level sensor is within range limits. The beta axis and the gamma axis detectors 260 and 265 will output an array of signals from which the beta and gamma angular displacement of the true gravity vector can be determined by the method previously defined in the shaft angle encoder technique. Referring now to FIG. 9, the processor will select a measurement upon either the beta or the gamma axis which will be decoded by decoder 270 or 275. The photo-transistor 255 will output a signal upon the flag LVSFLG if the level sensor is within its limits. If a beta or gamma measurement is desired, the 375Hz squarewave driver signal will be applied to the photosource which will emit the appropriate source patterns, and the beta or the gamma decoder assembly will be activated. The output will be multiplexed upon the output lines shared with horizontal shaft encoder 205 and the vertical shaft encoder 210, through resistor 170 and capacitor 165 and band pass amplifiers 180 and 185 to the phase detector 80.

The mercury pool 235 of FIG. 13 is designed to produce a level and highly reflective reference plane. A layer of transparent silicon oil 239 having a low viscosity temperature coefficient (VTC) is used to damp vibrations. A glass window 237 over the mercury/oil pool eliminates any air bubbles from existing between the glass surface and the pool. An expansion lid 243 allows for thermal expansion and contraction of the pool. Finally, the coated glass window 237 has a low reflectivity, ~1.0% as compared to ~4.0% for uncoated glass, to prevent stray reflections which are detrimental to accuracy.

DISTANCE MODULE

Figure 15:
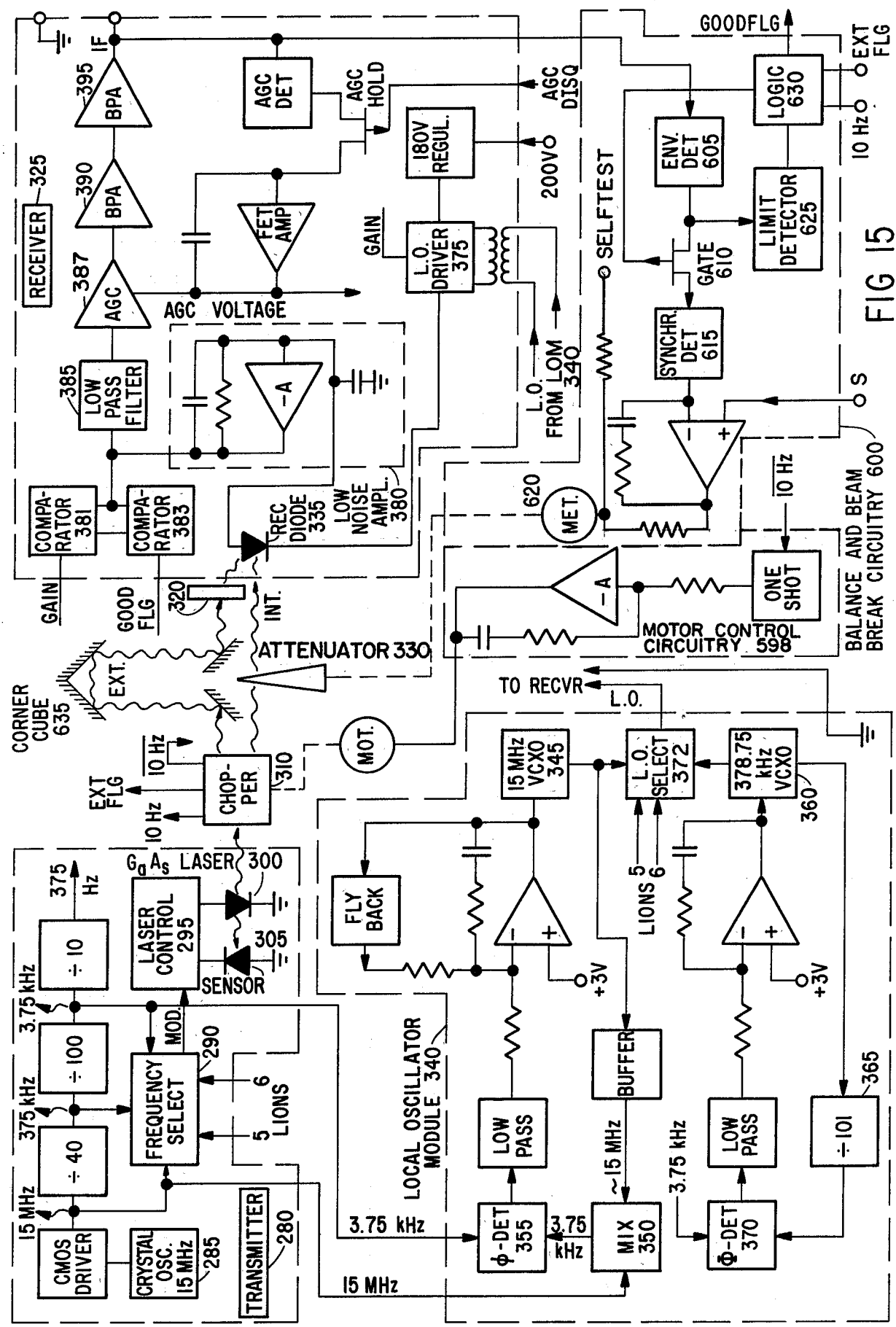
FIG. 15 is a detailed block diagram of the distance module of FIG. 2.
Figure 16:
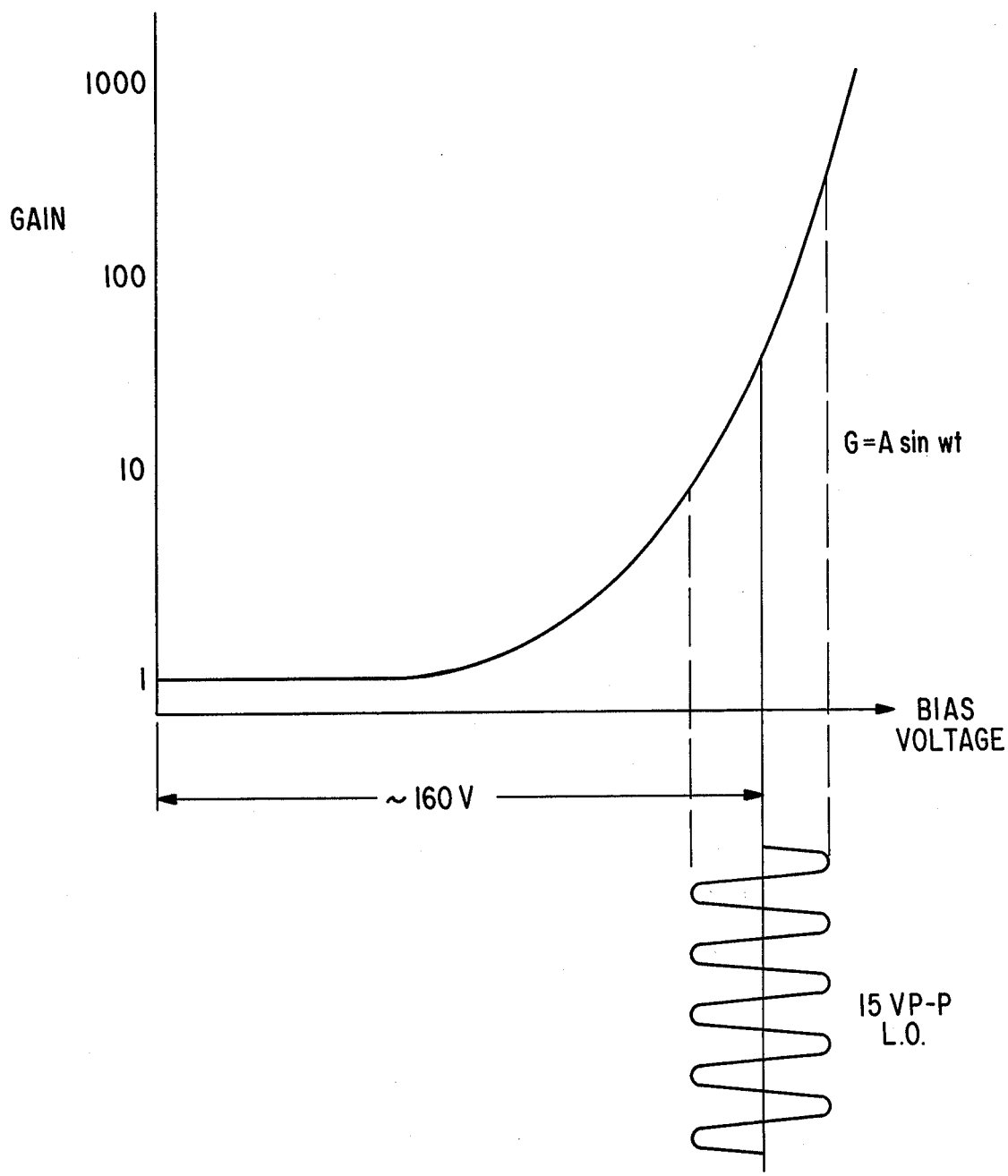
FIG. 16 is a graph of the transfer function of the receiver diode of FIG. 15.

The distance module 75 of the present invention utilizes a technique known as phase comparison, which is the subject matter of U.S. Pat. No. 3,619,058 issued to William R. Hewlett et al, Nov. 9, 1971. A more recent implementation of this technique is described in an article entitled "Electronic Total Station Speeds Survey Operations", by Michael L. Bullock and Richard E. Warren in the April, 1976 issue of the Hewlett-Packard Journal. The present distance measuring module comprises a transmitter, a local oscillator, optics, balance and beam break circuitry, and a receiver. Transmitter 280 of the present invention, shown in FIG. 15, comprises a 15MHz crystal oscillator 285 and a series of dividers coupled thereto for producing reference frequencies of 15MHz, 375KHz, 3.75KHz and 375Hz. The 375Hz is used to drive the sinusoidal track photo-sources and the radial slit track photo-sources in the theodolite module. One of the three higher frequencies is selected by the processor via 'lion' line inputs to the frequency select circuitry 290 which are coupled to the processor. The selected modulation frequency is input to the laser control circuitry 295 for modulation of the Gallium-Arsenide laser diode 300. The laser diode 300 generates a beam in two directions. One beam is transmitted out of the transmitter module, the second beam is sensed by sensor 305, which is incorporated in a feedback control loop for controlling the operating power level of the laser. The outgoing beam goes through chopper 310 which alternately sends the beam along external and internal paths. The external path sends the beam to a cube corner 315 and back, then through an interference filter 320 which passes only the selected infra-red signal to the receiver 325. The internal path sends the beam through a variable density attenuator 330 and directly into the receiver 325. The receiver diode 335 in the receiver 325 is a photo-avalanche diode. The receiver diode 335 has a gain which is a function of the reverse bias voltage applied to the diode. These characteristics are illustrated in FIG. 16. As shown, the receiver diode has a gain of approximately 1 at low reverse bias voltages. Increasing the voltage bias increases the gain to approximately 1000 before the diode goes into breakdown. The receiver diode accomplishes three functions in the present embodiment. First, the receiver diode demodulates the infra-red beam. Second, the receiver diode mixes the received signal with a local oscillator signal produced by local oscillator driver 340. Third, the receiver diode amplifies the incoming signal an average of about 75 times. The local oscillator frequency is derived from the local oscillator module 340 and is selected so that the output from the receiver diode will always have a 3.75KHz component. When the laser is modulated at 15MHz by the transmitter module the local oscillator is driven at 3.75KHz above the 15MHz laser modulation. When the laser is modulated at 375KHz the local oscillator is again driven at 3.75KHz above the laser modulation. When the laser is driven at 3.75KHz no mixing is required to produce the 3.75KHz output from the receiver diode.

The local oscillator module 340 produces the two required local oscillator frequencies by means of two phase-locked loops. The first phase-lock loop comprises a voltage controlled oscillator 345 which will be controlled to oscillate at 3.75KHz above the 15MHz reference. The output from the voltage controlled oscillator 345 is mixed with the 15MHz reference signal from the transmitter module in mixer 350 and the difference frequency is compared in phase detector 355 with the 3.75KHz frequency from the transmitter 280. The output of the phase detector 355 is low passed filtered and input to the voltage controlled oscillator 345 to lock the output of the voltage control oscillator at exactly the desired frequency. The second phase lock loop comprises a voltage controlled oscillator 360 which is to be locked at a frequency 3.75KHz above 375KHz. This is done by dividing the output of the phase voltage controlled oscillator 360 with a 101:1 divider 365. This divided frequency is locked to the 3.75KHz signal from the transmitter module in phase detector 370. The output of the phase detector 370 is low passed filtered and is used to control the voltage controlled oscillator 360. The output of the voltage controlled oscillator 360 is thereby locked at a frequency exactly 101 times the 3.75KHz reference. The local oscillator frequency selector 372 is controlled by the processor to apply either the 15MHz + 3.75KHz frequency or the 375KHz + 3.75KHz frequency to the local oscillator driver 375 in the receiver module 325. The 3.75KHz output of the receiver diode 335 is passed through a low noise amplifier 380, low pass filtered in low pass filter 385 and input to an automatic gain control amplifier 387 which insures that the output voltage of the receiver circuitry will always be about 2 volts peak-to-peak, as is the output from the theodolite module. Two narrow band-pass amplifiers 390 and 395 insure that only the 3.75KHz components are output from the receiver module 325.

The peaks of the output of low noise amplifier 380 are sampled by two comparators 381 and 383. If an overload signal is detected, such as would be caused by holding a cube reflector directly in front of the instrument, comparator 381 will reduce the D.C. bias on receiver diode 335 to reduce the nominal gain to approximately 20. If the overload is still in existence even with the reduced receiver gain, comparator 383 inhibits the GOODFLG. This will turn off the DIST light on the output display indicating to the operator that an attenuator is required in the beam path.

The processor accepts distance measurements, samples and averages the sample values and computes the variance from the value of the sample mean. If the variance is within limits, the processor will display the sample mean. If not, the processor will request more samples. If after 160 samples on the lowest frequency the variance is still out of limits the reading is aborted and a flashing zero is displayed. The same test is made upon middle and high frequency samples, however the high frequency is allowed 320 samples to come within the variance limits.

Figure 15A:
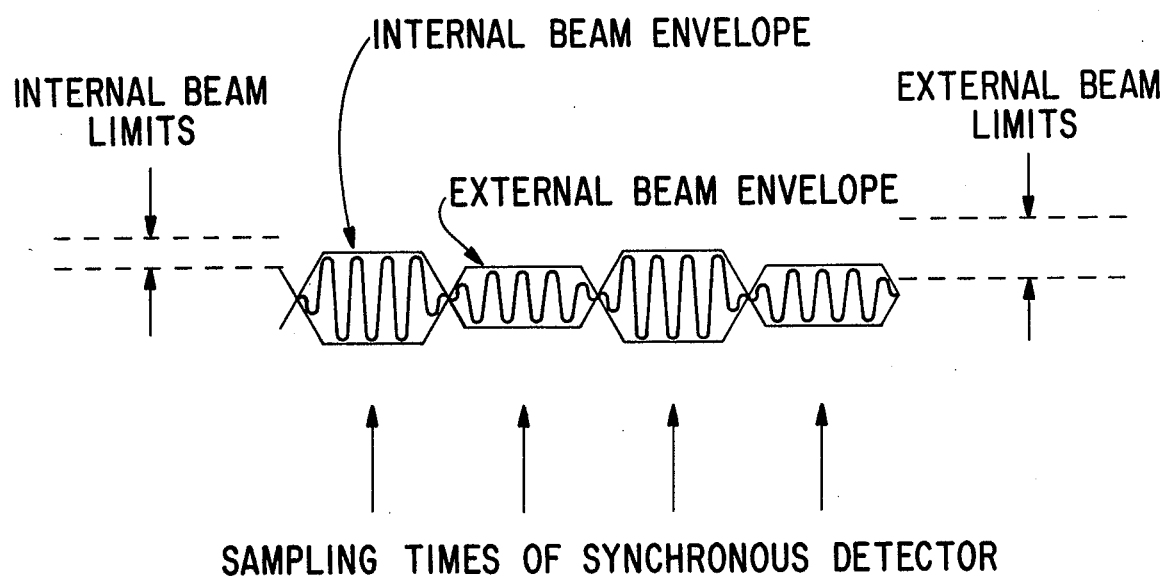
FIG. 15a is the waveform of the output of the receiver of FIG. 15.
Figure 15B:
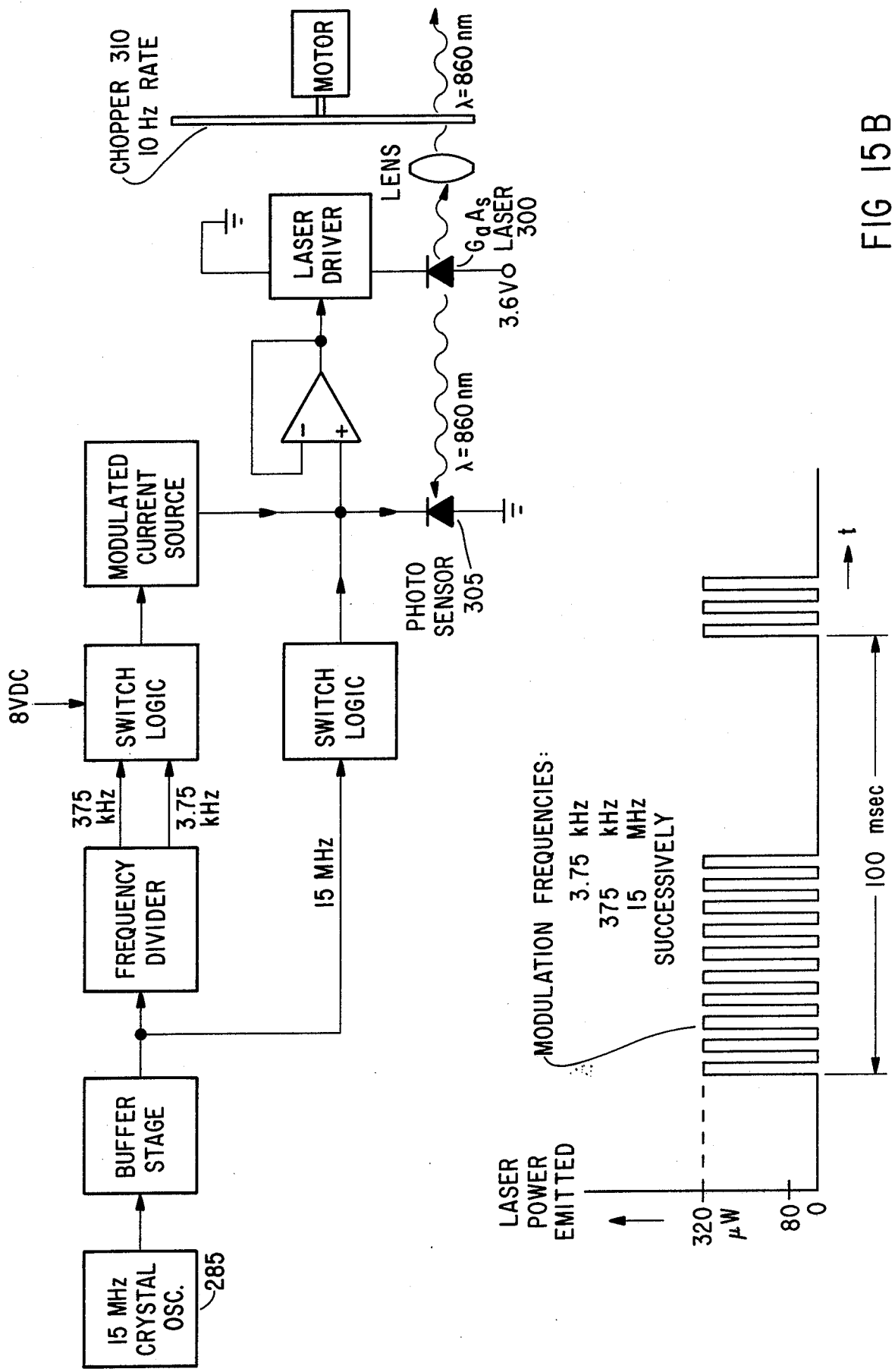
FIG. 15b is a detailed block diagram of the laser control circuitry of FIG. 15.

The laser control circuitry 295 is shown in more detail in FIG. 15b.

BALANCE AND BEAM BREAK CIRCUITRY

The balance and beam break circuitry 600 controls the intensity of the internal beam, the accumulation of data, and indirectly controls the automatic gain control. The output signal from the receiver 325 is illustrated in FIG. 15a. Envelope detector 605 measures the maximum amplitudes (the envelope) of the receiver output as shown in FIG. 15a. When gate 610 is active, the internal beam balance circuitry is enabled. Synchronous detector 615 samples the output of envelope detector 605 at times synchronized with the beam switching. In turn, the synchronous detector drives meter 620 to adjust the variable attenuator 330 to equalize the internal and external beam envelopes.

Limit detector 625 determines whether the internal and external beam envelopes are within predefined limits. Upon detection of an out-of-limit condition a signal is transmitted to logic module 630. The logic module 630 controls the gate 610, the "GOODFLG", and interacts with the processor to control the AGC-DISQ flag as follows.

Figure 15C:
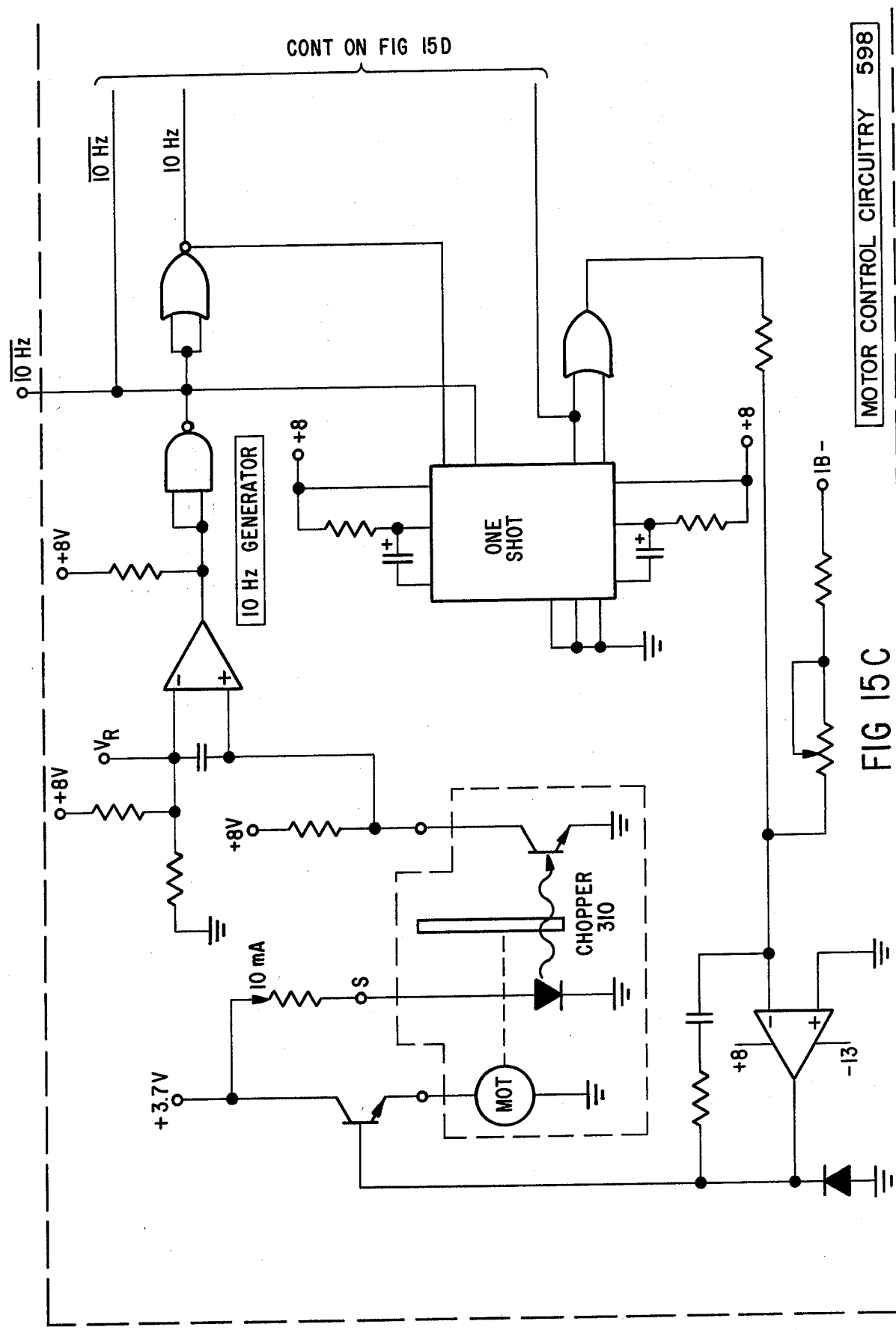
FIG. 15c is a detailed schematic of chopper 310 and the motor control circuitry of FIG. 15.
Figure 15D:
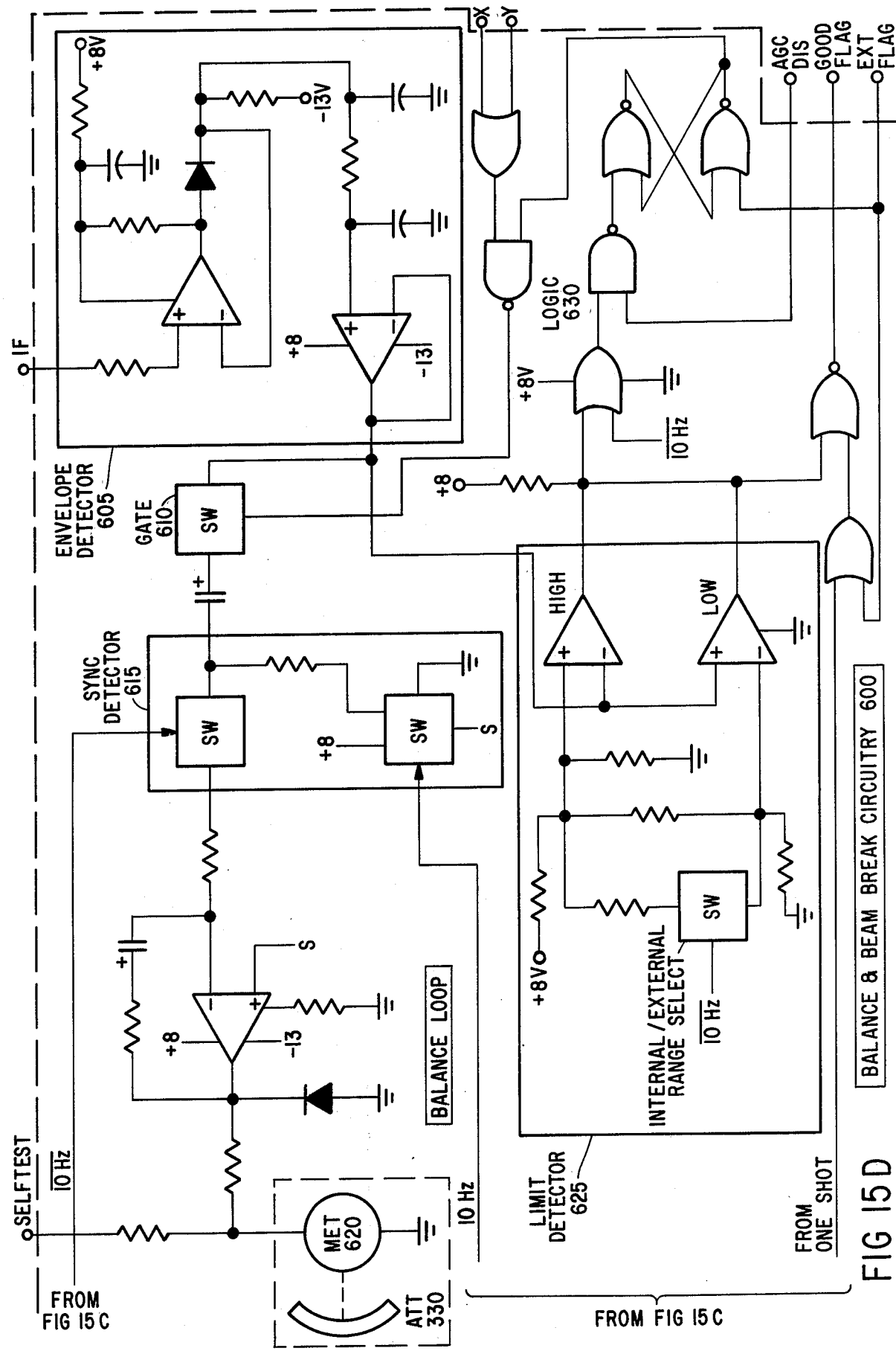
FIG. 15d is a detailed schematic of the balance and beam break circuitry of FIG. 15.

Three types of beam breaks can occur, and we categorize these as a "fast" beam break, such as a speeding car momentarily breaking the beam, a "long" beam break, such as a cow grazing in the beam, or a "slow" beam break, such as fog slowly attenuating the external beam. In the case of a "fast" beam break the external beam goes outside of its limits, and the "GOODFLG" signals the processor to ignore the affected measurement cycle. In the case of a "long" beam break the balance is held, however, the AGC is adjusted to center the internal beam within its limits. When the grazing cow moves out of the beam the external beam will again be within limits and the "GOODFLG" will signal the processor to start a measurement. In the case of a "slow" beam break the balancing circuitry can equalize the internal and external beam strengths. The internal beam limits have a smaller tolerance than the external beam so that if the fog continues to roll in and attenuate the signal the internal beam limit is triggered. This results in the correction of the AGC gain and the measurement is restarted. If the processor does not receive a "GOODFLG" in 10 seconds (3 if tracking) the instrument goes to a standby mode. This produces a 10% laser duty cycle on laser 300 which conserves power and laser lifetime. The different limits upon internal and external beams, the continued balancing of internal and external beams, the balance hold and AGC update during "long" beam breaks, and the AGC update on "slow" beam breaks provides an instrument with improved measurement and tracking capabilities. A detailed schematic of the balance and beam break circuitry and of the chopper 310 control circuitry is illustrated in FIG. 15C. Note that the $\overline{10Hz}$ signal indicates whether an internal or external beam is presently being processed and proper ranges are accordingly selected by limit detector 625.

PHASE DETECTOR

Figure 17:
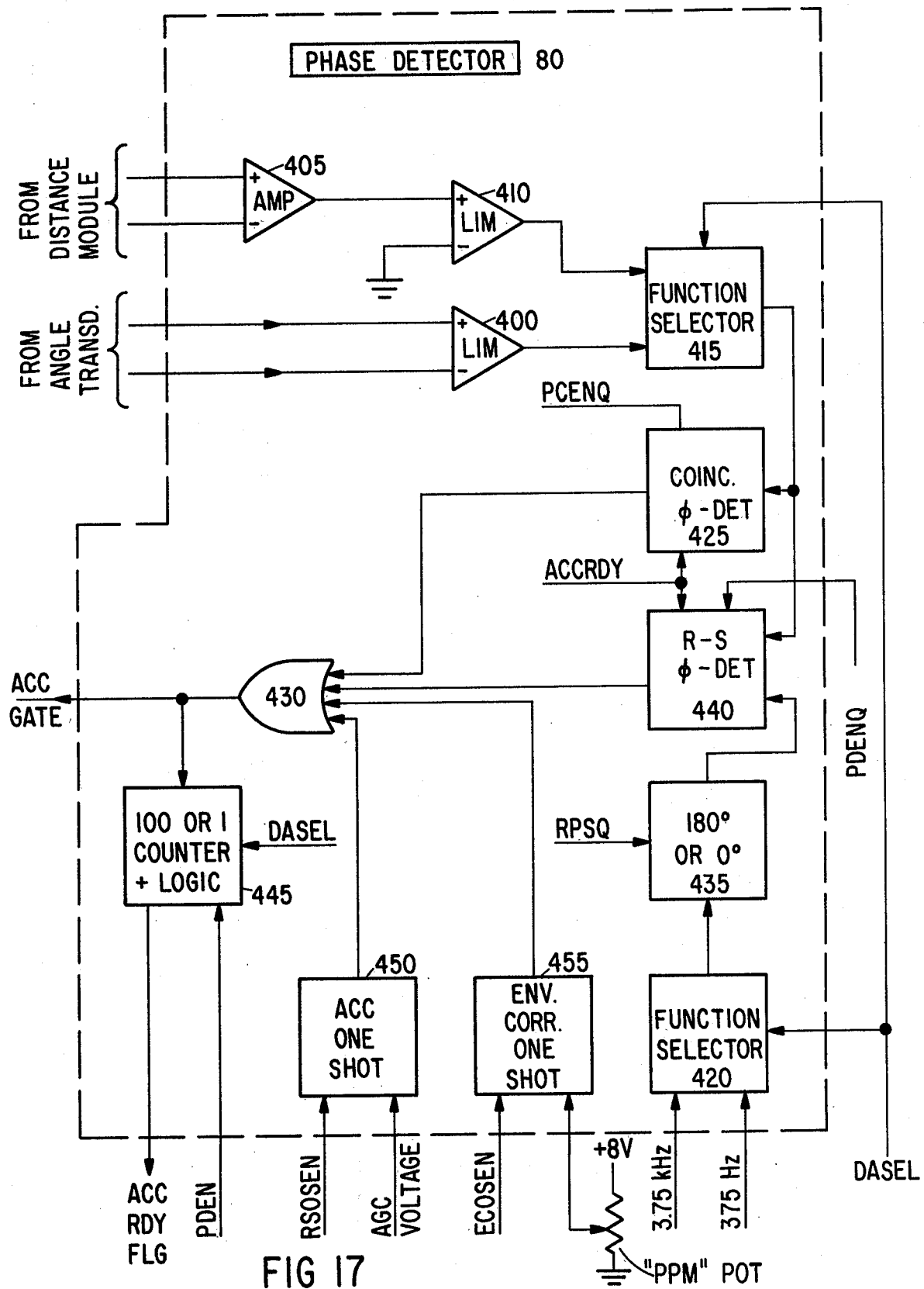
FIG. 17 is a block diagram of the phase detector of FIG. 2.

As explained in the discussion of the theodolite module 90 and the distance module 75, both the angle information and the distance measuring information are now encoded as phase shifts on a periodic signal. A phase detector 80 as illustrated in FIG. 17 is constructed in accordance with U.S. Pat. No. 3,900,259 entitled TIME INTERVAL PHASE DETECTION IN DISTANCE MEASURING APPARATUS issued to Claude M. Mott and Richard J. Clark, Aug. 19, 1975. A differential input from the theodolite module 90 is input to limiter 400 to construct a squarewave for comparsion with a reference signal. The output received from the receiver 325 is input to a low offset amplifier (a zero crossing detector) 405 which is then coupled to limiter 410 to also produce a squarewave for comparison to an appropriate reference signal. Function selector 415 is controlled by the processor to select either the input from the distance measuring module or from the theodolite module. This same control also controls function selector 420 which selects the appropriate reference frequency, either 3.75KHz squarewave for the measurement of distance or a 375Hz squarewave for the measurement of angles. The signals from function selector 415 are then applied to a coincidence phase detector 425 to determine whether the phase angle detected is close to 360°. Since the distance measuring determination as well as the level sensor angle determinations require an averaging of a number of input signals, operating close to 360° phase shift may introduce an error due to averaging of signals from different cycles. If such is the case, the coincidence phase detector 425 will provide a signal through the processor through OR gate 430 and the accumulator 85, and an 180° phase shift will be introduced to the reference signal in module 435 to avoid any possible averaging errors. Subsequent to the determination of whether the 180° phase shift is required, the input signal from function selector 415 and the reference signal from function selector 420 are input into the phase detector 440, which is simply a set-reset flip-flop. This will hold the accumulator gate high for a period of time proportional to the phase difference between the input and the reference signals. Counter logic 445 counts the number of phase measurements which have been made and outputs a signal upon the detection of the 100th phase measurement to the processor when measuring distance or the first phase measurement when measuring angle. The AGC one shot 450, and the environmental correction one shot 455, can also be selected to input to OR gate 430. These function as simple analog/digital converters. These one shots output a pulse corresponding in length to the voltage applied thereto, which provides a convenient means for interfacing with the processor. The selection of which of the four measurement is to be input to OR gate 430 is controlled by "LIONS" lines from the processor. Only one of the inputs to OR gate 430 is active at a time.

PROCESSOR AND DISPLAY

Figure 18:
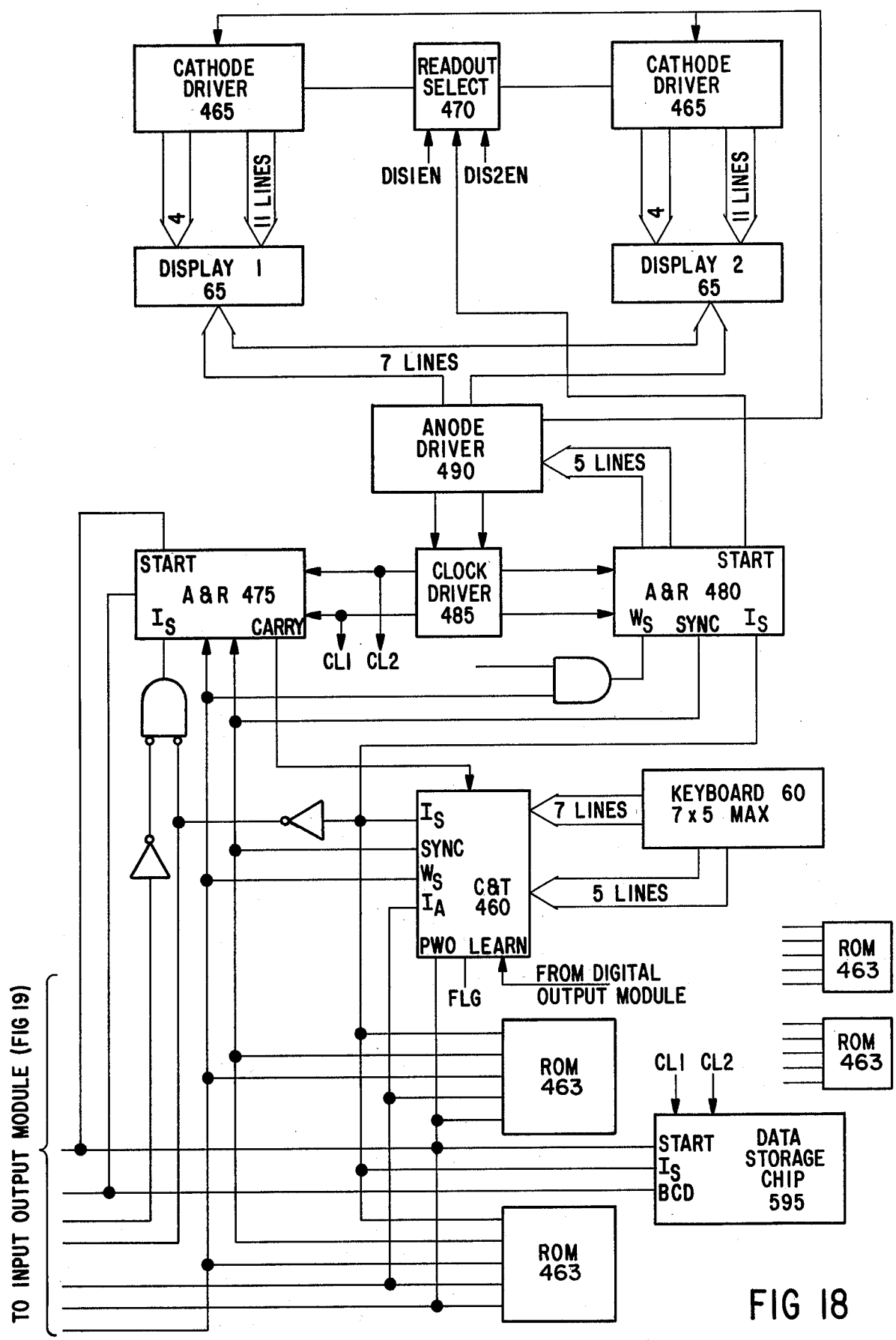
FIG. 18 is a block diagram of the processor and displays of the tacheometer of FIG. 2.

The processor 100 and the displays 110 shown in FIG. 18 are substantially the same as those used in the handheld calculators designated the HP35 and the HP80 manufactured by the Hewlett-Packard Company, Palo Alto, Calif. These are described in U.S. Pat. No.

3,863,060 entitled GENERAL PURPOSE CALCULATOR WITH CAPABILITY FOR PERFORMING INTERDISCIPLINARY BUSINESS CALCULATIONS, issued to France Rode et al on Jan. 28, 1975. A control and timing chip "C&T" 460 is coupled to the keyboard 60 by a 7×5 line matrix. This limits the number of possible keys to 35. In the present invention only 24 of the possible key functions are utilized, 12 on each of the two keyboards. Four quad read-only memories (ROMs) 463 are coupled in parallel to the C&T 460. Two cathode drivers 465 are used to drive the output displays 65. The read-out select 470 determines which of the cathode drivers 465 is active. Two arithmetic and register circuits 475 and 480 are incorporated. One is totally dedicated to run the readout display and another is dedicated to computations. This allows the instrument to do its computations while maintaining a simultaneous display. A data storage chip 595 contains 10 registers for storage of temporary and semipermanent calculations. This allows the "RECALL" function to operate as described in the KEYBOARD section. Two registers are used as scratch registers. Registers 1 and 6 are updated only by direct inputs. The remaining six registers are erased prior to each measurement. In general, the register contents correspond to the key stroke numeral as shown in Table 1.

Table 1

| Register | Contents |
| --- | --- |
| 0 | Scratch |
| 1 | SIG/PPM |
| 2 | Level Readings (2) |
| 3 | Slope Distance |
| 4 | Projected Horizontal Distance |
| 5 | Projected Vertical Displacement |
| 6 | Direction (Horizontal Angle) |
| 7 | Zenith (Vertical Angle) |
| 8 | Scratch |
| 9 | Relative Direction |

The system architecture of the processor 100 and a detailed description of the C&T circuit 460, the read-only memories 463, the A&R circuits 475 and 480, the clock driver 485, the anode driver 490, the cathode drivers 465, and a supplemental description of the keyboard 60, the output displays 65, and the instruction set for the processor is given in the above mentioned patent issued to France Rode et al. The program sequences programmed into the 4 quad ROMs 463 control the instrument operation in response to keyboard inputs and the other instrument inputs. Listings of these sequences as well as further discussion of the processor instruction set are provided in the section entitled DETAILED SEQUENCES.

ACCUMULATOR AND INPUT/OUTPUT MODULE

Figure 19:
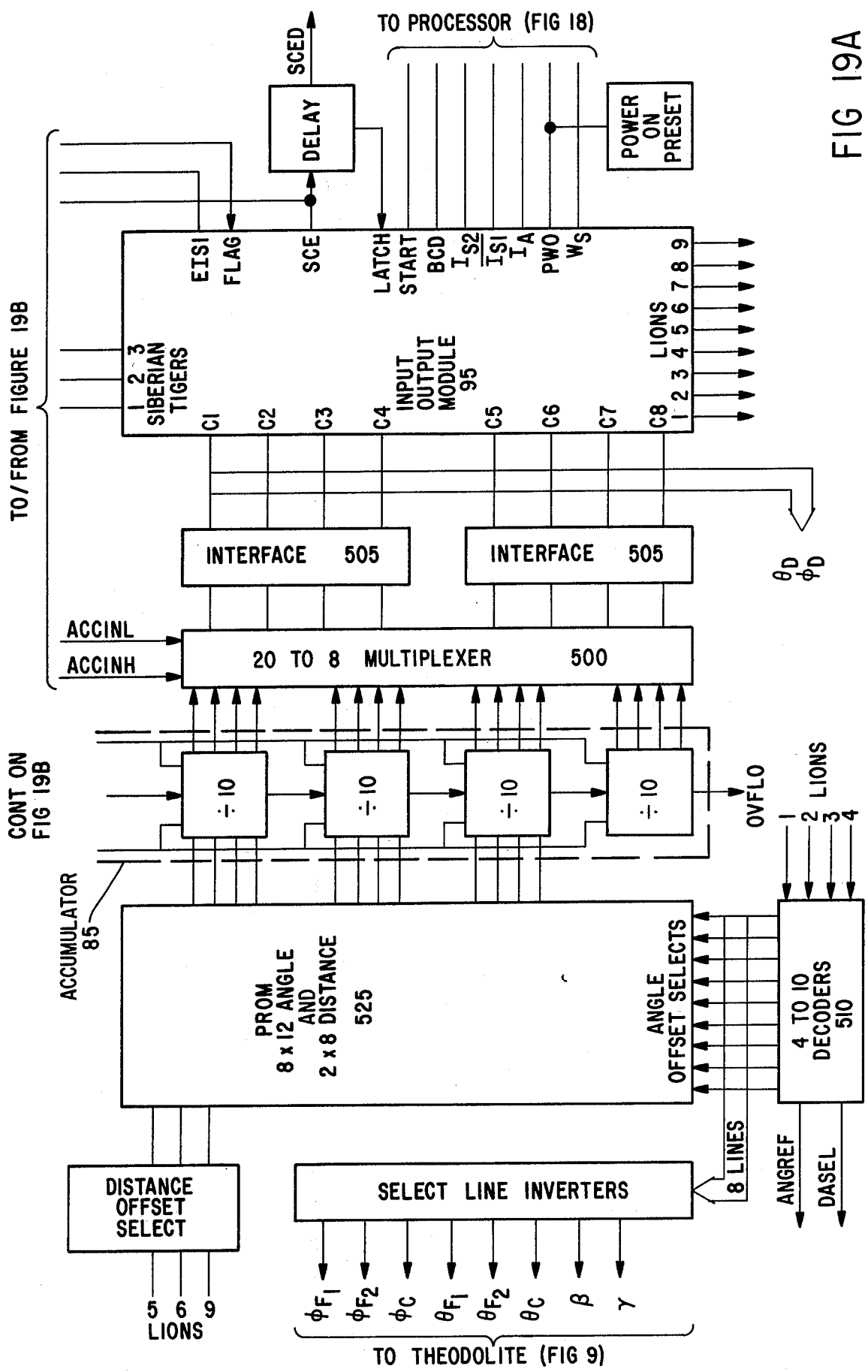
FIGS. 19A and 19B are block diagrams of the accumulator and input output module of FIG. 2.

The "grand central station" of the tacheometer is the input/output module 495 of FIG. 19. This module provides the interface between the processor 100 and the measurement modules. This input/output module 95 was originally developed for the HP9805 Desk Top Calculator to interface with a printer and is further described in the co-pending patent application entitled ADAPTABLE PROGRAMMED CALCULATOR HAVING PROVISION FOR PLUG-IN KEYBOARD AND MEMORY MODULES, Ser. No. 318,451 filed Dec. 26, 1972 by Freddie W. Wenninger et al. Ths input/output module 85 performs basically three functions. The module excepts the data from the accumulator 85, controls the instrument via "lion" and "tiger" lines and interrogates instrument status via "flag" lines.

As explained above, the basic instrument measurements are output by the phase detector 80 in the form of timed pulses. This output is applied to buffer gate 495 to gate a 15MHz clock. A number of clock pulses proportional to the duration of the time pulse from phase detector 80 is measured by the accumulator 85. When the timed pulse terminates a BCD number will be stored in the five-decade counters of the accumulator 85. Since the input/output moudle 95 can accept only 8 input lines, the accumulator output is multiplexed into the input/output module via multiplexer 500, reading first the 8 least significant bits, then the most significant bits sequentially into the input/output module. The interface circuitry 505 is required to adapt the CMOS logic of the tacheometry circuitry to the T$^2$L logic of the input/output module 95 interface. The input/output module 95 now communicates with the C&T 460 and A&R 475 for computations and sequence control. This allows data to be entered electrically through the processor and A&R chip in addition to processor control by the keyboard 60.

Instrument control is accomplished via the 9 "lion" lines. The function of the lions lines are shown in Table 1.

Table 1

| | |
| --- | --- |
| LIONS 1-4 | Control Decoder 510 For Selection Of Theodolite Measurements, Angle or Distance Selection, and Selects PROM Initialization Constants For Angles and Levels. |
| LIONS 5-6 | Transmitter Frequency Select and Selects PROM Initialization Constants For Distance. |
| LION 7 | Peripheral and Display Control Line Selector. |
| LION 8 | Level Limit Indicator. |
| LION 9 | PROM Enable For Distance Measurements. |

The lions lines 1-4 control the 8 select lines to the theodolite module 90 via the 4 to 10 decoder 510 and select angle or distance functions. The frequency selector and the local oscillator selector in the distance measuring module are controlled by two more lions lines.

The 3 "siberian tiger" outputs combined with the SCE line provide short pulses which last less than one instruction cycle time. These are used for short controls or interrogations. For instance, the digital track photosource 200 in the vertical shaft encoder 210 of the theodolite module 90 requires only short discharges of a capacitor for current pulses through the Gallium Arsenide photo-sources. Control multiplexers 515, 517 and 519 multiplex the tiger lines. Multiplex selector 523 enables one of the control multiplexers via lines M1-5. This provides an effective capability of controlling many 'little' tiger lines. The functions of the 'little' tiger lines thereby obtained are described in Table 2.

Table 2

| (Q means "latched") | |
| --- | --- |
| Group #1 | LITTLE TIGERS |
| PCENQ | Phase Coincidence Detector Select. |
| PDENQ | Phase Detector Select. |
| AGCDISQ | ACG Disable. |
| TGRP2Q | Tiger Group 2 Select. |
| PDEN | Phase Detector And Phase Coincidence Detector Enable. |
| ACUD | Accumulator Count Up Or Down. |
| Group #2 | LITTLE TIGERS |
| RPSQ | Reference Phase Shift To Phase Detector. |
| TGRP1Q | Tiger Group 1 Select. |
| ACCPRST | Accumulator Preset (From PROM). |
| VDSEN | Vertical Digital Sensors Enables. |
| HDSEN | Horizontal Digital Sensors Enables. |
| ACCINH | Read Higher Order Accumulator Bits. |
| ACCINL | Read Lower Order Accumulator Bits. |

Table 2-continued

| (Q means "latched") | |
|---|---|
| ECOSEN | Environmental One Shot Enable. |
| RSOSEN | Return Strength (AGC) One Shot Enable. |
| Group #3 | LITTLE TIGERS |
| DIS1EN | Display 1 Enable. |
| DIS2EN | Display 2 Enable. |
| PERIN | Peripheral Input. |
| PERLD | Peripheral Load. |
| PERCK | Peripheral Clock. |
| SELFTEST | Self Test Activate. |

The final communication between the input/output module and the instrument is via the flag lines. An example of a flag line is the range sensor line LVSFLG from the level sensor module 215 in the theodolite. The input/output module has the capability of interrogating only a single flag line at a time. The control multiplexer 520 multiplexes the various flag lines into the input/output module flag input. The flag inputs are described in Table 3.

Table 3

| Flags: | |
|---|---|
| EXTFLG | Chopper Syncronization Flag. |
| OVFLO | Accumulator Overflow. |
| ACCRDYFLG | Measurement Complete (Read Into Processor). |
| GOODFLG | No Beam Break Detected. |
| LVSFLG | Level Sensor Within Range. |
| DEGGRAD | From Auxiliary Control Panel. |
| FTMTR | From Auxiliary Control Panel. |

The PROM 525 is used to provide offset constants for the distance and angle measurements. Once the instrument is assemblied, the offsets are measured and programmed into the PROM 520. These are used to preset the decade counter automatically prior to any distance or angle measurements.

The processor can provide a digital output of the contents of the display plus certain status bits. This output can be manually activated by pressing the output key or automatically activated by pressing the following key sequence: TRK + OUTPUT + KEY 1,2,3,4,5,6,7,8 or 9. In the manual case a single reading will be output after each measurement is made. The output is accomplished via a five wire interface. There are two flag lines, a ground line, a clock line and a data line. The data consists of 14 BCD digits in a 56 bit serial stream.

OPTICS

Figure 20:
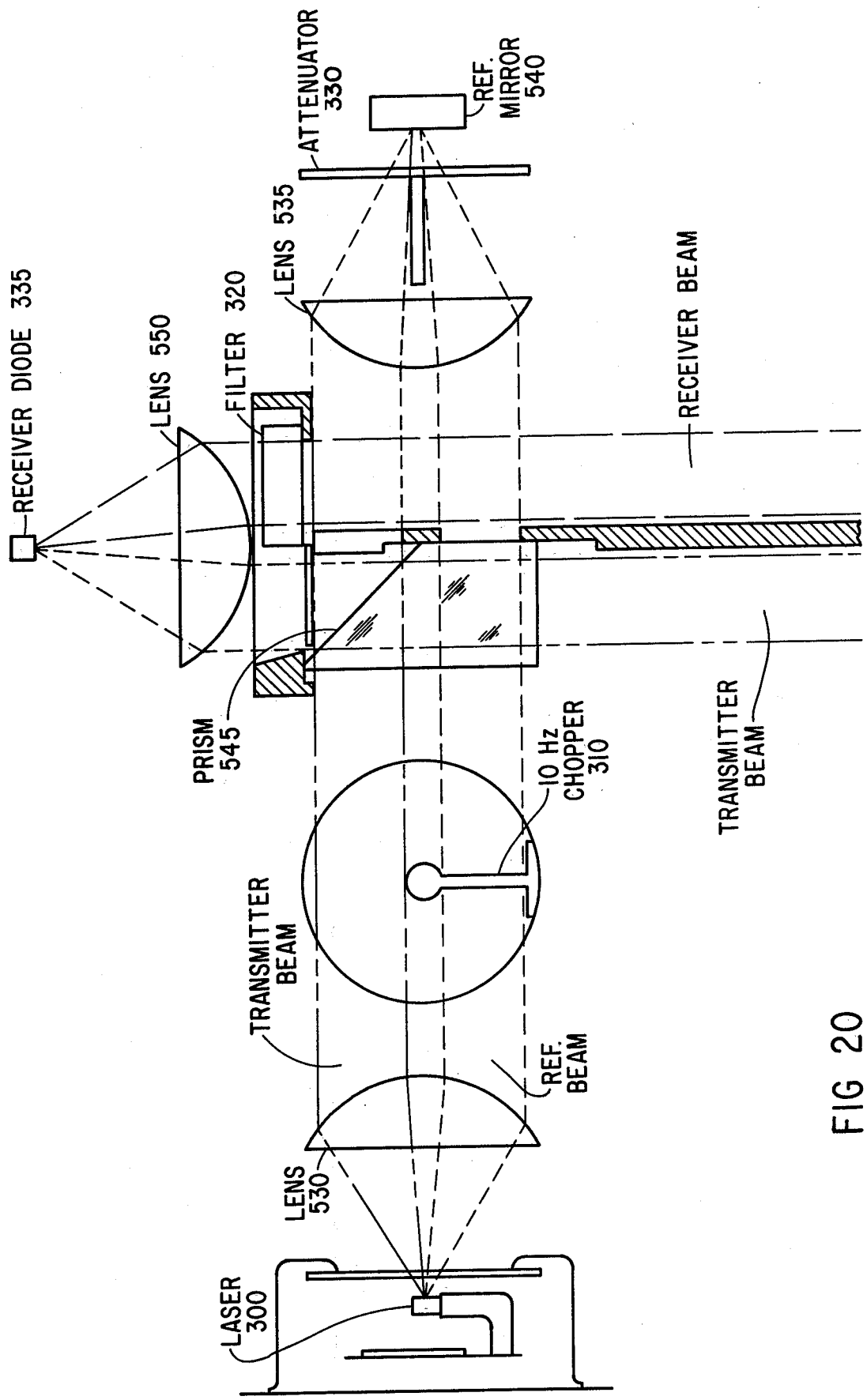
FIG. 20 is an illustration of transmitter and receiver optics of the distance module of FIG. 15.
Figure 21:
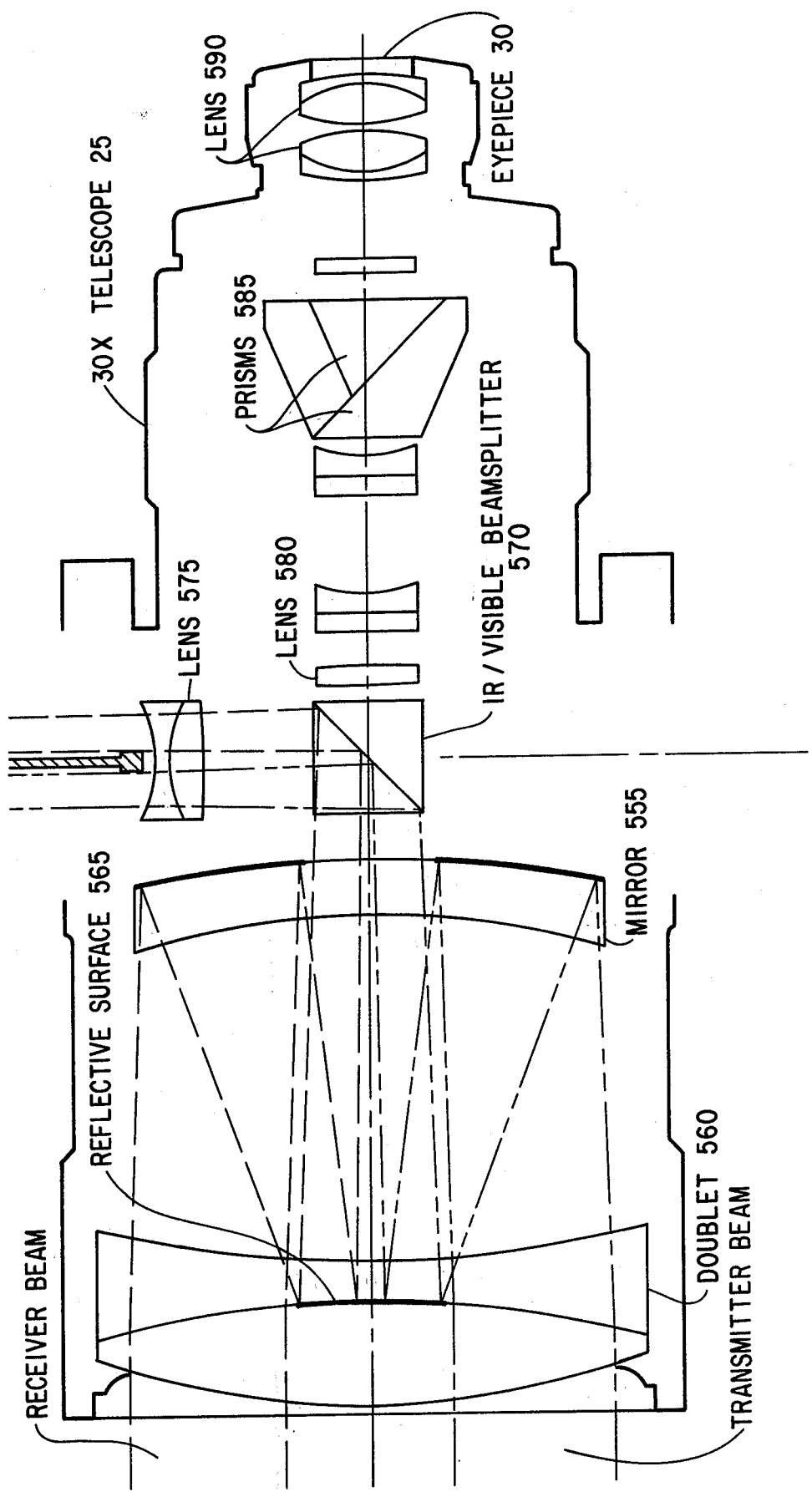
FIG. 21 is an illustration of telescope optics of the distance module of FIG. 15.

The optics incorporated in the distance measuring module are illustrated in FIGS. 20 and 21. Referring to FIG. 20, a beam of light is emitted from laser 300 and collimated by lens 530. Chopper 310 alternately interrupts the internal and the external beams so that only one of the beams arrives at receiver diode 335 at a time. The beams are split into a reference beam and a transmitted beam by prism 545. The reference beam is focused by lens 535 upon mirror 540, recollimated by lens 535, reflected from the back surface of prism 545, and focused by lens 550 upon the receiver diode 335. The transmitted beam from chopper 310 is reflected off the front surface of reflector 545. This beam is collimated and will exist side by side with the collimated received beam which passes through filter 320 and is focused by lens 550 upon the receiver diode 335. The side by side existence of the collimated transmitted and received beams allows this assembly to be interfaced conveniently with telescopes having various powers. The present 30x power telescope 25, illustrated in FIG. 21, comprises two spherical components. The second surface mirror 555, also called a Mangin mirror, is the main power of the telescope. A slightly negative lens elements on the second surface mirror 555 is used to correct for spherical abberation from the spherical reflective surface. Doublet 560 is a convergent meniscus lens comprising a biconvex element and a biconcave element, the biconcave element facing the second-surface mirror 555, both elements made out of material having the same index of refraction. The primary function of the doublet 560 is to correct for coma (off-axis) abberations. The doublet 560 has a reflective surface 565 interposed between the lens elements. The doublet has a slightly positive power. This slightly positive power provides color correction for the negative refraction power associated with the second surface mirror 555. Since the main power of the telescope is in the mirrors, and very little power is in the glass lenses, there is no significant color abberation. The side by side transmitted receiver beam is reflected off the beam splitter 570. A negative lens 575 collimates the beams for interface with the optics of FIG. 20. The beam splitter 570 allows a significant portion of the optical wave lengths to pass through there and eventually into the operator eyepiece 30. A small positive lens 580 increases the focusing range and allows the telescope to be focused to 5 meters. The prisms 585 are used to revert and invert the image. Since the field of view is 1.5°, and the power of the telescope 30x, the field of view at the eyepiece is 45°. This requires the use of two doublets 570 in the eyepiece to obtain sufficient off-axis correction thus keeping the entire field in focus. The use of the concave Mangin mirror having negative refraction element and the slightly positive convergent meniscus lens provides a short telescope having good spherical, color and coma correction, and having a large aperture. All of the optical surfaces are spherical which provides a simple to manufacture device as well.

The telescope is gimbaled so as to have a "plunging" capability. This refers to rotating the telescope through vertical to a position 180° horizontally from a first position without moving the horizontal shaft. This allows an operator to take two sights, forward and back, from a single position and thereby compensate for any eccentricity in the vertical gimbal of the theodolite. This technique provides for every high angular resolution when combined with the present instrument. This feature is combined with dual keyboards to allow the operator to control instrument sequences during both measurements.

DETAILED SEQUENCES

A complete listing of all the routines employed by the processor is given below. All of the routines are stored in the four quad-ROMs. Quad ROM 1 contains the keyboard and other general instructions. Quad Rom 2 contains sequences pertaining to the theodolite module. Quad ROM 3 contains sequences pertaining to the distance measuring module. Quad ROM 4 contains the self-test and service test routines. Each quad ROM is subdivided into four sections. The four sections of quad ROM 1 are designated 10, 11, 12, and 13. Designations of the other quad ROMs are similar. In the complete listing below, each section has 256 instructions identified by line number in the first column. The second column contains the octal address. The third column contains an optional address for branch instructions. The fourth column gives the binary bit pattern of the operation code. Column five gives an optional logical address name. Column six contains the logical pneumonic for the operation code. Column seven contains the logical address name associated with column three. Column eight contains relevant programmer comments. As discussed in the section entitled PROCESSOR AND DISPLAY, the instruction set is basically that described in the referenced patent issued to France Rode et al. In addition, a second set of input/output instructions is utilized. These are substantially as described as Instruction Set 2 in the referenced patent of Freddie W. Wenninger et al. A few changes have been made to this instruction set in the present embodiment. Specifically, certain instructions have been relabeled as TG1, TG2 . . . and LI0 etc. These control the "tiger" and "lion" lines for control of the present device. Other minor variations are explained by the relevant programmer comments below.

\*
\*
MODEL FIVE ASSEMBLER

```
LIN  CURR  BRAN  OPERATION CODE
 #   ADDR  ADDR   BIT PATTERN
  1  #,A,L
  2  0000  0362  1 111 001 101          JSB           PWRON   27 MAY 76
  3  0001        0 000 000 000          NOP
  4  0002  0031  0 001 100 111          BRN    LVLR   LEVEL REAR
  5  0003  0022  0 001 001 011          BRN    SIGR   SIG/PPM REAR
  6  0004        0 001 000 100          SS1           SL DIST REAR
  7  0005  0034  0 001 110 011          BRN    SDIS1
  8  0006        0 001 000 100          SS1           HOR DIST REAR
  9  0007  0077  0 011 111 111          BRN    HDIST
 10  0010        0 001 000 100          SS1           VER DIST REAR
 11  0011  0104  0 100 010 011          BRN    VDIST
 12  0012  0041  0 010 000 111          BRN    RANGR  REL DIR REAR
 13  0013  0130  0 101 100 011          BRN    TESTR  SELF TEST REAR
 14  0014        0 001 000 100          SS1           DIR REAR
 15  0015  0111  0 100 100 111          BRN    DANGL
 16  0016        0 001 000 100          SS1           ZEN REAR
 17  0017  0116  0 100 111 011          BRN    ZANGL
 18  0020        1 011 001 100  TRACK   PT11          TRACK
 19  0021  0143  0 110 001 111          BRN    RECAL
 20  0022        0 001 000 100  SIGR    SS1
 21  0023  0061  0 011 000 111          BRN    SIGPM
 22  0024        0 011 110 100  OUT     RSD1          OUTPUT
 23  0025  0211  1 000 100 011          LIO    421    BRN DROUT
 24  0026  0142  0 110 001 011          BRN    RECAL  RECALL
 25  0027        1 010 110 100  TSTLK   RGS1
 26  0030        1 000 010 000          ROM 4
 27  0031        0 001 000 100  LVLR    SS1
 28  0032  0060  0 011 011 011          BRN    LEVEL  LEVEL FRONT
 29  0033  0061  0 011 000 111          BRN    SIGPM  SIG/PPM FRONT
 30  0034        0 000 011 000  SDIS1   LDC0          SL DIST FRONT
 31  0035  0073  0 011 101 111          BRN    SDIST
 32  0036  0077  0 011 111 111          BRN    HDIST  HOR DIST FRONT
 33  0037        0 000 000 000          NOP
 34  0040  0104  0 100 010 011          BRN    VDIST  VER DIST FRONT
 35  0041        0 001 000 100  RANGR   SS1
 36  0042  0123  0 101 001 111          BRN    RANGL  REL DIR FRONT
 37  0043  0131  0 101 100 111          BRN    TEST   SELF TEST FRONT
 38  0044  0111  0 100 100 111          BRN    DANGL  DIR FRONT
 39  0045        0 000 000 000          NOP
 40  0046  0116  0 100 111 011          BRN    ZANGL  ZEN FRONT
 41  0047        0 000 000 000          NOP
 42  0050  0020  0 001 000 011          BRN    TRAC
 43  0051        1 010 110 100  TRMLK   RGS1          LINK TO TEST ROM
 44  0052        1 000 010 000          ROM 4
 45  0053        0 000 000 000          NOP
 46  0054  0024  0 001 010 011          BRN           OUT
 47  0055        0 000 000 000          NOP
 48  0056        0 011 001 110          W,ZTC
 49  0057        1 000 101 000          DSOF
 50  0060  0051  0 010 100 111          BRN    TRMLK
 51  0061        1 001 011 000  SIGPM   LDC9
 52  0062        0 001 011 000          LDC1
 53  0063        0 000 011 000          LDC0
 54  0064        0 001 011 000          LDC1
 55  0065  0155  0 110 110 111          BRN    INIT1
 56  0066        1 001 011 000  LEVEL   LDC9
```

MODEL FIVE ASSEMBLER - Continued

```
57  0067        0 000 011 000           LDC0
58  0070        0 000 011 000           LDC0
59  0071        0 010 011 000           LDC2
60  0072 0155  0 110 110 111           BRN    INIT1
61  0073        0 000 011 000  SDIST    LDC0
62  0074        0 000 011 000           LDC0
63  0075        0 011 011 000           LDC3
64  0076 0155  0 110 110 111           BRN    INIT1
65  0077        0 000 011 000  HDIST    LDC0
66  0100        0 001 011 000           LDC1
67  0101        0 000 011 000           LDC0
68  0102        0 100 011 000           LDC4
69  0103 0155  0 110 110 111           BRN    INIT1
70  0104        0 000 011 000  VDIST    LDC0
71  0105        1 001 011 000           LDC9
72  0106        0 000 011 000           LDC0
73  0107        0 101 011 000           LDC5
74  0110 0155  0 110 110 111           BRN    INIT1
75  0111        0 001 011 000  DANGL    LDC1
76  0112        0 001 011 000           LDC1
77  0113        0 000 011 000           LDC0
78  0114        0 110 011 000           LDC6
79  0115 0155  0 110 110 111           BRN    INIT1
80  0116        0 001 011 000  ZANGL    LDC1
81  0117        0 000 011 000           LDC0
82  0120        0 000 011 000           LDC0
83  0121        0 111 011 000           LDC7
84  0122 0155  0 110 110 111           BRN    INIT1
85  0123        0 001 011 000  RANGL    LDC1
86  0124        1 001 011 000           LDC9
87  0125        0 000 011 000           LDC0
88  0126        1 001 011 000           LDC9
89  0127 0155  0 110 110 111           BRN    INIT1
90  0130        0 001 000 100  TESTR    SS1              REAR
91  0131        1 001 011 000  TEST     LDC9
92  0132        1 001 011 000           LDC9
93  0133        0 000 011 000           LDC0
94  0134        1 000 011 000           LDC8
95  0135        0 011 010 010           WP,ZTC
96  0136        1 100 001 100           PT12             TST KBD SB
97  0137        0 000 011 000           LDC0
98  0140        0 000 000 000           NOP
99  0141 0172  0 111 101 011           BRN    INIT3
100 0142        1 010 001 100  RECAL    PT10
101 0143        0 011 001 110  RECA1    W,ZTC
102 0144        0 001 011 000           LDC1
103 0145        0 000 110 100  RECA2    CLS
104 0146        0 100 000 100           SS4              PREF
105 0147 0202  1 000 001 011           BRN    ANN00
106 0150        1 001 011 000  OUT1     LDC9
107 0151        0 011 010 010           WP,ZTC
108 0152        0 110 001 100           PT6
109 0153        1 000 011 000           LDC8
110 0154 0145  0 110 010 111           BRN    RECA2
111 0155        0 011 010 010  INIT1    WP,ZTC           COPY ANNUN
112 0156        0 110 001 100           PT6              IN DS ADR
113 0157        0 110 000 010           P,CTA
114 0160        0 100 001 110  INIT2    W,SLA
115 0161        0 000 111 100           PLS
116 0162        1 100 101 100           YP12
117 0163 0160  0 111 000 011           BRN    INIT2
118 0164        1 110 100 010           P,AXC            TRACK?
119 0165        1 011 001 100           PT11             NO
120 0166        0 110 100 010           P,ZMC
121 0167 0172  0 111 101 011           BRN    INIT3
122 0170        0 111 001 100           PT7              YES, LOAD 9
123 0171        1 001 011 000           LDC9             IN AUTO COMP
124 0172        0 011 001 100  INIT3    PT3
125 0173        0 001 010 100           YS1              REAR SB TO M
126 0174 0201  1 000 000 111           BRN    ANNON
127 0175        0 001 011 000           LDC1
128 0176        0 000 110 100           CLS
```

MODEL FIVE ASSEMBLER - Continued

```
129 0177        0 001 090 100           SS1
130 0200 0202   1 000 001 011           BRN    ANNO0
131 0201        0 000 110 100  ANNON    CLS
132 0202        0 110 001 110  ANNO0    W,CTA
133 0203        0 010 101 000           CXM
134 0204        0 011 110 100           RSD1
135 0205 0342   1 110 001 101           LIO    706    JSB EN2AR
136 0206        1 000 101 000           DSOF
137 0207        0 011 001 110           W,ZTC
138 0210        0 011 110 100           RSD1
139 0211 0350   1 110 100 101           LIO    722    JSB DS2AR
140 0212        0 011 110 100           RSD1
141 0213 0317   1 101 000 001           LIO    640    JSB DPSEL
142 0214        1 110 101 110           W,AXC
143 0215        1 001 001 110           W,SRC          SHIFT ANN
144 0216        1 001 001 110           W,SRC
145 0217        1 001 001 110           W,SRC
146 0220        0 011 110 100           RSD1
147 0221 0342   1 110 001 101           LIO    706    JSB EN2AR
148 0222        0 011 001 100           PT3
149 0223        0 101 100 010  ANNO1    P,CM1C         COPY ANNUN
150 0224 0223   1 001 001 111           BRN    ANNO1  IN 2AR
151 0225        0 011 100 010           P,ZNCC
152 0226        0 110 001 110           W,CTA
153 0227        0 011 001 110           W,ZTC          LOAD MASK
154 0230        0 101 101 110           W,CM1C
155 0231        0 111 010 100           YS7            POMSK
156 0232 0234   1 001 110 011           BRN    ANNO2
157 0233        1 100 001 100           PT12
158 0234        0 010 011 000  ANNO2    LDC2
159 0235        0 000 000 000           NOP
160 0236        1 000 101 110           W,BXC
161 0237        1 110 101 110           W,AXC
162 0240        0 110 001 110           W,CTA
163 0241        0 000 101 000           DSTO
164 0242        0 011 110 100           RSD1
165 0243 0350   1 110 100 101           LIO    722    JSB DS2AR
166 0244        0 100 010 100           YS4            PREF
167 0245 0251   1 010 100 111           BRN    ANNO3
168 0246        1 001 000 100           SS9            ZERDS
169 0247        0 011 110 100           RSD1
170 0250 0002   0 000 001 011           LIO    005    BRN KBDPE
171 0251        0 111 010 100  ANNO3    YS7            POMSK
172 0252 0255   1 010 110 111           BRN    ANNO4
173 0253        0 011 110 100           RSD1
174 0254 0001   0 000 000 111           LIO    003    BRN KBDLP
175 0255        1 010 101 000  ANNO4    MTC
176 0256        1 010 001 100           PT10
177 0257        0 110 100 010           P,ZMC          RECALL
178 0260 0325   1 101 010 111           BRN    ANNO7  NO
179 0261        0 011 000 010           P,ZTC          YES
180 0262        0 010 101 000           CXM            ZERO RECAL SB
181 0263        1 001 001 100           PT9
182 0264        0 111 100 010           P,CP1C         OTHER
183 0265 0301   1 100 000 111           BRN    ANNO5
184 0266        1 000 001 100           PT8
185 0267        0 111 100 010           P,CP1C         SELF TEST
186 0270 0301   1 100 000 111           BRN    ANNO5
187 0271        1 010 101 000           MTC            YES
188 0272        0 100 001 100           PT4            SET FLASH DP SB
189 0273        0 001 011 000           LDC1
190 0274        0 010 101 000           CXM
191 0275        0 101 000 100           SS5            SELF TEST
192 0276        0 001 000 100           SS1            OTHER
193 0277        0 101 110 100           RSD2
194 0300 0036   0 001 111 011           LIO    275    BRN ALL8S
195 0301        0 011 110 100  ANNO5    RSD1
196 0302 0356   1 110 111 101           LIO    716    JSB RECDS
197 0303        0 110 001 110           W,CTA
198 0304        1 010 101 000           MTC
199 0305        0 011 001 100           PT3
200 0306        1 001 100 010           P,AM1          HAS DATA BEEN
201 0307 0313   1 100 101 111           BRN    ANNO6  MEASURED
```

MODEL FIVE ASSEMBLER - Continued

```
202 0310           1 001 000 100         SS9               NO SET ZERDS
203 0311           0 101 110 100 LODLK   RSD2
204 0312 0276      1 011 111 011         LIO     575       BRN LODSP
205 0313           0 111 001 100 ANNO6   PT7
206 0314           1 110 110 010         W,AXC             TRANSFER STATUS
207 0315           0 110 010 010         W,CTA             FROM DATA TO
208 0316           0 100 010 010         W,SLA             M.REG
209 0317           0 100 010 010         W,SLA
210 0320           0 100 010 010         W,SLA
211 0321           1 110 110 010         W,AXC
212 0322           0 010 101 000         CXM
213 0323           0 101 110 100         RSD2
214 0324 0001      0 000 000 111         LIO     003       BRN UNCON
215 0325           1 001 100 100 ANNO7   RS9               ZERO DS 2345
216 0326           0 011 001 110 ANNO8   W,ZTC
217 0327           1 100 001 100         PT12
218 0330           0 010 011 000         LDC2
219 0331           0 110 011 000         LDC6
220 0332           0 110 001 110         W,CTA
221 0333 0335      1 101 110 111         BRN     ANNO9
222 0334 0326      1 101 011 011         BRN     ANNO8     FROM DIST.ABORT
223 0335           0 100 001 110 ANNO9   W,SLA
224 0336 0346      1 110 011 101         JSB     ZEDAS
225 0337           0 111 100 010         P,CP1C            ZERO DS 789
226 0340 0346      1 110 011 101         JSB     ZEDAS
227 0341           1 011 101 110         W,ZTA
228 0342           1 001 010 100         YS9               ZERDS
229 0343 0345      1 110 010 111         BRN     FUNLK
230 0344 0311      1 100 100 111         BRN     LODLK
231 0345           0 111 110 100 FUNLK   RSD3
232 0346 0170      0 111 100 011         LIO     361       BRN FUNBR
233 0347           0 000 101 110 ZEDAS   W,ZTB
234 0350           1 100 001 100         PT12
235 0351           1 001 110 000 ZEDA1   ATDS
236 0352           1 000 101 110         W,BXC
237 0353           1 011 110 000         DTDS
238 0354           1 000 101 110         W,BXC
239 0355           0 111 100 010         P,CP1C
240 0356 0360      1 111 000 011         BRN     ZEDA2
241 0357           0 000 110 000         RETURN
242 0360           1 111 100 010 ZEDA2   P,AP1A
243 0361 0351      1 110 100 111         BRN     ZEDA1
244 0362           0 000 110 000         RETURN
245 0363           0 000 110 100 PWRON   CLS
246 0364           1 110 101 000         CLR
247 0365 0346      1 110 011 101         JSB     ZEDAS     ZERO DATA
248 0366           0 011 110 100         RSD1              STORAGE
249 0367 0336      1 101 111 101         LIO     676       JSB LVLON
250 0370           1 001 000 100         SS9               ZERDS
251 0371           0 111 000 100         SS7               POMSK
252 0372 0202      1 000 001 011         BRN     ANNOO
253 0373           0 000 000 000         NOP
254 0374           1 010 110 100         RGS1              FROM TRKTST
255 0375 0035      0 001 110 111         LIO     073       BRN DIST2
256 0376           0 000 000 000         NOP
257 0377 0362      1 111 001 101         JSB     PWRON
258 END
```

*BER 11  8-6-76*

```
LIN CURR BRAN  OPERATION CODE
 #  ADDR ADDR  BIT PATTERN
 1  #,A,L
 2  0000 0375  1 111 111 001         JSB     PW011     27 MAY 76
 3  0001       0 100 100 100 KBDLP   RS4               PREF
 4  0002       0 111 000 100 KBDPE   SS7               5CYCL
 5  0003       0 101 000 000         IS2
 6  0004 0044  0 010 010 011         LIO     111
 7  0005       1 000 100 000         TG4               RESET SELF TEST
 8  0006       0 110 100 000         TG3               RESET EEAR FLAG
 9  0007 0004  0 000 010 011         LIO     011       RESET PD&PC
10  0010       0 100 100 000         TG2
11  0011       1 001 000 000         IS1
```

MODEL FIVE ASSEMBLER - Continued

```
12 0012        1 010 101 000           MTC              SET 30SEC DSPTO
13 0013        0 011 001 010           X,ZTC            CTR
14 0014        0 010 001 100           PT2
15 0015        0 110 011 000           LDC6
16 0016        0 101 100 100           RS5              DSPTO
17 0017 0136   0 101 111 011           BRN      KBD18
18 0020        0 110 000 100  KBDL1    SS6              ROM 1
19 0021        0 111 110 100           RSD3
20 0022 0327   1 101 100 001           LIO      660     JSB EF1ST
21 0023        0 101 000 000           IS2
22 0024        0 000 100 000           TG0              ENABLE AGC
23 0025        1 001 000 000           IS1
24 0026        0 011 001 010           X,ZTC
25 0027        0 001 001 100           PT1
26 0030        0 101 011 000           LDC5
27 0031        0 101 101 010  KBDL2    X,CM1C           WAIT 30MS
28 0032 0031   0 001 100 111           BRN      KDL2
29 0033        0 101 000 000           IS2
30 0034        1 000 100 000           TG4              DISABLE AGC
31 0035        1 001 000 000           IS1
32 0036 0273   1 011 110 001           JSB      KEYDN
33 0037        1 011 010 100           YS11             KEY DOWN?
34 0040 0047   0 010 011 111           BRN      KBDL3
35 0041        0 001 100 100  TKRA     RS1              REAR
36 0042        1 010 100 100           RS10             KHBU
37 0043        1 010 101 000           MTC
38 0044        1 001 001 100           PT9
39 0045        0 001 110 100           RSD0
40 0046        0 011 010 000           TKRA
41 0047        1 010 101 000  KBDL3    MTC
42 0050        0 000 001 100           PT0
43 0051        0 001 100 010           P,CM1            5 CYCLE CTR
44 0052 0135   0 101 110 111           BRN      KBD17
45 0053        0 111 010 100           YS7              5CYCL
46 0054 0061   0 011 000 111           BRN      KBDL5
47 0055        0 001 000 100           SS1              REAR
48 0056        0 111 100 100           RS7              5CYCL
49 0057        1 011 000 100           SS11             TO TURN ON LVLT
50 0060 0070   0 011 100 011           BRN      KBDL6   REAR
51 0061        0 001 100 100  KBDL5    RS1              5CYCL
52 0062        0 111 000 100           SS7
53 0063        0 101 000 000           IS2
54 0064 0002   0 000 001 101           LIO      006     TURN ON BETA
55 0065        1 001 000 000           IS1
56 0066        0 111 110 100           RSD3
57 0067 0346   1 110 011 101           LIO      716     JSB LVRT
58 0070        0 101 010 100  KBDL6    YS5              DSPTO
59 0071 0073   0 011 101 111           BRN      KBDL7
60 0072 0126   0 101 011 011           BRN      KBD15
61 0073        0 001 101 010  KBDL7    X,CM1            DSPTO CTR ZERO
62 0074 0102   0 100 001 011           BRN      KBDL8   NO
63 0075        0 010 101 000           CXM              YES
64 0076        1 000 101 000           DSOF
65 0077        0 101 000 100           SS5              DSPTO
66 0100 0317   1 101 000 001           JSB      DPSEL   TURN OFF DS DVR
67 0101 0126   0 101 011 011           BRN      KD15
68 0102 0342   1 110 001 101  KBDL8    JSB      EN2AR
69 0103        0 100 010 100           YS4              PREF?
70 0104 0110   0 100 100 011           BRN      KDL9    NO
71 0105        1 000 101 000           DSOF             YES
72 0106 0317   1 101 000 001           JSB      DPSEL   ALTERNATE DISP
73 0107 0124   0 101 010 011           BRN      KBD12
74 0110        0 100 001 100  KBDL9    PT4
75 0111        0 110 100 010           P,ZMC            FLASH DISP?
76 0112 0125   0 101 010 111           BRN      KD13    NO
77 0113        0 111 100 010           P,CP1C           YES FLASH ANN?
78 0114 0124   0 101 010 011           BRN      KD12    NO
79 0115        0 011 001 100           PT3              YES
80 0116        0 011 000 010           P,ZTC            FLASH ANNUN
81 0117        0 111 010 100           YS7              5CYCL
82 0120 0122   0 101 001 011           BRN      KBD11
83 0121        0 101 100 010           P,CM1C
84 0122        1 000 100 010  KBD11    P,BXC
```

MODEL FIVE ASSEMBLER - Continued

```
 85 0123        1 000 101 000            DSOF
 86 0124        0 000 101 000 KBD12      DSTO
 87 0125 0350  1 110 100 101 KBD13      JSB     DS2AR
 88 0126        1 011 010 100 KBD15      YS11             LEVEL LITE ON
 89 0127 0132  0 101 101 011             BRN     KBD16    NO
 90 0130 0336  1 101 111 101             JSB     LVLON    YES
 91 0131 0135  0 101 110 111             BRN     KBD17
 92 0132        0 101 000 000 KBD16      IS2
 93 0133 0104  0 100 010 011             LIO     211
 94 0134        1 001 000 000             IS1
 95 0135        1 010 101 000 KBD17      MTC              DECREMENT
 96 0136        0 101 101 010 KBD18      X,CM1C           TIMING CTR
 97 0137        0 101 101 010             X,CM1C
 98 0140        0 010 101 000             CXM
 99 0141        1 001 010 100             YS9              ZEROS
100 0142 0144  0 110 010 011             BRN     KBD19    NO
101 0143 0020  0 001 000 011             BRN     KBDL1    YES
102 0144        1 011 100 100 KBD19      RS11
103 0145        1 001 001 100             PT9              INTEROGATE UNIT
104 0146        0 110 100 010             P,ZMC            SWITCH
105 0147 0152  0 110 101 011             BRN     KBD20
106 0150        1 010 100 000             TG5              DEG-GRD SW
107 0151 0153  0 110 101 111             BRN     KBD21
108 0152        1 100 100 000 KBD20      TG6              FT-MTR SW
109 0153        0 111 100 010 KBD21      P,CP1C           OTHER?
110 0154 0161  0 111 000 111             BRN     KBD22    NO
111 0155        1 000 001 100             PT8              YES
112 0156        0 110 100 010             P,ZMC            LEVEL?
113 0157 0161  0 111 000 111             BRN     KBD22    YES
114 0160 0020  0 001 000 011             BRN     KBDL1    NO
115 0161        0 101 001 100 KBD22      PT5
116 0162        0 110 100 010             P,ZMC            METRIC?
117 0163 0166  0 111 011 011             BRN     KBD23    YES
118 0164        0 111 100 010             P,CP1C           MAYBE
119 0165 0171  0 111 100 111             BRN     KBD24    NO
120 0166        1 011 010 100 KBD23      YS11
121 0167 0020  0 001 000 011             BRN     KBDL1
122 0170 0174  0 111 110 011             BRN     KBD25
123 0171        1 011 010 100 KBD24      YS11
124 0172 0174  0 111 110 011             BRN     KBD25
125 0173 0020  0 001 000 011             BRN     KBDL1
126 0174 0356  1 110 111 101 KBD25      JSB     RECD9
127 0175        0 110 001 110             W,CTA
128 0176        0 101 110 100             RSD2
129 0177 0001  0 000 000 111             LIO     001      BRN UNCON
130 0200 0350  1 110 100 101 TRKTS      JSB     DS1AR
131 0201        1 110 101 110             W,AXC
132 0202        1 010 101 000             MTC              PTR AT 11
133 0203        0 110 100 010             P,ZMC            TRACK ?
134 0204 0001  0 000 000 111             BRN     KBDLP    NO
135 0205        0 111 100 010             P,CP1C           YES, TRACK OUT?
136 0206 0245  1 010 010 111             BRN     TRKT1    NO
137 0207 0215  1 000 110 111             BRN     DAOU0    YES
138 0210        1 011 001 100 DAOUT     PT11
139 0211        0 110 100 010             P,ZMC            TRACK?
140 0212 0215  1 000 110 111             BRN     DAOU0    NO
141 0213        0 001 110 100             RSD0             YES
142 0214 0150  0 110 100 011             LIO     321      BRN OUT1
143 0215        0 110 000 100 DAOU0     SS6
144 0216 0342  1 110 001 101             JSB     EN2AR
145 0217        1 000 101 000             DSOF
146 0220        1 110 101 110             W,AXC            DATA TO C
147 0221        0 110 001 110             W,CTA
148 0222 0350  1 110 100 101             JSB     DS2AR
149 0223        0 101 000 000             IS2
150 0224 0044  0 010 010 011             LIO     111
151 0225        1 110 100 000             TG7              SET BEAR FLAG
152 0226        1 001 000 000             IS1
153 0227        0 011 100 100             RS3              PERIF RDY FLAG
154 0230        0 011 010 100 DAOU1     YS3
155 0231 0230  1 001 100 011             BRN     DAOU1
156 0232        0 101 000 000             IS2
157 0233        1 100 100 000             TG6              OUTPUT DATA
```

MODEL FIVE ASSEMBLER - Continued

```
158 0234        0 000 000 000              NOP              WAIT ONE INST
159 0235        0 110 100 000              TG3              RESET BEAR FLAG
160 0236 0004   0 000 010 011              LIO      011
161 0237        1 001 000 000              IS1
162 0240        1 010 101 000              MTC
163 0241        1 011 001 100              PT11
164 0242        0 110 100 010              P,ZMC            TRACK?
165 0243 0266   1 011 011 011              BRN      TRKT5
166 0244        0 000 101 000              DST0
167 0245 0273   1 011 110 001 TRKT1        JSB      KEYDN   YES
168 0246        1 011 010 100              YS11
169 0247 0255   1 010 110 111              BRN      TRKT3
170 0250        1 010 101 000 TRKT2        MTC              CLEAR TRACK SB
171 0251        1 011 001 100              PT11
172 0252        0 011 000 010              P,ZTC
173 0253        0 010 101 000              CXM
174 0254 0041   0 010 000 111              BRN      TFRA
175 0255        0 001 100 100 TRKT3        RS1              LF
176 0256        1 001 001 100              PT9
177 0257        0 001 100 010              P,CM1            DIST
178 0260 0264   1 011 010 011              BRN      TRKT4   NO
179 0261        0 010 010 100              YS2              YES. HF
180 0262 0264   1 011 010 011              BRN      TRKT4
181 0263 0373   1 111 101 111              BRN      TBLK
182 0264        0 111 110 100 TRKT4        RSD3
183 0265 0170   0 111 100 011              LIO      SE1     BRN FUNBR
184 0266        0 011 001 110 TRKT5        W,ZTC
185 0267        0 111 100 110              M,CP1C
186 0270        0 101 101 110 TRKT6        W,CM1C           WAIT 600MS
187 0271 0270   1 011 100 011              BRN      TRKT6
188 0272        0 000 101 000              DST0
189 0273 0001   0 000 000 111              BRN      KBDLP
190 0274        1 011 100 100 KEYDN        RS11
191 0275        1 010 010 100              YS10             KHBU?
192 0276 0303   1 100 001 111              BRN      KEYD2   NO
193 0277        0 000 010 100              YS0              KEY DOWN ?
194 0300 0302   1 100 001 011              BRN      KEYD1   NO
195 0301        1 011 000 100              SS11             YES
196 0302        0 000 110 000 KEYD1        RETURN
197 0303        0 000 100 100 KEYD2        RS0
198 0304        0 000 010 100              YS0
199 0305 0307   1 100 011 111              BRN      KEYD3
200 0306        0 000 110 000              RETURN
201 0307        1 100 001 100 KEYD3        PT12
202 0310        0 000 011 100 KEYD4        PRS
203 0311        1 100 101 100              YP12
204 0312 0310   1 100 100 011              BRN      KEYD4
205 0313        0 000 010 100              YS0
206 0314 0316   1 100 111 011              BRN      KEYD5
207 0315        0 000 110 000              RETURN
208 0316        1 010 000 100 KEYD5        SS10
209 0317        0 000 110 000              RETURN
210 0320        0 101 000 000 DPSEL        IS2
211 0321 0044   0 010 010 011              LIO      111
212 0322        0 000 100 000              TG0
213 0323        1 001 000 000              IS1
214 0324        0 101 010 100              YS5              DSPT0?
215 0325 0327   1 101 011 111              BRN      DPSE1   NO
216 0326 0337   1 101 111 111              BRN      LVLON   YES
217 0327        0 001 010 100 DPSE1        YS1              REAR ?
218 0330 0335   1 101 110 111              BRN      DPSE2   NO
219 0331        0 101 000 000              IS2              YES
220 0332        0 010 100 000              TG1
221 0333        1 001 000 000              IS1
222 0334 0337   1 101 111 111              BRN      LVLON
223 0335        0 101 000 000 DPSE2        IS2
224 0336        0 100 100 000              TG2
225 0337        0 101 000 000 LVLON        IS2
226 0340 0004   0 000 010 011              LIO      011
227 0341        1 001 000 000              IS1
228 0342 0363   1 111 001 111              BRN      FTDC
229 0343        0 101 000 000 EN2AR        IS2
230 0344        1 100 100 000              TG6
```

MODEL FIVE ASSEMBLER - Continued

```
231 0345        1 000 100 000           TG4
232 0346        1 010 100 000           TG5
233 0347        1 001 000 000           IS1
234 0350 0363   1 111 001 111           BRN      RETDC
235 0351        0 101 000 000  DS2AR    IS2
236 0352        1 100 100 000           TG6
237 0353        0 110 100 000           TG3
238 0354        1 010 100 000           TG5
239 0355        1 001 000 000           IS1
240 0356 0363   1 111 001 111           BRN      RETDC
241 0357        0 011 001 010  RECDS    X,ZTC
242 0360        1 001 110 000           ATDS
243 0361        0 000 000 000           NOP
244 0362        1 011 111 000           DSTC
245 0363        0 110 010 100  RETDC    YS6               ROM 1 ?
246 0364 0366   1 111 011 011           BRN      RETD1    NO
247 0365        0 000 110 000           RETURN            YES
248 0366        1 000 010 100  RETD1    YS8               ROM 2 ?
249 0367 0374   1 111 110 011           BRN      RETD2    NO
250 0370        0 101 110 100           RSD2              YES
251 0371        0 000 110 000           RETURN
252 0372 0250   1 010 100 011           BRN      TRKT2    FROM DIST
253 0373        0 000 010 000  TDSLK    ROM 0             TRK DIST RET
254 0374        0 001 110 100  RETD2    RSD0
255 0375        0 000 110 000           RETURN
256 0376        0 001 110 100  PWO11    RSD0
257 0377 0362   1 111 001 101           LIO      746      JSB PWRON
258 END
```

BER 12    8-6-76

```
LIN CURR BRAN OPERATION CODE
 #  ADDR ADDR  BIT PATTERN
  1 #,A,L
  2 0000 0375 1 111 111 001           JSB      PWO12    27 MAY 76
  3 0001      0 111 100 100  UNCON    RS7               LVDN LEVEL VDNG
  4 0002      1 001 100 100           RS9               ZERDS
  5 0003      0 001 100 100           RS1               OTHER
  6 0004      0 101 100 100           RS5               SELF TEST
  7 0005      0 100 100 100           RS4               TRNON TRK NONMT
  8 0006      1 011 100 100           RS11
  9 0007      1 010 101 000           MTC               ZERO UNITS SB
 10 0010      1 001 001 100           PT9
 11 0011      0 110 100 010           P,ZMC             DIST?
 12 0012 0201 1 000 000 111           BRN      UC14     YES
 13 0013      0 101 001 100           PT5               NO
 14 0014      0 011 000 010           P,ZTC
 15 0015      1 010 100 000           TG5               DEG-GRD SW
 16 0016      1 011 010 100           YS11
 17 0017 0022 0 001 001 011           BRN      UNC01
 18 0020      0 010 011 000           LDC2
 19 0021      0 100 000 100           SS4               NON METRIC
 20 0022      0 010 101 000  UNC01    CXM               DIST
 21 0023      0 010 100 100           RS2               DIST
 22 0024      1 001 001 100           PT9
 23 0025      0 111 100 010           P,CP1C            OTHER?
 24 0026 0110 0 100 100 011           BRN      UNC06    NO
 25 0027      0 001 000 100           SS1               YES. OTHER.
 26 0030      1 000 001 100           PT8
 27 0031      0 110 100 010           P,ZMC             LEVEL ?
 28 0032 0046 0 010 011 011           BRN      UNC03    YES
 29 0033      0 111 100 010           P,CP1C            NO. SELF TST ?
 30 0034 0276 1 011 111 011           BRN      LODSP    NO
 31 0035      0 101 000 100           SS5               YES. SELF TEST
 32 0036      0 011 001 110  ALL8S    W,ZTC
 33 0037      1 100 001 100           PT12
 34 0040      1 000 011 000           LDC8
 35 0041      1 000 011 000  UNC02    LDC8
 36 0042      0 010 101 100           YP2
 37 0043 0041 0 010 000 111           BRN      UNC02
 38 0044      0 110 001 110           W,CTA
 39 0045 0276 1 011 111 011           BRN      LODSP
```

MODEL FIVE ASSEMBLER - Continued

```
40 0046        0 111 000 100 UNC03    SS7              LEVEL LVDN
41 0047        1 010 101 000          MTC
42 0050        0 010 001 100          PT2
43 0051        1 111 100 010          P,AP1A           BETA NEG ?
44 0052 0056   0 010 111 011          BRN     UNC04    NO
45 0053        0 101 001 100          PT5              YES
46 0054        0 101 100 010          P,CM1C           CORRECT UNITS
47 0055        0 010 101 000          CXM              SB
48 0056        1 011 000 110 UNC04    M,SRA            CONVERT LEVEL
49 0057        0 111 001 100          PT7              TO SECONDS
50 0060        1 011 010 010          WP,SRA
51 0061        1 011 101 010          X,ZTA            ZERO STATUS
52 0062        0 100 010 100          YS4              NON METRIC TRIM
53 0063 0103   0 100 001 111          BRN     UNC05
54 0064        0 100 111 110          S,ATB
55 0065        1 011 111 110          S,ZTA
56 0066        1 011 010 010          WP,SRA
57 0067        1 011 010 010          WP,SRA
58 0070 0370   1 111 100 101          JSB     MPT9
59 0071 0360   1 111 000 101          JSB     MPY6
60 0072 0360   1 111 000 101          JSB     MPY6
61 0073        0 011 001 110          W,ZTC
62 0074        0 110 001 100          PT6
63 0075        1 110 110 010          WP,AXC
64 0076        1 011 001 110          W,SRA
65 0077        1 011 001 110          W,SRA
66 0100        0 111 001 100          PT7
67 0101        0 110 010 010          WP,CTA
68 0102        1 100 111 110          S,AXB
69 0103        0 011 001 110 UNC05    W,ZTC
70 0104        1 000 001 100          PT8
71 0105        0 101 011 000          LDC5
72 0106        0 011 001 100          PT3
73 0107 0273   1 011 101 111          BRN     UNC21
74 0110        0 100 010 100 UNC06    YS4              NON MET TRNOM
75 0111 0164   0 111 010 011          BRN     UNC11    NO
76 0112        0 100 001 100          PT4              ZERO STATUS
77 0113        1 011 110 010          WP,ZTA
78 0114 0370   1 111 100 101          JSB     MPT9     CONVERT ANGLE
79 0115        0 000 101 110          W,ZTB            TO DMS
80 0116        1 001 001 100          PT9
81 0117        1 100 110 010          WP,AXB
82 0120        1 100 101 110          W,AXB
83 0121        1 011 001 110          W,SRA
84 0122 0360   1 111 000 101          JSB     MPY6
85 0123        0 111 001 100          PT7
86 0124        1 100 110 010          WP,AXB
87 0125        1 001 001 100          PT9
88 0126        1 100 110 010          WP,AXB
89 0127        1 011 001 110          W,SRA
90 0130 0360   1 111 000 101          JSB     MPY6
91 0131        0 111 001 100          PT7
92 0132        1 100 110 010          WP,AXB
93 0133        1 100 101 110          W,AXB
94 0134        0 011 001 110          W,ZTC
95 0135        1 001 001 100          PT9
96 0136        0 100 011 000          LDC4
97 0137        0 000 011 000          LDC0
98 0140        0 100 011 000          LDC4
99 0141        0 000 011 000          LDC0
100 0142       0 101 011 000          LDC5
101 0143       1 011 001 110          W,APCA
102 0144       0 101 001 100          PT5
103 0145       0 011 010 010          WP,ZTC
104 0146       0 000 111 100 UNC08    PLS
105 0147       0 000 111 100          PLS
106 0150       0 001 010 010          WP,AMC
107 0151 0153  0 110 101 111          BRN     UNC09
108 0152       0 011 010 010          WP,ZTC
109 0153       1 001 101 100 UNC09    YP9
110 0154 0146  0 110 011 011          BRN     UNC08
111 0155       1 101 001 110          W,AMCA
112 0156       1 011 010 010          WP,SRA
```

MODEL FIVE ASSEMBLER - Continued

```
113 0157        0 011 001 110         W,ZTC
114 0160        1 100 001 100         PT12
115 0161        0 011 011 000         LDC3
116 0162        0 110 011 000         LDC6
117 0163 0174   0 111 110 011         BRN      UNC12
118 0164        0 011 001 110 UNC11   W,ZTC
119 0165        0 101 001 100         PT5
120 0166        0 101 011 000         LDC5
121 0167        1 111 001 110         W,APCA         ROUND ANGLE
122 0170        0 011 001 110         W,ZTC
123 0171        1 100 001 100         PT12
124 0172        0 100 011 000         LDC4
125 0173        0 000 000 000         NOP
126 0174        0 001 001 110 UNC12   W,AMC          SUBTRACT MODULO
127 0175 0177   0 111 111 111         BRN      UNC13
128 0176 0276   1 011 111 011         BRN      LODSP
129 0177        1 101 001 110 UNC13   W,AMCA
130 0200 0276   1 011 111 011         BRN      LODSP
131 0201        0 010 000 100 UNC14   SS2            DISTANCE
132 0202        0 111 001 100         PT7
133 0203        0 111 100 010         P,CP1C         TRACK ?
134 0204 0206   1 000 011 011         BRN      UNC15 NO
135 0205        0 100 000 100         SS4            YES. TRACK TRNM
136 0206        1 111 111 010 UNC15   XS,AP1A        VD NEG ?
137 0207 0211   1 000 100 111         BRN      UNC17 NO
138 0210        0 111 000 100         SS7            YES VD NEG LVDN
139 0211        1 011 001 110 UNC17   W,SRA
140 0212        1 010 101 000         MTC
141 0213        0 101 001 100         PT5
142 0214        0 011 000 010         P,ZTC
143 0215        0 010 101 000         CXM
144 0216        1 100 100 000         TG6            FT-MTR SW
145 0217        1 011 010 100         YS11           NON METRIC?
146 0220 0260   1 011 000 011         BRN      UNC19 NO
147 0221        0 010 011 000         LDC2           YES
148 0222        0 010 101 000         CXM            CONVERT DISTANC
149 0223        0 011 001 100         PT3
150 0224        1 011 110 010         WP,ZTA         ZERO STATUS
151 0225        1 110 101 110         W,AXC
152 0226        0 110 001 110         W,CTA
153 0227        1 010 101 110         W,CPCC
154 0230        1 000 101 110         W,BXC
155 0231        0 010 001 110         W,BTC
156 0232        1 010 101 110         W,CPCC
157 0233        1 010 101 110         W,CPCC
158 0234        1 000 101 110         W,BXC
159 0235        0 100 101 000         CTS
160 0236        0 111 001 110         W,APCC
161 0237        0 110 001 110         W,CTA
162 0240        1 011 001 110 UNC18   W,SRA
163 0241        1 111 001 110         W,APCA
164 0242        0 000 011 100         PRS
165 0243        1 110 101 100         YP14
166 0244 0240   1 010 000 011         BRN      UNC18
167 0245        1 011 001 110         W,SRA
168 0246        1 110 001 110         W,APBA
169 0247        1 011 001 110         W,SRA
170 0250        1 011 001 110         W,SRA
171 0251        1 110 001 110         W,APBA
172 0252        1 011 001 110         W,SRA
173 0253        1 000 101 110         W,BXC
174 0254        1 100 101 000         DNR
175 0255        1 111 001 110         W,APCA
176 0256        1 011 001 110         W,SRA
177 0257        1 110 001 110         W,APBA
178 0260        1 011 111 110 UNC19   S,ZTA
179 0261        0 111 010 100         YS7            VDNEG LVDN
180 0262 0266   1 011 011 011         BRN      UNC20 NO
181 0263        1 101 111 110         S,AM1A         YES
182 0264        1 100 001 100         PT12
183 0265        1 011 100 010         P,ZTA
184 0266        0 011 001 110 UNC20   W,ZTC
185 0267        0 100 001 100         PT4
```

MODEL FIVE ASSEMBLER - Continued

```
186 0270      0 100 010 100           YS4              TRACK
187 0271 0273 1 011 101 111           BRN    UNC21
188 0272      0 101 001 100           PT5
189 0273      0 101 011 000  UNC21    LDC5
190 0274      0 000 000 000           NOP
191 0275      1 111 001 110           W,APCA
192 0276      0 110 100 100  LODSP    RS6              ROM 1
193 0277      1 000 000 100           SS8              ROM 2
194 0300      1 010 101 000           MTC
195 0301      1 001 001 110           W,SRC
196 0302      1 001 001 110           W,SRC
197 0303      1 001 001 110           W,SRC
198 0304      0 100 001 100           PT4
199 0305      0 001 010 100           YS1
200 0306 0310 1 100 100 011           BRN    LODS2
201 0307      0 011 001 100           PT3
202 0310      0 110 010 010  LODS2    WP,CTA
203 0311      0 011 110 100           RSD1
204 0312 0342 1 110 001 101           LIO    706       JSB EN2AR
205 0313      0 011 001 110           W,ZTC            BLANK
206 0314      0 101 101 110           W,CM1C           ANNUN
207 0315      0 011 001 100           PT3
208 0316      0 010 011 000           LDC2
209 0317      1 000 101 110           W,BXC
210 0320      1 100 001 100           PT12
211 0321      0 011 001 110           W,ZTC
212 0322      1 001 010 100           YS9              ZERDS
213 0323 0357 1 110 111 111           BRN    LODLK
214 0324      0 010 001 110           W,BTC
215 0325      0 011 000 010           P,ZTC
216 0326      0 100 101 000  LODS1    CTS
217 0327      0 011 001 110           W,ZTC
218 0330      0 011 110 100           RSD1
219 0331 0350 1 110 100 101           LIO    722       JSB DS2AR
220 0332      1 110 101 110           W,AXC
221 0333      0 110 001 110           W,CTA            FOR ZERDS IN
222 0334      0 011 110 100           RSD1             OUTPUT SR
223 0335 0342 1 110 001 101           LIO    706       JSB EN2AR
224 0336      1 101 001 100           PT13             COPY DATA INTO
225 0337      0 101 100 010  LODS3    P,CM1C           2AR
226 0340 0337 1 101 111 111           BRN    LODS3
227 0341      0 000 011 100           PRS
228 0342      1 111 101 100           YP15
229 0343 0337 1 101 111 111           BRN    LODS3
230 0344      1 000 101 000           DSOF
231 0345      0 011 101 110           W,ZNCC
232 0346      1 000 101 110           W,BXC
233 0347      1 100 101 000           DNR              RECALL MASK
234 0350      1 000 101 110           W,BXC
235 0351      1 110 101 110           W,AXC
236 0352      0 000 101 000           DSTO
237 0353      0 110 000 100           SS6              ROM 1
238 0354      1 011 001 100           PT11
239 0355      0 011 110 100           RSD1
240 0356 0200 1 000 000 011           LIO    401       BRN TRKTS
241 0357      0 111 110 100  LODLK    RSD3
242 0360 0207 1 000 011 111           LIO    417       BRN LODS4
243 0361      1 110 101 110  MPY6     W,AXC
244 0362      1 010 101 110           W,CPCC
245 0363      0 110 001 110           W,CTA
246 0364      1 010 101 110           W,CPCC
247 0365      1 111 001 110           W,APCA
248 0366      0 000 110 000           RETURN
249 0367 0276 1 011 111 011           BRN    LODSP     FROM DIST
250 0370 0001 0 000 000 111           BRN    UNCON     FROM DIST
251 0371      1 110 101 110  MPT9     W,AXC
252 0372      0 110 001 110           W,CTA
253 0373      1 001 001 110           W,SRC
254 0374      1 101 001 110           W,AMCA
255 0375      0 000 110 000           RETURN
256 0376      0 001 110 100  PW012    RSD0
257 0377 0362 1 111 001 101           LIO    746       JSB PWRON
258 END
```

MODEL FIVE ASSEMBLER - Continued

BER13 8-6-76

```
LIN CURR BRAN OPERATION CODE
 #  ADDR ADDR  BIT PATTERN
 1  #,A,L
 2  0000 0375 1 111 111 001            JSB    PW013   11 MAY 76
 3  0001      0 011 001 110 PPMRS      W,ZTC          SELECT PPMRS
 4  0002      1 100 001 100            PT12           DATA STORAGE
 5  0003      0 111 100 010            P,CP1C         ADR
 6  0004      1 001 110 000            ATDS
 7  0005      0 101 000 000            IS2
 8  0006 0004 0 000 010 011            LIO    011
 9  0007      0 100 100 000            TG2            DISABLE PCPD
10  0010      1 001 000 000            IS1
11  0011      0 110 100 100            RS6            ROM 1
12  0012      1 010 101 000            MTC
13  0013      1 101 001 100            PT13
14  0014      0 011 011 000            LDC3
15  0015      0 000 000 000            NOP
16  0016      0 010 101 000            CXM
17  0017      1 001 001 100            PT9
18  0020      0 110 100 010            P,ZMC          DIST ?
19  0021 0026 0 001 011 011            BRN    PPMR1   YES
20  0022      0 000 000 000            NOP
21  0023      0 000 000 000            NOP
22  0024      0 000 000 000            NOP
23  0025 0036 0 001 111 011            BRN    PPM1A
24  0026      1 011 111 000 PPMR1      DSTC
25  0027      0 011 001 100            PT3            HAS PPM BEEN
26  0030      0 001 100 010            P,CM1          MEASURED ?
27  0031 0102 0 100 001 011            BRN    PPMR6   YES
28  0032      1 010 101 000            MTC            NO
29  0033      0 100 001 100            PT4            SET FLASH ANNUN
30  0034      1 001 011 000            LDC9           MREG SB
31  0035      0 010 101 000            CXM
32  0036 0277 1 100 000 001 PPM1A      JSB    PDPRA
33  0037      1 100 100 000            TG6            ECOSEN
34  0040 0360 1 111 000 101            JSB    ACRDY
35  0041      1 011 001 110            W,SRA
36  0042      1 011 001 110            W,SRA
37  0043      0 011 001 110            W,ZTC
38  0044      1 010 001 100            PT10           SET 500 AS
39  0045      0 101 011 000            LDC5           LOWER LIMIT
40  0046      1 101 001 110            W,AMCA
41  0047 0051 0 010 100 111            BRN    PPMR2
42  0050      1 011 101 110            W,ZTA
43  0051      1 011 001 100 PPMR2      PT11           SET 3600 AS
44  0052      0 011 011 000            LDC3           UPPER LIMIT
45  0053      0 110 011 000            LDC6
46  0054      1 110 001 110            W,AXC
47  0055      0 001 001 110            W,AMC
48  0056 0060 0 011 000 011            BRN    PPMR3
49  0057      1 110 101 110            W,AXC
50  0060      0 110 001 110 PPMR3      W,CTA          DIVIDE BY 2
51  0061      1 010 101 110            W,CPCC
52  0062      1 010 101 110            W,CPCC
53  0063      1 111 001 110            W,AFCA
54  0064      0 011 001 110            W,ZTC          ADJUST RANGE TO
55  0065      1 011 001 100            PT11           -70
56  0066      0 111 011 000            LDC7
57  0067      0 010 100 100            RS2            NEG
58  0070      0 001 001 110            W,AMC
59  0071 0074 0 011 110 011            BRN    PPMR4
60  0072      1 110 101 110            W,AXC
61  0073      0 010 000 100            SS2            NEG
62  0074      0 101 001 110 PPMR4      W,AMCC
63  0075      0 011 011 110            S,ZTC
64  0076      0 010 010 100            YS2            NEG
65  0077 0101 0 100 000 111            BRN    PPMR5
66  0100      0 101 111 110            S,CM1C
67  0101      1 011 110 000 PPMR5      DTDS           STORE PPM
68  0102 0277 1 100 000 001 PPMR6      JSB    PDPRA
69  0103      1 010 100 000            TG5
```

MODEL FIVE ASSEMBLER - Continued

```
 70 0104 0360 1 111 000 101         JSB    ACRDY
 71 0105      0 011 001 110         W,ZTC
 72 0106      1 011 001 110         W,SRA         DIVIDE RET ST
 73 0107      1 100 101 110         W,AXB         INTO 1
 74 0110      1 011 101 110         W,ZTA
 75 0111      1 011 001 100         PT11
 76 0112      1 111 100 010         P,AP1A
 77 0113 0115 0 100 110 111         BRN    PPMR8
 78 0114      0 111 100 010 PPMR7   P,CP1C
 79 0115      1 100 001 110 PPMR8   W,AMBA
 80 0116 0114 0 100 110 011         BRN    PPMR7
 81 0117      1 110 001 110         W,APBA
 82 0120      0 000 011 100         PRS
 83 0121      0 100 001 110         W,SLA
 84 0122      0 111 101 100         YP7
 85 0123 0115 0 100 110 111         BRN    PPMR8
 86 0124      0 110 001 110         W,CTA
 87 0125      0 011 001 110         W,ZTC
 88 0126      1 010 001 100         PT10
 89 0127      0 010 011 000         LDC2
 90 0130      0 101 001 110         W,AMCC
 91 0131 0133 0 101 101 111         BRN    PPM10
 92 0132      0 011 001 110         W,ZTC
 93 0133      1 010 101 110 PPM10   W,CPCC        MULTIPLY BY 20
 94 0134      0 000 000 000         NOP           SCALE FACTOR
 95 0135      0 110 001 110         W,CTA
 96 0136      0 011 001 110         W,ZTC
 97 0137      1 010 001 100         PT10
 98 0140      1 001 011 000         LDC9          SET 99 AS
 99 0141      1 001 011 000         LDC9          MAX RET ST
100 0142      0 001 001 110         W,AMC
101 0143 0145 0 110 010 111         BRN    PPM11
102 0144 0146 0 110 011 011         BRN    PPM12
103 0145      0 110 001 110 PPM11   W,CTA
104 0146      1 011 001 110 PPM12   W,SRA
105 0147      1 011 001 110         W,SRA
106 0150      1 011 001 110         W,SRA
107 0151      1 011 001 110         W,SRA
108 0152      1 011 001 110         W,SRA
109 0153      1 011 111 000         DSTC          RECALL PPM
110 0154      0 110 001 100         PT6
111 0155      1 110 110 010         WP,AXC        ADD RET ST
112 0156      0 011 001 100         PT3
113 0157      0 011 010 010         WP,ZTC        LOAD ANNUN
114 0160      0 111 100 010         P,CP1C
115 0161      1 011 110 000         DTDS          STORE PPMRS
116 0162      1 110 101 110         W,AXC
117 0163      1 010 101 000         MTC
118 0164      1 001 001 100         PT9
119 0165      0 110 100 010         P,ZMC         DIST ?
120 0166 0370 1 111 100 011         BRN    DISL2  YES
121 0167 0366 1 111 011 011         BRN    UNCLK
122 0170      1 010 101 000 FUNBR   MTC
123 0171      1 001 001 100         PT9
124 0172      0 110 100 010         P,ZMC         DIST ?
125 0173 0372 1 111 101 011         BRN    DISL1  YES
126 0174      0 111 100 010         P,CP1C        NO. OTHER?
127 0175 0205 1 000 010 111         BRN    FUNB1  NO
128 0176      1 000 001 100         PT8           YES
129 0177      0 110 100 010         P,ZMC         LEVEL
130 0200 0205 1 000 010 111         BRN    FUNB1  YES
131 0201      0 111 100 010         P,CP1C        NO. SELF TST ?
132 0202 0372 1 111 101 011         BRN    DISL1  NO. PPMRS DIST
133 0203      0 001 100 100         RSD0          YES
134 0204 0027 0 001 011 111         LIO    057    BRN TSTLK
135 0205      1 001 110 100 FUNB1   RSD4
136 0206 0001 0 000 000 111         LIO    003    BRN ANLYS
137 0207      0 101 010 100 LODS4   YS5           SELF TEST ?
138 0210 0212 1 000 101 011         BRN    LODS5  NO
139 0211 0250 1 010 100 011         BRN    LODS0  YES
140 0212      1 001 100 010 LODS5   P,AM1         BLANK LDG ZEROS
141 0213 0220 1 001 000 011         BRN    LODS6
142 0214      1 001 011 000         LDC9
```

MODEL FIVE ASSEMBLER - Continued

```
143 0215        0 000 000 000          NOP
144 0216        1 000 101 100          YP8
145 0217 0212   1 000 101 011          BRN     LODS5
146 0220        0 010 010 100  LODS6   YS2                DIST ?
147 0221 0226   1 001 011 011          BRN     LODS7      NO
148 0222        1 000 001 100          PT8                YES.
149 0223        0 100 010 100          YS4                TRACK?
150 0224 0270   1 011 100 011          BRN     LOD13      NO
151 0225 0265   1 011 010 111          BRN     LOD12      YES
152 0226        1 010 001 100  LODS7   PT10
153 0227        0 001 010 100          YS1                OTHER?
154 0230 0256   1 010 111 011          BRN     LOD11      NO
155 0231        0 000 011 000          LDC0
156 0232        1 001 011 000          LDC9
157 0233        1 001 011 000          LDC9
158 0234        0 111 010 100          YS7                LEVEL
159 0235 0243   1 010 001 111          BRN     LODS9
160 0236        1 011 001 100          PT11
161 0237        0 011 000 010          P,ZTC
162 0240        1 001 010 010          WP,SRC
163 0241        0 000 000 000          NOP
164 0242 0250   1 010 100 011          BRN     LOD10
165 0243        1 001 100 010  LODS9   P,AM1
166 0244 0250   1 010 100 011          BRN     LOD10
167 0245        1 001 011 000          LDC9
168 0246        0 100 101 100          YP4
169 0247 0243   1 010 001 111          BRN     LODS9
170 0250        0 011 001 100  LOD10   PT3
171 0251        0 010 011 000          LDC2
172 0252        0 101 110 010          WP,CM1C
173 0253        0 111 010 100          YS7                LEVEL ?
174 0254 0276   1 011 111 011          BRN     LOD16      NO
175 0255 0274   1 011 110 011          BRN     LOD15      YES
176 0256        0 011 010 010  LOD11   WP,ZTC
177 0257        0 100 010 100          YS4                NON METRIC
178 0260 0265   1 011 010 111          BRN     LOD12
179 0261        1 001 001 100          PT9
180 0262        1 001 011 000          LDC9
181 0263        0 111 001 100          PT7
182 0264 0270   1 011 100 011          BRN     LOD13
183 0265        0 010 011 000  LOD12   LDC2
184 0266        0 101 001 100          PT5
185 0267 0272   1 011 101 011          BRN     LOD14
186 0270        0 010 011 000  LOD13   LDC2
187 0271        0 100 001 100          PT4
188 0272        0 101 110 010  LOD14   WP,CM1C
189 0273        0 011 001 100          PT3
190 0274        0 011 000 010  LOD15   P,ZTC
191 0275        0 000 000 000          NOP
192 0276        0 101 110 100  LOD16   RSD2
193 0277 0326   1 101 011 011          LIO     255        BRN LODS1
194 0300        0 101 000 000  PDFRA   IS2
195 0301        1 110 100 000          TG7
196 0302        1 100 100 000          TG6
197 0303        1 110 100 000          TG7
198 0304        1 001 000 000          IS1
199 0305        0 000 110 000          RETURN
200 0306        1 010 101 000  RETD1   MTC
201 0307        0 101 111 110          S,CM1C
202 0310 0313   1 100 101 111          BRN     RETD2
203 0311        1 001 110 100          RSD4
204 0312        0 000 110 000          RETURN
205 0313        0 101 111 110  RETD2   S,CM1C
206 0314 0317   1 100 111 111          BRN     RETD3
207 0315        1 011 110 100          RSD5
208 0316        0 000 110 000          RETURN
209 0317        0 101 111 110  RETD3   S,CM1C
210 0320 0323   1 101 001 111          BRN     RETD4
211 0321        1 101 110 100          RSD6
212 0322        0 000 110 000          RETURN
213 0323        0 101 111 110  RETD4   S,CM1C
214 0324 0326   1 101 011 011          BRN     RETD5
215 0325        0 000 110 000          RETURN
```

MODEL FIVE ASSEMBLER - Continued

```
216 0326        1 111 110 100 RETD5   RSD7
217 0327        0 000 110 000         RETURN
218 0330        0 011 001 010 EF10T   X,ZTC
219 0331        0 001 001 100         PT1
220 0332        0 111 011 000         LDC7
221 0333        0 101 101 010 EF101   X,CN1C
222 0334 0336   1 101 111 011         BRN     EF102
223 0335 0355   1 110 110 111         BRN     RETDC
224 0336        1 011 100 100 EF102   RS11
225 0337        0 000 100 000         TG0
226 0340        1 011 010 100         YS11
227 0341 0344   1 110 010 011         BRN     EF103
228 0342        0 010 001 100         PT2
229 0343 0333   1 101 101 111         BRN     EF101
230 0344        0 010 101 100 EF103   YP2
231 0345 0333   1 101 101 111         BRN     EF101
232 0346 0355   1 110 110 111         BRN     RETDC
233 0347        0 100 001 100 LVRT    PT4
234 0350        0 000 011 100 LVR1    PRS              WAIT 4MS
235 0351        0 000 101 100         YP0
236 0352 0350   1 110 100 011         BRN     LVR1
237 0353        1 011 100 100         RS11
238 0354        1 000 100 000         TG4
239 0355        0 110 010 100 RETDC   YS6              ROM1
240 0356 0306   1 100 011 011         BRN     RETD1    NO
241 0357        0 011 110 100         RSD1             YES
242 0360        0 000 110 000         RETURN
243 0361        0 101 000 000 ACRDY   IS2
244 0362        1 010 100 000         TG5
245 0363        1 001 000 000         IS1
246 0364        1 111 110 100         RSD7
247 0365 0312   1 100 101 011         LIO     615      BRN INDFG
248 0366        0 101 110 100 UNCLK   RSD2
249 0367 0001   0 000 000 111         LIO     003
250 0370        1 010 110 100 DISL2   RGS1
251 0371        0 110 010 000         ROM 3
252 0372        1 010 110 100 DISL1   RGS1
253 0373        0 000 010 000         ROM 0
254 0374 0001   0 000 000 111         BRN     PPNRS    FROM DIST
255 0375        0 000 000 000         NOP
256 0376        0 001 110 100 PW013   RSD0
257 0377 0362   1 111 001 101         LIO     746      JSB PWRON
258 END
```

MODEL FIVE ASSEMBLER

BER 20  8-6-76

```
LIN CURR BRAN OPERATION CODE
 #  ADDR ADDR BIT PATTERN
 1  #,A,L
 2  0000 0067 1 111 100 001         JSB     PW020   20 FEB 76
 3  0001 0351 1 110 101 001 ANLVS   JSB     ANINT
 4  0002 0363 1 111 010 001         JSB     SROM0
 5  0003        1 111 110 100       RSD7            INPUT ANG REF
 6  0004 0277 1 100 000 001         LIO     600     JSB W50IN
 7  0005        1 100 101 110       M,AXB           STORE AR IN B
 8  0006        1 010 101 000       MTC
 9  0007        1 001 001 100       PT9
10  0010        0 110 100 010       P,ZMC           DIST ?
11  0011 0021 0 001 000 111         BRN     ANLV2   YES
12  0012        0 111 100 010       P,CP1C          NO. ANGLE ?
13  0013 0015 0 000 110 111         BRN     ANLV1   YES
14  0014 0024 0 001 010 011         BRN     ANLV4   NO
15  0015        0 001 100 100 ANLV1 RS1             VERT
16  0016        1 000 001 100       PT8
17  0017        0 001 100 010       P,CM1           VERT ?
18  0020 0022 0 001 011 011         BRN     ANLV3   NO
19  0021        0 001 000 100 ANLV2 SS1             YES
20  0022        1 011 110 100 ANLV3 RSD5
21  0023 0001 0 000 000 111         LIO     003     BRN ANGMS
22  0024 0363 1 111 010 001 ANLV4   JSB     SROM0
23  0025 0372 1 111 101 101         JSB     LD25    LEVEL DS ADR
```

MODEL FIVE ASSEMBLER - Continued

```
24 0026        1 001 110 000         ATDS          SELECT
25 0027        0 101 000 000         IS2
26 0030 0204   1 000 010 011         LIO    411    LVPROM
27 0031        1 001 000 000         IS1
28 0032        1 111 110 100         RSD7
29 0033 0272   1 011 101 101         LIO    566    JSB PREIN
30 0034        0 010 000 100         SS2           BETA
31 0035        0 101 000 000         IS2
32 0036 0002   0 000 001 101         LIO    006
33 0037        1 001 000 000         IS1
34 0040        0 110 100 100         RS6           ROM1 FOR RETURN
35 0041        0 111 110 100         RSD3
36 0042 0346   1 110 011 101         LIO    716    JSB LVRT
37 0043        1 001 100 100         RS9           NO LVL COR
38 0044        1 011 010 100  ANL4A  YS11          LEVEL IN RANGE
39 0045 0047   0 010 011 111         BRN    LVOR   NO
40 0046 0054   0 010 110 011         BRN    ANLV5  YES
41 0047        1 011 101 110  LVOR   W,ZTA
42 0050        1 101 100 110         M,AM1A        LOAD ALL 9S
43 0051        1 001 001 100         PT9
44 0052        1 001 000 100         SS9           NO LVL COR
45 0053 0224   1 001 010 011         BRN    ANL1
46 0054        0 100 001 110  ANLV5  W,SLA         SHIFT LVPROM
47 0055        1 011 111 110         S,ZTA
48 0056        1 110 101 110         W,AXC
49 0057        0 100 101 000         CTS           STORE LVPROM
50 0060        1 111 110 100         RSD7          INPUT PROM
51 0061 0272   1 011 101 101         LIO    566    JSB PREIN
52 0062        1 000 101 110         W,BXC
53 0063        0 100 101 000         CTS
54 0064        1 100 101 110         W,AXB
55 0065 0355   1 110 111 001         JSB    RSPS
56 0066        0 101 000 000         IS2
57 0067        0 100 100 000         TG2
58 0070        0 010 100 000         TG1           SELECT PC
59 0071        1 001 000 000         IS1
60 0072        1 111 110 100         RSD7          INPUT PC DATA
61 0073 0277   1 100 000 001         LIO    600    JSB W50IN
62 0074        1 100 001 110         W,AMBA        SUBTRACT PROM
63 0075 0372   1 111 101 101         JSB    LD25
64 0076        0 100 100 100         RS4           LEVEL PHASE SFT
65 0077        1 110 101 110         W,AXC
66 0100        0 001 001 110         W,AMC         PHASE SFT RQD
67 0101 0111   0 100 100 111         BRN    ANLV6  NO
68 0102        0 100 000 100         SS4           YES
69 0103        0 101 000 000         IS2
70 0104        1 100 100 000         TG6
71 0105        0 000 100 000         TG0           SET PHASE SFT
72 0106        0 100 100 000         TG2
73 0107        0 010 100 000         TG5
74 0110        1 001 000 000         IS1
75 0111        0 011 001 110  ANLV6  W,ZTC
76 0112        0 000 001 100         PT0
77 0113        0 001 011 000         LDC1
78 0114        0 100 101 000  ANLVP  CTS
79 0115        0 111 110 100         RSD3
80 0116 0327   1 101 100 001         LIO    660    JSB EF10T
81 0117        1 010 001 100         PT10          SYNC TO 10HZ TO
82 0120        0 101 000 000         IS2           AVOID RPSQ
83 0121        0 100 100 000         TG2           SPIKE
84 0122        0 110 100 000         TG3           ENABLE PD
85 0123        1 100 100 000         TG6
86 0124        1 110 100 000         TG7           PRESET ACCUM
87 0125        1 010 100 000         TG5
88 0126        0 101 000 000  ANLV7  IS2
89 0127        1 110 100 000         TG7           PDEN
90 0130        1 001 000 000         IS1
91 0131        1 011 100 100         RS11
92 0132        0 100 100 000  ANLV8  TG2
93 0133        1 011 010 100         YS11
94 0134 0132   0 101 101 011         BRN    ANLV8
95 0135        0 000 011 100         PRS
96 0136        0 000 101 100         YP0
```

MODEL FIVE ASSEMBLER - Continued

```
 97 0137 0126  0 101 011 011              BRN    ANLV7
 98 0140       1 111 110 100              RSD7
 99 0141 0315  1 100 111 001              LIO    634     JSB INDAT
100 0142       1 100 101 000              DNR            RECAL ACCUM
101 0143       1 100 001 110              W,AMBA         SUBTRACT PROM
102 0144       1 011 001 110              W,SRA
103 0145       0 111 001 110              W,APCC         ADD TO ACCUM
104 0146       0 101 101 010              X,CM1C
105 0147 0114  0 100 110 011              BRN    ANLVP
106 0150       1 001 001 110              W,SRC
107 0151       0 110 001 110              W,CTA          DIV BY 2
108 0152       1 010 101 110              W,CPCC
109 0153       1 010 101 110              W,CPCC
110 0154       1 111 001 110              W,APCA
111 0155       1 110 001 110              W,APBA         ADD PROM
112 0156       1 100 101 000              DNR
113 0157       1 000 101 110              W,BXC          AR TO B
114 0160       1 100 101 000              DNR
115 0161       0 100 101 000              CTS
116 0162       1 011 001 100              PT11           ADD LVPROM
117 0163       0 011 010 010              WP,ZTC         DIGIT
118 0164       1 111 001 110              W,APCA
119 0165       1 111 111 110              S,AP1A
120 0166       1 100 001 110              W,AMBA         SUBTRACT AR
121 0167 0372  1 111 101 101              JSB    LD25    LOAD 509
122 0170       1 010 101 110              W,CPCC
123 0171       0 100 010 100              YS4            PHASE SFT ?
124 0172 0174  0 111 110 011              BRN    ANLV9   NO
125 0173       1 111 001 110              W,APCA         YES
126 0174       1 011 111 110  ANLV9       S,ZTA          MODULO 1000
127 0175       0 001 001 110              W,AMC          CENTER AROUND
128 0176 0201  1 000 000 111              BRN    ANL10   500
129 0177       1 101 111 110              S,AM1A         BGNEG
130 0200       1 110 101 110              W,AXC
131 0201       0 101 000 110  ANL10       M,AMCC
132 0202       0 100 101 000              CTS            MULTIPLY BY
133 0203       1 001 000 110              M,SRC          1.513
134 0204       0 110 001 110              W,CTA
135 0205       1 111 000 110              M,APCA
136 0206       1 111 000 110              M,APCA
137 0207       1 011 000 110              M,SRA
138 0210       1 111 000 110              M,APCA
139 0211       1 011 000 110              M,SRA
140 0212       1 111 000 110              M,APCA
141 0213       1 010 100 110              M,CPCC
142 0214       1 010 100 110              M,CPCC
143 0215       1 111 000 110              M,APCA
144 0216       1 100 101 000              DNR
145 0217       1 111 000 110              M,APCA
146 0220       0 011 001 110              W,ZTC
147 0221       1 001 001 100              PT9
148 0222       0 101 011 000              LDC5
149 0223       1 111 001 110              W,APCA
150 0224       1 011 111 000  ANL11       DSTC
151 0225       1 001 001 100              PT9
152 0226       0 110 010 010              WP,CTA
153 0227       1 010 101 000              MTC
154 0230       0 010 010 100              YS2            BETA ?
155 0231 0256  1 010 111 011              BRN    ANL13   NO
156 0232       1 011 110 010              WP,ZTA         YES
157 0233       1 011 000 110              M,SRA
158 0234       1 011 000 110              M,SRA
159 0235       1 011 000 110              M,SRA
160 0236       1 011 000 110              M,SRA
161 0237       0 011 001 100              PT3
162 0240       0 110 100 010              P,ZMC
163 0241 0243  1 010 001 111              BRN    ANL12
164 0242       1 111 101 010              X,AP1A
165 0243       0 101 000 000  ANL12       IS2
166 0244 0003  0 000 001 111              LIO    007     SELECT GAMA
167 0245       1 001 000 000              IS1
168 0246       1 111 111 110              S,AP1A
169 0247 0251  1 010 100 111              BRN    AN12A
```

MODEL FIVE ASSEMBLER - Continued

```
170 0250         1 101 111 010          XS,AM1A          LOAD BETA NEG
171 0251         0 010 100 100  AN12A   RS2              RESET BETA SB
172 0252         1 110 101 110          W,AXC
173 0253         0 010 011 000          LDC2             LOAD ANNUN
174 0254         1 111 110 100          RSD7
175 0255 0363    1 111 001 111          LIO      747     BRN AN12B
176 0256         1 110 101 110  ANL13   W,AXC
177 0257         1 011 110 000          DTDS             STORE LEVEL
178 0260         1 110 101 110          W,AXC
179 0261 0351    1 110 101 001          JSB      ANINT   SELECT AR
180 0262         0 111 100 010          P,CP1C           OTHER?
181 0263 0266    1 011 011 011          BRN      ANL14   NO
182 0264         0 101 110 100          RSD2             YES
183 0265 0001    0 000 000 111          LIO      003     BRN UNCON
184 0266         1 101 110 100  ANL14   RSD6
185 0267 0056    0 010 111 011          LIO      135     BRN ANGLV
186 0270 0363    1 111 010 001  LVCNT   JSB      SROM0
187 0271         1 100 101 000          DNR              SECOND ORDER
188 0272         1 110 101 110          W,AXC            LEVEL CORRECT
189 0273         0 100 101 000          CTS
190 0274         1 001 000 100          SS9              BETA NEG
191 0275         1 001 111 010          XS,AM1
192 0276 0300    1 100 000 011          BRN      LVCN1
193 0277         1 001 100 100          RS9              BETA NEG
194 0300         0 100 001 100  LVCN1   PT4
195 0301         1 011 110 010          WP,ZTA
196 0302         1 110 101 110          W,AXC
197 0303         0 110 001 110          W,CTA
198 0304         1 010 101 110          W,CPCC
199 0305         1 010 101 110          W,CPCC
200 0306         1 111 001 110          W,APCA
201 0307         0 100 001 110          W,SLA
202 0310         0 100 001 110          W,SLA
203 0311         1 100 101 110          W,AXB
204 0312         1 011 101 110          W,ZTA
205 0313         1 111 110 100          RSD7
206 0314 0241    1 010 001 001          LIO      504     JSB RADIN
207 0315         0 100 001 110          W,SLA
208 0316         1 100 101 000          DNR
209 0317         1 110 101 110          W,AXC
210 0320         1 100 101 110          W,AXB
211 0321         1 011 101 110          W,ZTA
212 0322         0 110 001 100          PT6
213 0323         1 111 110 100          RSD7
214 0324 0256    1 010 111 101          LIO      536     JSB MULT
215 0325         1 011 000 110          M,SRA
216 0326         1 100 101 000          DNR
217 0327         1 110 101 110          W,AXC
218 0330         0 101 010 100          YS5              NGOT?
219 0331 0337    1 101 111 111          BRN      LVCN3
220 0332         1 001 010 100          YS9              BETA NEG
221 0333 0341    1 110 000 111          BRN      LVCN4   NO
222 0334         1 111 001 110  LVCN2   W,APCA           YES
223 0335         0 000 000 000          NOP
224 0336 0342    1 110 001 011          BRN      LVCN5
225 0337         1 001 010 100  LVCN3   YS9              BETA NEG
226 0340 0334    1 101 110 011          BRN      LVCN2
227 0341         1 101 001 110  LVCN4   W,AMCA
228 0342         1 100 101 000  LVCN5   DNR
229 0343         1 100 101 110          W,AXB
230 0344         1 011 101 110          W,ZTA
231 0345         1 000 001 100          PT8
232 0346         1 111 110 100          RSD7
233 0347 0256    1 010 111 101          LIO      536     JSB MULT
234 0350         1 101 110 100          RSD6
235 0351 0271    1 011 100 111          LIO      563     BRN LCEN2
236 0352         0 101 000 000  ANINT   IS2
237 0353 0004    0 000 010 011          LIO      011
238 0354         0 100 100 000          TG2
239 0355         0 110 100 000          TG3
240 0356         0 101 000 000  RSPS    IS2
241 0357         1 100 100 000          TG6
242 0360         0 010 100 000          TG1
```

MODEL FIVE ASSEMBLER - Continued

```
243 0361      1 010 100 000           TG5
244 0362      1 001 000 000           IS1
245 0363      0 000 110 000           RETURN
246 0364      1 010 101 000  SROM0    MTC
247 0365      0 011 011 110           S,ZTC
248 0366      0 010 101 000           CXM
249 0367      0 000 110 000           RETURN
250 0370      0 001 110 100  PW020    RSD0
251 0371 0362 1 111 001 101           LIO    746    JSB PWRON
252 0372 0001 0 000 000 111           BRN    ANLVS  FROM DIST
253 0373      0 011 001 110  LD25     W,ZTC
254 0374      1 100 001 100           PT12
255 0375      0 010 011 000           LDC2
256 0376      0 101 011 000           LDC5
257 0377      0 000 110 000           RETURN
258 END
```

```
 #  ADDR ADDR  BIT PATTERN                    BER 21 8-6-76
 1  #,A,L
 2  0000 0375 1 111 111 001           JSB    PW021  20 FEB 76
 3  0001      0 001 010 100  ANGMS    YS1           VERT
 4  0002 0011 0 000 100 111           BRN    ANGM1  NO
 5  0003      0 101 000 000           IS2           YES
 6  0004 0001 0 000 000 111           LIO    003    VF1
 7  0005      1 100 100 000           TG6
 8  0006      1 001 000 000           IS1
 9  0007      0 000 100 000           TG0           VDSEN
10  0010 0016 0 000 111 011           BRN    ANGM2
11  0011      0 101 000 000  ANGM1    IS2
12  0012 7777 0 000 000 001           LIO    000    HF1
13  0013      1 100 100 000           TG6
14  0014      1 001 000 000           IS1
15  0015      0 100 100 000           TG2           HDSEN
16  0016      1 010 101 000  ANGM2    MTC           SET ROM NO
17  0017      1 101 001 100           PT13
18  0020      0 011 000 010           P,ZTC
19  0021      0 111 100 010           P,CP1C
20  0022      0 010 101 000           CXM
21  0023      1 011 100 100           RS11
22  0024      1 111 110 100           RSD7
23  0025 0316 1 100 111 101           LIO    636    JSB INDIC
24  0026      0 111 111 000           TTC
25  0027      0 101 000 000           IS2
26  0030      0 101 001 000           SRT           CONVERT TO
27  0031      0 010 001 000           XOR           BINARY
28  0032      0 101 001 000           SRT
29  0033      0 010 001 000           XOR
30  0034      0 101 001 000           SRT
31  0035      0 010 001 000           XOR
32  0036      0 101 001 000           SRT
33  0037      0 010 001 000           XOR
34  0040      0 101 001 000           SRT
35  0041      0 010 001 000           XOR
36  0042      0 101 001 000           SRT
37  0043      0 010 001 000           XOR
38  0044      0 101 001 000           SRT
39  0045      0 010 001 000           XOR
40  0046      0 101 001 000           SRT
41  0047      1 001 000 000           IS1
42  0050      1 000 001 100           PT8           CONVERT TO BCD
43  0051      0 101 011 000           LDC5
44  0052      0 110 001 110           W,CTA
45  0053      0 111 111 000           TTC
46  0054      1 001 001 110           W,SRC
47  0055      1 001 001 110           W,SRC
48  0056      1 001 001 110           W,SRC
49  0057      1 011 001 100  ANGM3    PT11
50  0060      0 110 000 010  ANGM4    P,CTA
51  0061      1 111 000 010           P,APCA
52  0062 0077 0 011 111 111           BRN    ANGM7
53  0063      0 111 100 010           P,CP1C
54  0064 0067 0 011 011 111           BRN    ANGM5
55  0065      1 100 011 000           LDC12
```

MODEL FIVE ASSEMBLER - Continued

```
 56 0066 0100  0 100 000 011              BRN    ANG7A
 57 0067       0 111 100 010  ANGM5       P,CP1C
 58 0070 0073  0 011 101 111              BRN    ANGM6
 59 0071       1 011 011 000              LDC11
 60 0072 0100  0 100 000 011              BRN    ANG7A
 61 0073       0 111 100 010  ANGM6       P,CP1C
 62 0074 0077  0 011 111 111              BRN    ANGM7
 63 0075       1 010 011 000              LDC10
 64 0076 0100  0 100 000 011              BRN    ANG7A
 65 0077       0 000 011 100  ANGM7       PRS
 66 0100       1 001 101 100  ANG7A       YP9
 67 0101 0060  0 011 000 011              BRN    ANGM4
 68 0102       1 000 100 100              RS8                    ODD
 69 0103       0 110 100 010              P,ZMC
 70 0104 0106  0 100 011 011              BRN    ANG7B
 71 0105       1 000 000 100              SS8                    ODD
 72 0106       0 111 110 000  ANG7B       CTT
 73 0107       0 101 000 000              IS2
 74 0110       0 100 001 000              SLT
 75 0111       1 001 000 000              IS1
 76 0112       0 111 111 000              TTC
 77 0113       1 000 001 100              PT8
 78 0114       0 011 010 010              WP,ZTC
 79 0115       1 111 100 010              P,AP1A
 80 0116 0057  0 010 111 111              BRN    ANGM3
 81 0117       1 001 001 110              W,SRC
 82 0120       1 001 001 110              W,SRC
 83 0121       0 100 101 000              CTS
 84 0122       0 000 000 000              NOP
 85 0123       1 111 110 100              RSD7
 86 0124 0303  1 100 010 001              LIO    610    JSB INDE0
 87 0125 0337  1 110 000 001              JSB    SUBAR
 88 0126       0 001 010 100              YS1                    VERT
 89 0127 0134  0 101 110 011              BRN    ANGM8
 90 0130       0 101 000 000              IS2
 91 0131 0001  0 000 001 001              LIO    004    VF2
 92 0132       1 001 000 000              IS1
 93 0133 0137  0 101 111 111              BRN    ANGM9
 94 0134       0 101 000 000  ANGM8       IS2
 95 0135 0000  0 000 000 011              LIO    001
 96 0136       1 001 000 000              IS1
 97 0137       1 110 101 110  ANGM9       W,AXC          STORE F1
 98 0140       0 100 101 000              CTS
 99 0141       1 111 110 100              RSD7
100 0142 0277  1 100 000 001              LIO    600    JSB W50IN
101 0143 0337  1 110 000 001              JSB    SUBAR
102 0144       0 001 010 100              YS1
103 0145 0152  0 110 101 011              BRN    ANG10
104 0146       0 101 000 000              IS2
105 0147 0002  0 000 001 011              LIO    005    VC
106 0150       1 001 000 000              IS1
107 0151 0155  0 110 110 111              BRN    ANG11
108 0152       0 101 000 000  ANG10       IS2
109 0153 0000  0 000 000 101              LIO    002
110 0154       1 001 000 000              IS1
111 0155       1 100 101 000  ANG11       DNR            COMPUTE FAV
112 0156       0 100 101 000              CTS            AND ECCEN
113 0157       0 111 001 110              W,APCC
114 0160       1 100 101 000              DNR
115 0161       1 110 101 110              W,AXC
116 0162 0347  1 110 100 001              JSB    MOTSB
117 0163       1 010 101 110              W,CPCC
118 0164       1 110 101 110              W,AXC
119 0165       1 100 101 000              DNR
120 0166       1 100 101 000              DNR
121 0167       1 100 101 000              DNR
122 0170       0 111 001 110              W,APCC
123 0171       0 110 001 110              W,CTA
124 0172       1 010 101 110              W,CPCC
125 0173       1 010 101 110              W,CPCC
126 0174       1 111 001 110              W,APCA
127 0175       1 010 001 100              PT10
128 0176       1 011 100 010              P,ZTA
```

MODEL FIVE ASSEMBLER - Continued

```
129 0177        1 011 001 110            W,SRA
130 0200        1 100 101 000            DNR
131 0201        1 110 101 110            W,AXC
132 0202        0 100 101 000            CTS
133 0203        1 110 101 110            W,AXC
134 0204        0 100 101 000            CTS
135 0205        1 111 110 100            RSD7                  INPUT COARSE
136 0206 0277   1 100 000 001            LIO      600          JSB W50IN
137 0207 0337   1 110 000 001            JSB      SUBRP
138 0210        0 101 000 000            IS2
139 0211 0004   0 000 010 011            LIO      01:
140 0212        1 001 000 000            IS1
141 0213        1 100 101 000            DNR
142 0214        1 110 101 110            W,AXC
143 0215 0370   1 111 100 101            JSB      X1:          MULTIPLY CX32
144 0216        1 010 101 110            W,CPCC
145 0217        1 111 001 110            W,APCA                ADD ECCEN
146 0220        1 001 000 100            SS9                   FIRST PASS
147 0221        0 011 001 110 ANG12      W,ZTC
148 0222        1 010 001 100            PT10
149 0223        0 011 011 000            LDC3
150 0224        0 010 011 000            LDC2
151 0225 0326   1 101 011 101            JSB      MODX
152 0226        1 001 010 100            YS9                   FIRST PASS ?
153 0227 0243   1 010 001 111            BRN      ANG13        NO
154 0230        1 000 101 110            W,BXC                 YES
155 0231        1 100 101 000            DNR                   COMBINE COARSE
156 0232        1 110 101 110            W,AXC                 AND FAV
157 0233        1 000 101 110            W,BXC
158 0234        0 011 001 110            W,ZTC
159 0235        1 000 001 100            PT8
160 0236        0 010 010 010            WP,BTC
161 0237 0347   1 110 100 001            JSB      MOTSB
162 0240        1 110 001 110            W,APBA
163 0241        1 001 100 100            RS9                   FIRST PASS
164 0242 0221   1 001 000 111            BRN      ANG12        CORRECT DIGITAL
165 0243        0 011 001 110 ANG13      W,ZTC
166 0244        1 000 001 100            PT8
167 0245        0 111 100 010            P,CP1C
168 0246        1 000 101 110            W,BXC
169 0247        0 011 001 110            W,ZTC
170 0250        1 001 001 100            PT9
171 0251        1 000 011 000            LDC8
172 0252        0 001 001 110            W,AMC
173 0253 0263   1 011 001 111            BRN      ANG14
174 0254        1 100 101 000            DNR
175 0255        1 110 101 110            W,AXC
176 0256        1 000 010 100            YS8              ODD
177 0257 0305   1 100 010 111            BRN      ANG18
178 0260        1 110 001 110            W,APBA
179 0261        0 000 000 000            NOP
180 0262 0305   1 100 010 111            BRN      ANG18
181 0263        1 000 010 100 ANG14      YS8              ODD
182 0264 0270   1 011 100 011            BRN      ANG15
183 0265        1 100 101 000            DNR
184 0266        1 110 101 110            W,AXC
185 0267 0304   1 100 010 011            BRN      ANG17
186 0270        0 011 001 110 ANG15      W,ZTC
187 0271        1 010 001 100            PT10
188 0272        0 010 011 000            LDC2
189 0273        0 100 011 000            LDC4
190 0274        0 001 001 110            W,AMC
191 0275 0301   1 100 000 111            BRN      ANG16
192 0276        1 100 101 000            DNR
193 0277        1 110 101 110            W,AXC
194 0300 0305   1 100 010 111            BRN      ANG18
195 0301        1 100 101 000 ANG16      DNR
196 0302        1 110 101 110            W,AXC
197 0303        1 100 001 110            W,AMBA
198 0304        1 100 001 110            W,AMBA
199 0305 0305   1 100 101 000 ANG17      CTS
                0 100 101 000 ANG18
200 0306        0 011 001 110            W,ZTC
201 0307        1 010 001 100            PT10                  MOD 256
```

MODEL FIVE ASSEMBLER - Continued

```
202 0310      0 010 011 000         LDC2
203 0311      0 101 011 000         LDC5
204 0312      0 110 011 000         LDC6
205 0313 0326 1 101 011 101         JSB      MODX
206 0314      1 100 101 000         DNR
207 0315      1 110 101 110         W,AXC
208 0316 0370 1 111 100 101         JSB      X16     DIGX16
209 0317      1 011 001 110         W,SRA
210 0320      1 111 001 110         W,APCA
211 0321      0 000 000 000         NOP
212 0322      1 101 110 100         RSD6
213 0323 0001 0 000 000 111         LIO      003     BRN ANGCP
214 0324      0 000 000 000         NOP
215 0325      0 000 000 000         NOP
216 0326      0 000 000 000         NOP
217 0327      1 001 111 110 MODX    S,AM1
218 0330 0336 1 101 111 011         BRN      MOD2
219 0331      0 001 001 110         W,AMC
220 0332 0334 1 101 110 011         BRN      MOD1
221 0333      0 000 110 000         RETURN
222 0334      1 101 001 110 MOD1    W,AMCA
223 0335      0 000 110 000         RETURN
224 0336      1 111 001 110 MOD2    W,APCA
225 0337      0 000 110 000         RETURN
226 0340      1 111 111 110 SUBAR   S,AP1A
227 0341      1 100 001 110         W,AMBA
228 0342      1 011 111 110         S,ZTA
229 0343      1 011 001 110         W,SRA
230 0344      1 011 001 110         W,SRA
231 0345      1 011 001 110         W,SRA
232 0346      1 011 001 110         W,SRA
233 0347      0 000 110 000         RETURN
234 0350      1 101 001 110 MOTSB   W,AMCA
235 0351      0 011 001 110         W,ZTC
236 0352      1 000 001 100         PT8
237 0353      0 101 011 000         LDC5
238 0354      1 101 001 110         W,AMCA
239 0355      1 001 111 110         S,AM1
240 0356 0361 1 111 000 111         BRN      MOTS1
241 0357      1 101 001 110         W,AMCA
242 0360      0 000 110 000         RETURN
243 0361      1 111 001 110 MOTS1   W,APCA
244 0362      1 111 001 110         W,APCA
245 0363      1 001 111 110         S,AM1
246 0364 0336 1 101 111 011         BRN      MOD2
247 0365      1 101 001 110         W,AMCA
248 0366      0 011 001 110         W,ZTC
249 0367      0 000 110 000         RETURN
250 0370      0 000 000 000         NOP
251 0371      1 010 101 110 X16     W,CPCC
252 0372      1 010 101 110         W,CPCC
253 0373      1 010 101 110         W,CPCC
254 0374      1 010 101 110         W,CPCC
255 0375      0 000 110 000         RETURN
256 0376      0 001 110 100 PW021   RSD0
257 0377 0362 1 111 001 101         LIO      746     JSB PWRON
258 END
```

*

MODEL FIVE ASSEMBLER

```
LIN CURR BRAN OPERATION CODE
 #  ADDR ADDR BIT PATTERN
 1  #,A,L
 2  0000 0375 1 111 111 001         JSB      PW022   20 FEB 76
 3  0001 0341 1 110 001 001 ANGCP   JSB      M3125   CONVERT TO GRAD
 4  0002 0341 1 110 001 001         JSB      M3125
 5  0003      1 010 101 000         MTC
 6  0004      0 111 001 100         PT7
 7  0005      0 001 100 010         P,CM1            TRACK?
 8  0006 0016 0 000 111 011         BRN      ANG1A   YES
```

MODEL FIVE ASSEMBLER - Continued

```
 9 0007        1 011 100 100         RS11            NO
10 0010        1 000 100 000         TG4
11 0011        1 011 010 100         YS11            AUTO COMP?
12 0012 0014  0 000 110 011          BRN    ANGC1    NO
13 0013        0 111 100 010         P,CP1C          YES
14 0014       0 010 101 000  ANGC1   CXM
15 0015       1 010 101 000          MTC
16 0016       1 001 001 110  ANG1A   W,SRC
17 0017       1 001 001 110          W,SRC
18 0020       0 011 011 010          XS,ZTC
19 0021       1 001 001 110          W,SRC
20 0022       0 100 001 100          PT4
21 0023       0 110 010 010          WP,CTA
22 0024 0364 1 111 010 101           JSB    H.DSA
23 0025       0 001 010 100          YS1             VERT
24 0026 0033 0 001 101 111           BRN    A.C2
25 0027 0356 1 110 111 101           JSB    V.DSA
26 0030       0 111 011 000          LDC7
27 0031       1 001 001 110          W,SRC
28 0032       0 110 000 010          P,CTA
29 0033 0335 1 101 111 001  ANGC2    JSB    DTDSR    STORE DATA
30 0034       1 010 101 000          MTC             RECALL STATUS
31 0035       1 011 001 100          PT11
32 0036       0 001 100 010          P,CM1           TRACK ?
33 0037 0165 0 111 010 111           BRN    ANC10    YES
34 0040       0 111 001 100          PT7             NO
35 0041       0 110 100 010          P,ZMC           AUTO COMP?
36 0042 0165 0 111 010 111           BRN    ANC10    NO
37 0043       1 100 101 000          DNR             YES
38 0044       1 100 101 000          DNR
39 0045       1 000 101 110          W,BXC           STORE REF IN B
40 0046       0 001 010 100          YS1             VERT?
41 0047 0052 0 010 101 011           BRN    ANGC3    NO
42 0050       1 001 110 100          RSD4
43 0051 0024 0 001 010 011           LIO    051      BRN ANLV4 LEVEL
44 0052       0 001 000 100  ANGC3   SS1             VERT
45 0053       1 011 110 100          RSD5
46 0054 0001 0 000 000 111           LIO    003      BRN ANGMS
47 0055       1 001 000 100  ANGNL   SS9             NO LVL COR
48 0056 0356 1 110 111 101  ANGLV    JSB    VADSA
49 0057       1 011 111 000          DSTC            RECALL VERT
50 0060       1 001 010 100          YS9             IS LEVEL ZERO ?
51 0061 0105 0 100 010 111           BRN    ANGC5    NO
52 0062       0 001 001 100          PT1             YES
53 0063       0 111 100 010          P,CP1C          SET FLASH DSP
54 0064       1 011 110 000          DTDS            STORE VERT
55 0065 0364 1 111 010 101           JSB    HADSA
56 0066       0 001 001 100          PT1
57 0067       1 011 111 000          DSTC            RECALL HORIZ
58 0070       0 110 101 110          W,ZMC           HAS HORIZ BEEN
59 0071 0075 0 011 110 111           BRN    ANGC4    MEAS? NO
60 0072       0 111 100 010          P,CP1C          YES. SET FLASH
61 0073       1 011 110 000          DTDS            DISP SB
62 0074 0077 0 011 111 111           BRN    ANG4A
63 0075 0356 1 110 111 101  ANGC4    JSB    VADSA
64 0076       1 011 111 000          DSTC
65 0077       0 110 001 110  ANG4A   W,CTA           VERT ANG TO A
66 0100       1 010 101 000          MTC             LOAD FLASH DISP
67 0101       0 100 001 100          PT4
68 0102       0 001 011 000          LDC1
69 0103       0 010 101 000          CXM
70 0104 0165 0 111 010 111           BRN    ANC10
71 0105       0 011 010 010  ANGC5   WP,ZTC          ZERO VA SB
72 0106       1 110 101 110          W,AXC
73 0107       0 100 101 000          CTS             LEVEL TO D
74 0110       0 010 000 100          SS2             LEVEL
75 0111       0 001 100 100          RS1             VERT
76 0112       1 010 101 000          MTC
77 0113       1 001 001 100          PT9
78 0114       0 110 100 010          P,ZMC           DIST ?
79 0115 0121 0 101 000 111           BRN    ANGC6    YES
80 0116       1 000 001 100          PT8             NO
81 0117       0 001 100 010          P,CM1           VERT ?
```

MODEL FIVE ASSEMBLER - Continued

```
 82 0120 0122 0 101 001 311            BRN    ANGC7   NO
 83 0121         0 001 000 100 ANGC6   SS1            YES
 84 0122         0 100 000 100 ANGC7   SS4            2ITER
 85 0123         0 101 100 100 DISTR   RS5            NCOT. FROM DIST
 86 0124         0 110 100 100         RS6            NSIN
 87 0125         0 111 100 100         RS7            GT50
 88 0126         1 011 001 110         W,SRA
 89 0127         0 011 001 110         W,ZTC          MODULO 200
 90 0130         1 011 001 100         PT11
 91 0131         0 010 011 000         LDC2
 92 0132         0 001 001 110         W,AMC
 93 0133 0135 0 101 110 111            BRN    ANGC8
 94 0134 0141 0 110 000 111            BRN    ANGC9
 95 0135         1 010 101 110 ANGC8   W,CPCC
 96 0136         1 110 101 110         W,AXC
 97 0137         1 101 001 110         W,AMCA
 98 0140         0 101 000 100         SS5            NCOT
 99 0141         1 111 110 100 ANGC9   RSD7
100 0142 0001 0 000 000 111            LIO    003     BRN TRIG
101 0143 0364 1 111 010 101 ANGD       JSB    HADSA   SET HORIZ DSADR
102 0144 0310 1 100 100 101            JSB    ANLVC
103 0145         0 000 000 000         NOP
104 0146         1 100 001 100 ANG2    PT12           RECALL LEVEL
105 0147         0 010 011 000         LDC2
106 0150         0 000 000 000         NOP
107 0151 0367 1 111 100 001            JSB    ATDS
108 0152         1 011 111 000         DSTC
109 0153         1 011 101 110         W,ZTA
110 0154         1 000 001 100         PT8
111 0155         1 110 110 010         WP,AXC         BETA TO A
112 0156 0356 1 110 111 101            JSB    VADSA   SET VERT DSADR
113 0157         1 000 100 100         RS8            BGNEG
114 0160         1 001 111 010         XS,AM1         INVERT SIGN
115 0161 0163 0 111 001 111            BRN    ANGZ1   OF BETA
116 0162         1 000 000 100         SS8
117 0163         1 011 110 010 ANGZ1   WP,ZTA
118 0164 0310 1 100 100 101            JSB    ANLVC
119 0165         1 010 101 000 ANC10   MTC
120 0166         1 001 001 100         PT9
121 0167         0 110 100 010         P,ZMC          DIST ?
122 0170 0363 1 111 001 111            BRN    DISLK   YES
123 0171         1 000 001 100         PT8            NO
124 0172         0 110 100 010         P,ZMC          VERT ?
125 0173 0217 1 000 111 111            BRN    ANC12   YES
126 0174 0364 1 111 010 101            JSB    HADSA
127 0175         1 011 111 000         DSTC
128 0176         0 110 001 110         W,CTA
129 0177         0 011 001 110         W,ZTC
130 0200         1 011 110 000         DTDS
131 0201         1 100 001 100         PT12
132 0202         0 110 011 000         LDC6
133 0203         0 000 000 000         NOP
134 0204         1 001 110 000         ATDS
135 0205         1 010 101 000         MTC
136 0206         1 000 001 100         PT8
137 0207         0 111 100 010         P,CP1C         DIR ?
138 0210 0216 1 000 111 011            BRN    ANC11   YES
139 0211         1 011 111 000         DSTC           NO. RECALL DIR
140 0212         0 100 001 100         PT4
141 0213         0 011 010 010         WP,ZTC         ZERO RD SB
142 0214         1 101 001 110         W,AMCA         SUBTRACT DIR
143 0215 0364 1 111 010 101            JSB    HADSA   SELECT RD DSADR
144 0216 0320 1 101 000 101 ANC11      JSB    M400S   MOD 400 AND STR
145 0217         0 101 110 100 ANC12   RSD2
146 0220 0001 0 000 000 111            LIO    003     BRN UNCON
147 0221         1 000 101 110 LVCOR   W,BXC
148 0222         1 010 101 000         MTC
149 0223         1 101 001 100         PT13           SET ROM NO
150 0224         0 010 011 000         LDC2
151 0225         0 000 000 000         NOP
152 0226         0 010 101 000         CXM
153 0227         1 100 101 000         DNR            RECALL LEVEL
154 0230         1 000 100 100         RS8            BGNEG
```

MODEL FIVE ASSEMBLER - Continued

```
155 0231            0 110 111 110            S,ZMC             GAMA NEG ?
156 0232 0235  1 001 110 111                 BRN       LVC01   NO
157 0233            0 011 011 110            S,ZTC             YES
158 0234            1 000 000 100            SS8               BGNEG
159 0235       1 011 101 110  LVC01          W,ZTA             SET UP PARAMS
160 0236            1 000 001 100            PT8                 FOR 1ST AND 2ND
161 0237            1 110 110 010            WP,AXC              ORDER CORRECT
162 0240            1 001 001 110            W,SRC
163 0241            0 100 101 000            CTS
164 0242            1 000 101 110            W,BXC
165 0243            0 100 101 000            CTS
166 0244            1 000 101 110            W,BXC
167 0245            1 110 101 110            W,AXC
168 0246            0 100 101 000            CTS
169 0247            1 110 101 110            W,AXC
170 0250            1 011 101 110            W,ZTA
171 0251            0 111 010 100            YS7               1ST ORDER ONLY?
172 0252 0267  1 011 011 111                 BRN       LCEND   YES
173 0253            0 010 001 110            W,BTC             NO
174 0254            0 100 001 100            PT4               START 2ND ORDER
175 0255            1 111 110 100            RSD7              CORRECT
176 0256 0256  1 010 111 101                 LIO       536     JSB MULT
177 0257            0 011 001 110            W,ZTC
178 0260            1 000 001 100            PT8
179 0261            0 001 011 000            LDC1
180 0262            1 110 101 110            W,AXC
181 0263            1 010 101 110            W,CPCC
182 0264            1 111 001 110            W,APCA
183 0265            1 001 110 100            RSD4
184 0266 0270  1 011 100 011                 LIO       561     BRN LVCNT
185 0267       1 111 110 100  LCEND          RSD7
186 0270 0256  1 010 111 101                 LIO       536     JSB MULT
187 0271       1 011 001 110  LCEN2          W,SRA
188 0272            0 100 001 100            PT4
189 0273            1 011 110 010            WP,ZTA
190 0274            0 101 010 100            YS5               NCOT
191 0275 0143  0 110 001 111                 BRN       ANGD
192 0276            1 000 010 100            YS8               BGNEG
193 0277 0302  1 100 001 011                 BRN       LCEN1
194 0300            1 000 100 100            RS8
195 0301 0143  0 110 001 111                 BRN       ANGD
196 0302       1 000 000 100  LCEN1          SS8
197 0303 0143  0 110 001 111                 BRN       ANGD
198 0304            0 000 000 000            NOP
199 0305            0 000 000 000            NOP
200 0306            0 000 000 000            NOP
201 0307            0 000 000 000            NOP
202 0310            0 000 000 000            NOP
203 0311            1 011 111 000  ANLVC     DSTC
204 0312            1 110 101 110            W,AXC
205 0313            1 000 010 100            YS8               BGNEG
206 0314 0320  1 101 000 011                 BRN       ANLV1   NO
207 0315            1 101 001 110            W,AMCA            YES
208 0316            0 000 000 000            NOP
209 0317 0321  1 101 000 111                 BRN       M400S
210 0320       1 111 001 110  ANLV1          W,APCA
211 0321       0 011 001 110  M400S          W,ZTC
212 0322            1 100 001 100            PT12
213 0323            0 100 011 000            LDC4
214 0324            0 000 000 000            NOP
215 0325            1 001 111 110            S,AM1
216 0326 0335  1 101 110 111                 BRN       ANLV3
217 0327            0 001 001 110            W,AMC
218 0330 0332  1 101 101 011                 BRN       ANLV2
219 0331 0336  1 101 111 011                 BRN       DTDSR
220 0332       1 101 001 110  ANLV2          W,AMCA
221 0333            0 000 000 000            NOP
222 0334 0336  1 101 111 011                 BRN       DTDSR
223 0335       1 111 001 110  ANLV3          W,APCA
224 0336       1 110 101 110  DTDSR          W,AXC
225 0337            1 011 110 000            DTDS
226 0340            0 110 001 110            W,CTA
227 0341            0 000 110 000            RETURN
```

MODEL FIVE ASSEMBLER - Continued

```
228 0342         0 100 101 110 M3125    W,ATD
229 0343         0 010 001 110          W,BTC
230 0344         1 010 101 110          W,CPCC
231 0345         1 111 001 110          W,APCA
232 0346         1 111 001 110          W,APCA
233 0347         1 011 001 110          W,SRA
234 0350         1 111 001 110          W,APCA
235 0351         1 011 001 110          W,SRA
236 0352         1 110 001 110          W,APBA
237 0353         1 011 001 110          W,SRA
238 0354         1 110 001 110          W,APBA
239 0355         1 111 001 110          W,APCA
240 0356         0 000 110 000          RETURN
241 0357         1 100 001 100 VADSA    PT12
242 0360         0 111 011 000          LDC7
243 0361         0 000 000 000          NOP
244 0362 0370    1 111 100 011          BRN       ATDS
245 0363         1 010 110 100 DISLK    RGS1
246 0364         0 100 010 000          ROM 2
247 0365         1 100 001 100 HADSA    PT12
248 0366         1 001 011 000          LDC9
249 0367         0 000 000 000          NOP
250 0370         0 011 001 010 ATDS     X,ZTC
251 0371         1 001 110 000          ATDS
252 0372         0 100 001 100          PT4
253 0373         0 000 110 000          RETURN
254 0374 0123    0 101 001 111          BRN       DISTR   FROM DIST
255 0375         0 000 000 000          NOP
256 0376         0 001 110 100 PW022    RSD0
257 0377 0362    1 111 001 101          LIO       746     JSB PWRON
258 END
```

*
MODEL FIVE ASSEMBLER

BER 23    8-6-76

```
LIN CURR BRAN OPERATION CODE
 #  ADDR ADDR  BIT PATTERN
 1  #,A,L
 2  0000 0375  1 111 111 001          JSB       PW023   20 FEB 76
 3  0001       1 010 101 000 TRIG     MTC               SET ROM NO
 4  0002       0 011 011 110          S,ZTC
 5  0003       0 101 111 110          S,CM1C
 6  0004       0 010 101 000          CXM
 7  0005       0 011 001 110          W,ZTC             CONVERT TO
 8  0006       1 011 001 100          PT11              VERTICAL ANG
 9  0007       0 001 011 000          LDC1
10  0010       1 110 101 110          W,AXC
11  0011       0 001 001 110          W,AMC
12  0012 0022  0 001 001 011          BRN       TRIG2
13  0013       0 110 000 100          SS6               NSIN
14  0014       1 110 101 110          W,AXC
15  0015       0 101 010 100          YS5               NCOT
16  0016 0021  0 001 000 111          BRN       TRIG1
17  0017       0 101 100 100          RS5               NCOT
18  0020 0022  0 001 001 011          BRN       TRIG2
19  0021       0 101 000 100 TRIG1    SS5               NCOT
20  0022       1 101 001 110 TRIG2    W,AMCA
21  0023       0 011 001 110          W,ZTC
22  0024       0 010 010 100          YS2               LEVEL ?
23  0025 0041  0 010 000 111          BRN       TRIG5   NO
24  0026       1 001 011 000          LDC9              YES
25  0027       1 001 011 000          LDC9              CHECK FOR TOO
26  0030       0 001 001 110          W,AMC             CLOSE TO ZENITH
27  0031 0033  0 001 101 111          BRN       TRIG3
28  0032 0035  0 001 110 111          BRN       TRIG4
29  0033       1 101 110 100 TRIG3    RSD6
30  0034 0055  0 010 110 111          LIO       133     BRN ANGNL
31  0035       0 001 010 100 TRIG4    YS1               ZENITH
32  0036 0041  0 010 000 111          BRN       TRIG5   NO
33  0037       1 101 110 100          RSD6              YES
34  0040 0146  0 110 011 011          LIO       315     BRN ANGZ
```

MODEL FIVE ASSEMBLER - Continued

```
 35 0041         0 011 001 110 TRIG5    W,ZTC
 36 0042         1 010 001 100          PT10
 37 0043         0 101 011 000          LDC5           MODULO 50
 38 0044         0 001 001 110          W,AMC
 39 0045 0047    0 010 011 111          BRN      TRIG6
 40 0046 0053    0 010 101 111          BRN      TRIG7
 41 0047         1 010 101 110 TRIG6    W,CPCC
 42 0050         1 110 101 110          W,AXC
 43 0051         1 101 001 110          W,AMCA
 44 0052         0 111 000 100          SS7            GT50
 45 0053         0 100 001 110 TRIG7    W,SLA
 46 0054         1 100 101 110          W,AXB
 47 0055         1 011 101 110          W,ZTA
 48 0056 0241    1 010 001 001          JSB      RADIN   CONVERT TO
 49 0057         0 100 001 110          W,SLA            RADIANS
 50 0060         0 000 101 110          W,ZTB
 51 0061         1 010 101 000          MTC              STORE STATUS
 52 0062         0 100 101 000          CTS              IN D REG
 53 0063         0 011 001 110          W,ZTC
 54 0064         1 010 001 100          PT10
 55 0065 0265    1 011 011 001          JSB      L9966   PSEUDO DIVIDE
 56 0066         1 000 011 000          LDC8
 57 0067         0 110 011 000          LDC6
 58 0070         0 101 011 000          LDC5
 59 0071         0 010 011 000          LDC2
 60 0072         0 011 001 100          PT3
 61 0073 0177    1 000 000 001          JSB      PSDIV
 62 0074         1 000 001 100          PT8
 63 0075 0265    1 011 011 001          JSB      L9966
 64 0076 0267    1 011 100 001          JSB      L66
 65 0077         0 010 001 100          PT2
 66 0100 0177    1 000 000 001          JSB      PSDIV
 67 0101         0 100 010 100          YS4              2ITER?
 68 0102 0104    0 100 010 011          BRN      TRIG8   NO
 69 0103 0116    0 100 111 011          BRN      TRIG9   YES
 70 0104         0 110 001 100 TRIG8    PT6
 71 0105         1 001 011 000          LDC9
 72 0106         1 001 011 000          LDC9
 73 0107         0 001 001 100          PT1
 74 0110 0177    1 000 000 001          JSB      PSDIV
 75 0111         0 100 001 100          PT4
 76 0112         1 001 011 000          LDC9
 77 0113         1 001 011 000          LDC9
 78 0114         0 000 001 100          PT0
 79 0115 0177    1 000 000 001          JSB      PSDIV
 80 0116         1 000 101 110 TRIG9    W,BXC            PSEUDO MULTIPLY
 81 0117         1 100 101 110          W,AXB
 82 0120         1 011 101 110          W,ZTA
 83 0121         1 010 001 100          PT10
 84 0122         1 111 100 010          P,AP1A
 85 0123         1 111 001 100          PT15
 86 0124 0170    0 111 100 101          JSB      NXDE1
 87 0125         0 100 010 100          YS4              2ITER ?
 88 0126 0132    0 101 101 011          BRN      TRI11   NO
 89 0127         0 010 001 100          PT2              YES
 90 0130 0144    0 110 010 011          BRN      TRI15
 91 0131 0210    1 000 100 101 TRI10    JSB      SFT8
 92 0132         0 101 100 010 TRI11    P,CM1C
 93 0133 0131    0 101 100 111          BRN      TRI10
 94 0134 0171    0 111 101 001          JSB      NXDEC
 95 0135 0137    0 101 111 111          BRN      TRI13
 96 0136 0212    1 000 101 101 TRI12    JSB      SFT6
 97 0137         0 101 100 010 TRI13    P,CM1C
 98 0140 0136    0 101 111 011          BRN      TRI12
 99 0141 0171    0 111 101 001          JSB      NXDEC
100 0142 0144    0 110 010 011          BRN      TRI15
101 0143 0214    1 000 110 101 TRI14    JSB      SFT4
102 0144         0 101 100 010 TRI15    P,CM1C
103 0145 0143    0 110 001 111          BRN      TRI14
104 0146 0171    0 111 101 001          JSB      NXDEC
105 0147 0151    0 110 100 111          BRN      TRI17
106 0150 0216    1 000 111 101 TRI16    JSB      SFT2
107 0151         0 101 100 010 TRI17    P,CM1C
```

MODEL FIVE ASSEMBLER - Continued

```
108 0152 0150 0 110 100 011             BRN     TRI16
109 0153      1 100 101 000             DNR
110 0154      0 010 101 000             CXM             RECALL STATUS
111 0155      1 010 001 110             W,SRB
112 0156      0 010 010 100             YS2             LEVEL ?
113 0157 0167 0 111 011 111             BRN     TRI19   NO
114 0160      0 111 010 100             YS7             YES. GT56 ?
115 0161 0163 0 111 001 111             BRN     TRI18   NO
116 0162      1 100 101 110             W,AXB           YES
117 0163      0 100 001 110 TRI18       W,SLA
118 0164 0356 1 110 111 101             JSB     DIV11
119 0165      1 101 110 100             RSD6
120 0166 0221 1 001 000 111             LIO     443     BRN LVCOR
121 0167 0356 1 110 111 101 TRI19       JSB     DIV11
122 0170 0372 1 111 101 011             BRN     DISPL
123 0171      1 010 001 110 NXDE1       W,SRB
124 0172      0 010 101 000 NXDEC       CXM
125 0173      0 000 111 100             PLS
126 0174      1 010 001 110             W,SRB
127 0175      0 010 001 110             W,BTC
128 0176      0 010 101 000             CXM
129 0177      0 000 110 000             RETURN
130 0200      1 000 101 110 PSDIV       W,BXC
131 0201      0 111 100 010 PSDI1       P,CP1C
132 0202      1 100 001 110             W,AMBA
133 0203 0201 1 000 000 111             BRN     PSDI1
134 0204      0 101 100 010             P,CM1C
135 0205      1 110 001 110             W,APBA
136 0206      0 100 001 110             W,SLA
137 0207      1 000 101 110             W,BXC
138 0210      0 000 110 000             RETURN
139 0211      1 010 001 110 SFT8        W,SRB
140 0212      1 010 001 110             W,SRB
141 0213      1 010 001 110 SFT6        W,SRB
142 0214      1 010 001 110             W,SRB
143 0215      1 010 001 110 SFT4        W,SRB
144 0216      1 010 001 110             W,SRB
145 0217      1 010 001 110 SFT2        W,SRB
146 0220      1 010 001 110             W,SRB
147 0221      0 010 101 000             CXM
148 0222      0 111 001 110             W,APCC
149 0223      1 100 001 110             W,AMBA
150 0224      1 000 101 110             W,BXC
151 0225      0 010 001 110             W,BTC
152 0226      0 010 101 000             CXM
153 0227      0 000 110 000             RETURN
154 0230      0 000 000 000             NOP
155 0231      0 111 100 010 DIV12       P,CP1C
156 0232      1 100 001 110 DIV13       W,AMBA
157 0233 0231 1 001 100 111             BRN     DIV12
158 0234      1 110 001 110             W,APBA
159 0235      0 000 011 100             PRS
160 0236      0 100 001 110             W,SLA
161 0237      0 011 101 100             YP3
162 0240 0232 1 001 101 011             BRN     DIV13
163 0241      0 000 110 000             RETURN
164 0242      0 011 001 110 RADIN       W,ZTC
165 0243      1 011 001 100             PT11
166 0244      0 001 011 000             LDC1
167 0245      0 101 011 000             LDC5
168 0246      0 111 011 000             LDC7
169 0247      0 000 011 000             LDC0
170 0250      0 111 011 000             LDC7
171 0251      1 001 011 000             LDC9
172 0252      0 110 011 000             LDC6
173 0253      0 011 011 000             LDC3
174 0254      0 000 111 100             PLS
175 0255 0257 1 010 111 111             BRN     MULT
176 0256      1 110 001 110 MULT1       W,APBA
177 0257      0 101 100 010 MULT        P,CM1C
178 0260 0256 1 010 111 011             BRN     MULT1
179 0261      1 011 001 110             W,SRA
180 0262      0 000 111 100             PLS
```

MODEL FIVE ASSEMBLER - Continued

```
181 0263       1 100 101 100              YP12
182 0264 0257  1 010 111 111              BRN    MULT
183 0265 0355  1 110 110 111              BRN    RETDC
184 0266       1 001 011 000  L9966       LDC9
185 0267       1 001 011 000              LDC9
186 0270       0 110 011 000  L66         LDC6
187 0271       0 110 011 000              LDC6
188 0272       0 000 110 000              RETURN
189 0273       0 101 000 000  PREIN       IS2
190 0274       1 100 100 000              TG6
191 0275       1 110 100 000              TG7
192 0276       1 001 000 000              IS1
193 0277 0316  1 100 111 011              BRN    INDAT
194 0300       0 011 001 010  W50IN       X,ZTC
195 0301       0 111 111 010              XS,CP1C
196 0302       0 101 101 010  W50I1       X,CM1C
197 0303 0302  1 100 001 011              BRN    W50I1
198 0304       0 101 000 000  INDE0       IS2
199 0305       1 100 100 000              TG6
200 0306       1 110 100 000              TG7                PRESET ACCUM
201 0307       1 010 100 000              TG5
202 0310       1 110 100 000              TG7                PDEN
203 0311       1 001 000 000              IS1
204 0312       1 011 100 100  INDFG       RS11               FROM PPMRS
205 0313       0 100 100 000  W50I2       TG2                ACCRDYFLG
206 0314       1 011 010 100              YS11
207 0315 0313  1 100 101 111              BRN    W50I2
208 0316       1 011 000 100  INDAT       SS11
209 0317       0 011 001 110  INDIG       W,ZTC
210 0320       0 111 110 000              CTT
211 0321       0 101 000 000              IS2
212 0322       1 100 100 000              TG6
213 0323       1 101 001 000              TDEC
214 0324       1 001 000 000              IS1
215 0325       0 111 111 000              TTC
216 0326       1 011 010 100              YS11
217 0327 0345  1 110 010 111              BRN    INDA1
218 0330       0 110 100 000              TG3                ACCINL
219 0331       0 101 000 000              IS2
220 0332       0 100 101 000              IXT
221 0333       0 101 001 000              SRT
222 0334       0 101 001 000              SRT
223 0335       0 101 001 000              SRT
224 0336       0 101 001 000              SRT
225 0337       0 101 001 000              SRT
226 0340       0 101 001 000              SRT
227 0341       0 101 001 000              SRT
228 0342       0 101 001 000              SRT
229 0343       1 001 000 000              IS1
230 0344       0 010 100 000              TG1                ACCINH
231 0345       0 101 000 000  INDA1       IS2
232 0346       0 100 101 000              IXT
233 0347       1 010 100 000              TG5
234 0350       0 010 001 000              XOR
235 0351       1 001 000 000              IS1
236 0352       0 111 111 000              TTC
237 0353       1 110 101 110              W,AXC
238 0354       0 000 000 000              NOP
239 0355       0 111 110 100  RETDC       RSD3
240 0356 0306  1 100 011 011              LIO    615    BRN RETD1
241 0357       1 100 101 110  DIVI1       W,AXB
242 0360       0 011 001 110              W,ZTC
243 0361       1 011 001 100              PT11
244 0362 0232  1 001 101 011              BRN    DIV13
245 0363       1 011 110 000              DTDS
246 0364       1 100 101 000              DNR
247 0365       0 110 001 110              W,CTA
248 0366       1 001 110 100              RSD4
249 0367 0044  0 010 010 011              LIO    111    BRN AHL4A
250 0370       0 000 000 000              NOP
251 0371       0 000 000 000              NOP
252 0372       1 010 110 100  DISPL       RGS1
253 0373       0 100 010 000              ROM 2
```

MODEL FIVE ASSEMBLER - Continued

```
254 0374 0001 0 000 000 111            BRN    TRIG    FROM DIST PROJ
255 0375      0 000 000 000             NOP
256 0376      0 001 110 100 PW023       RSD0
257 0377 0362 1 111 001 101             LIO    746     JSB PWRON
258 END
```

```
*
*
MODEL FIVE ASSEMBLER      SECTION 3
                          QUAD ROM 3

BCR30  8-6-76

LIN CURR BRAN OPERATION CODE
 #  ADDR ADDR  BIT PATTERN
  1 #,A,L
  2 0000 0374 1 111 110 101             JSB    PW030   27 MAY 76
  3 0001      0 101 000 000 DIST        IS2
  4 0002 0004 0 000 010 011             LIO    011     ANGL-SIMMER
  5 0003      1 001 000 000             IS1
  6 0004      0 011 001 110             W,ZTC          LOAD 10 SEC BBC
  7 0005      0 111 111 010             XS,CP1C
  8 0006      0 100 101 000 DIST1       CTS
  9 0007 0301 1 100 001 001             JSB    EFPRA
 10 0010 0355 1 110 111 001             JSB    AGC30
 11 0011 0270 1 100 101 101             JSB    KEWTS
 12 0012      1 011 100 100             RS11
 13 0013      0 000 100 000 DIS1A       TG0            EXTFG
 14 0014      1 011 010 100             YS11
 15 0015 0013 0 000 101 111             BRN    DIS1A
 16 0016      1 011 100 100             RS11
 17 0017      0 110 100 000             TG3            GOOD FLAG?
 18 0020      1 010 101 000             MTC
 19 0021      1 001 001 100             PT9
 20 0022      0 001 100 010             P,CM1          DISTANCE
 21 0023 0372 1 111 101 011             BRN    PPMLK   NO
 22 0024      1 100 101 000             DNR            YES
 23 0025      0 101 101 110             W,CM1C         DECREMENT BBC
 24 0026      0 110 101 110             W,ZMC          BBC=0
 25 0027 0266 1 011 011 011             BRN    FLDLK   YES. FLASH DISP
 26 0030      1 011 010 100             YS11           GOOD FLAG?
 27 0031 0006 0 000 011 011             BRN    DIST1   NO
 28 0032 0372 1 111 101 011             BRN    PPMLK
 29 0033      0 001 000 100 DISTR       SS1            YES. LF
 30 0034      0 010 100 100             RS2            HF
 31 0035 0301 1 100 001 001 DIST2       JSB    EFPRA
 32 0036      0 101 000 000             IS2
 33 0037      0 000 100 000             TG0            ENABLE AGC
 34 0040      1 001 000 000             IS1
 35 0041      0 001 010 100             YS1            LF ?
 36 0042 0047 0 010 011 111             BRN    DIST3   NO.
 37 0043      0 101 000 000             IS2            YES
 38 0044 0013 0 000 110 001             LIO    030     SELECT LF
 39 0045      1 001 000 000             IS1
 40 0046 0060 0 011 000 011             BRN    DIST5
 41 0047      0 010 010 100 DIST3       YS2            HF ?
 42 0050 0055 0 010 110 111             BRN    DIST4   NO
 43 0051      0 101 000 000             IS2            YES
 44 0052 0033 0 001 110 001             LIO    070     SELECT HF
 45 0053      1 001 000 000             IS1
 46 0054 0060 0 011 000 011             BRN    DIST5
 47 0055      0 101 000 000 DIST4       IS2
 48 0056 0023 0 001 010 001             LIO    050
 49 0057      1 001 000 000             IS1
 50 0060 0360 1 111 000 101 DIST5       JSB    W30DS
 51 0061 0224 1 001 010 101 DIS5A       JSB    INDAT   INPUT OFFSET
 52 0062      0 100 101 000             CTS
 53 0063 0326 1 101 011 101             JSB    SBBC
 54 0064 0321 1 101 001 001 DIST6       JSB    ICCFG
 55 0065      0 100 100 100             RS4            PS
 56 0066      0 101 000 000             IS2
 57 0067      1 100 100 000             TG6
 58 0070      0 010 100 000             TG1            RESET PS LATCH
```

MODEL FIVE ASSEMBLER - Continued

```
 59 0071        1 010 100 000           TG5
 60 0072        0 100 100 000           TG2              RESET PC PD
 61 0073        1 001 000 000           IS1
 62 0074 0355   1 110 111 001           JSB    AGC30
 63 0075 0301   1 100 001 001           JSB    EFPRA
 64 0076        0 101 000 000           IS2
 65 0077        1 110 100 000           TG7              PDEN
 66 0100        0 010 100 000           TG1              PCENQ
 67 0101        1 001 000 000           IS1
 68 0102 0203   1 000 010 001           JSB    PDIN
 69 0103        1 000 010 100           YS8              GDFLG
 70 0104 0064   0 011 010 011           BRN    DIST6
 71 0105 0321   1 101 001 001           JSB    ICCFG
 72 0106 0305   1 100 011 001           JSB    PREAC
 73 0107        0 101 000 000           IS2
 74 0110        1 110 100 000           TG7              PDEN
 75 0111        0 010 100 000           TG1              PCENQ
 76 0112        1 001 000 000           IS1
 77 0113        0 101 000 100           SS5              PC PASS
 78 0114 0343   1 110 010 001           JSB    PCTST
 79 0115        0 001 001 110           W,AMC            PS NEEDED ?
 80 0116 0175   0 111 110 111           BRN    DSDA9     NO
 81 0117        0 100 000 100           SS4              YES. PS
 82 0120        0 101 000 000           IS2
 83 0121        1 100 100 000           TG6
 84 0122        0 100 100 000           TG2              SET EXTPS LATCH
 85 0123        1 010 100 000           TG5
 86 0124        1 001 000 000           IS1
 87 0125 0175   0 111 110 111           BRN    DSDA9
 88 0126 0326   1 101 011 101  SIGRT    JSB    SBBC      RETURN FROM
 89 0127 0256   1 010 111 101           JSB    ECDA      SIGMA TEST
 90 0130 0301   1 100 001 001  DSDAT    JSB    EFPRA
 91 0131        0 101 000 000           IS2
 92 0132        1 110 100 000           TG7              PDEN
 93 0133        0 110 100 000           TG3              PDENQ
 94 0134        1 001 000 000           IS1
 95 0135        1 000 010 100           YS8              GDFLG?
 96 0136 0146   0 110 011 011           BRN    SDA2      NO
 97 0137        0 101 010 100           YS5              PCPAS
 98 0140 0144   0 110 010 011           BRN    DSDA1
 99 0141 0343   1 110 010 001           JSB    PCTST
100 0142        0 011 110 100           RSD1
101 0143 0001   0 000 000 111           LIO    003       BRN PCPR
102 0144        0 011 110 100  DSDA1    RSD1
103 0145 0121   0 101 000 111           LIO    243       BRN ACDAT
104 0146        0 101 010 100  DSDA2    YS5              PCPAS?
105 0147 0151   0 110 100 111           BRN    DSDA3     NO
106 0150 0064   0 011 010 011           BRN    DIST6     YES
107 0151        0 111 010 100  DSDA3    YS7              AGC
108 0152 0160   0 111 000 011           BRN    DSDA5     NO
109 0153        0 111 100 100  DSDA4    RS7              YES
110 0154 0321   1 101 001 001           JSB    ICCFG
111 0155 0355   1 110 111 001           JSB    AGC30
112 0156 0261   1 011 001 001           JSB    PDIN2
113 0157 0130   0 101 100 011           BRN    DSDAT
114 0160        1 011 100 100  DSDA5    RS11
115 0161        0 100 100 000  DSDA6    TG2              ACCRDY FLAG
116 0162        1 011 010 100           YS11
117 0163 0161   0 111 000 111           BRN    DSDA6
118 0164        1 011 100 100           RS11
119 0165        0 110 100 000           TG3              GOOD FLAG
120 0166        1 011 010 100           YS11
121 0167 0153   0 110 101 111           BRN    DSDA4
122 0170        0 111 000 100           SS7              AGC
123 0171 0173   0 111 101 111           BRN    DSDA8
124 0172        0 111 100 100  DSDA7    RS7              AGC
125 0173 0326   1 101 011 101  DSDA8    JSB    SBBC
126 0174 0321   1 101 001 001           JSB    ICCFG
127 0175 0270   1 011 100 101  DSDA9    JSB    KEYTS
128 0176 0203   1 000 010 001           JSB    PDIN
129 0177 0130   0 101 100 011           BRN    DSDAT
130 0200 0321   1 101 001 001  DSD10    JSB    ICCFG
131 0201 0203   1 000 010 001           JSB    PDIN
```

MODEL FIVE ASSEMBLER - Continued

```
132 0202           0 011 110 100            RSD1
133 0203 0170  0 111 100 011                LIO      361    BRN SIGMA
134 0204           1 011 100 100  PDIN      RS11
135 0205           0 100 100 000  PDIN1     TG2             ACCRDY FLAG
136 0206           0 000 100 000            TG0             EXT FLAG
137 0207           1 011 010 100            YS11
138 0210 0205  1 000 010 111                BRN      PDIN1
139 0211           1 011 100 100            RS11
140 0212           1 000 100 100            RS8             GOOD FLAG SB
141 0213           0 110 100 000            TG3             GOOD FLAG
142 0214           1 011 010 100            YS11
143 0215 0262  1 011 001 011                BRN      PDIN2
144 0216           1 000 000 100            SS8             GOOD FLAG
145 0217           1 011 100 100            RS11
146 0220           0 110 000 100            SS6             NUFLO
147 0221           0 010 100 000            TG1             NUFLO
148 0222           1 011 010 100            YS11
149 0223 0225  1 001 010 111                BRN      INDAT
150 0224           0 110 100 100            RS6             NUFLO
151 0225           0 011 001 110  INDAT     W,ZTC
152 0226           0 111 110 000            CTT
153 0227           0 101 000 000            IS2
154 0230           1 100 100 000            TG6
155 0231           1 101 001 000            TDEC
156 0232           1 001 000 000            IS1
157 0233           0 111 111 000            TTC
158 0234           0 110 100 000            TG3             ACCINL
159 0235           0 101 000 000            IS2
160 0236           0 100 101 000            IXT
161 0237           0 101 001 000            SRT
162 0240           0 101 001 000            SRT
163 0241           0 101 001 000            SRT
164 0242           0 101 001 000            SRT
165 0243           0 101 001 000            SRT
166 0244           0 101 001 000            SRT
167 0245           0 101 001 000            SRT
168 0246           0 101 001 000            SRT
169 0247           1 001 000 000            IS1
170 0250           0 010 100 000            TG1             ACCINH
171 0251           0 101 000 000            IS2
172 0252           0 100 101 000            IXT
173 0253           0 010 001 000            XOR
174 0254           1 010 100 000            TG5
175 0255           0 100 100 000            TG2             DISABLE PCPD
176 0256           1 001 000 000            IS1
177 0257           0 111 111 000  RECDA     TTC
178 0260           1 001 001 110            W,SRC
179 0261           0 000 110 000            RETURN
180 0262           1 000 101 110  PDIN2     W,BXC           RECALL BBC
181 0263           0 101 100 110            M,CM1C          BBC=0?
182 0264 0270  1 011 100 011                BRN      BBTKT  NO
183 0265           1 010 101 000  ABORT     MTC
184 0266           0 011 110 100  FLDLK     RSD1
185 0267 0113  0 100 101 111                LIO      227    BRN ABORT
186 0270           1 000 101 110  BBTKT     W,BXC           STORE BBC
187 0271           0 000 010 100  KEYTS     YS0
188 0272 0277  1 011 111 111                BRN      KEYT1
189 0273           1 010 010 100            YS10            HAS KEY BEEN UP
190 0274 0300  1 100 000 011                BRN      KEYT2  NO
191 0275           0 111 110 100            RSD3            YES
192 0276 0304  1 100 010 011                LIO      611    BRN TKRL1
193 0277           1 010 000 100  KEYT1     SS10            KHBU
194 0300           0 000 100 100  KEYT2     RS0
195 0301           0 000 110 000            RETURN
196 0302           0 000 001 100  EFPRA     PT0
197 0303           1 011 100 100            RS11
198 0304           0 001 101 100  EFPR1     YP1
199 0305 0314  1 100 110 011                BRN      EFPR2
200 0306           0 101 000 000  PREAC     IS2
201 0307           1 100 100 000            TG6
202 0310           1 110 100 000            TG7             PRESET ACCUM
203 0311           1 010 100 000            TG5
204 0312           1 001 000 000            IS1
```

MODEL FIVE ASSEMBLER - Continued

```
205 0313           0 000 110 000           RETURN
206 0314           0 000 100 000  EFPR2    TG0              EXTFLG
207 0315           1 011 010 100           YS11
208 0316 0304 1 100 010 011                BRN     EFPR1
209 0317           0 001 001 100           PT1
210 0320           1 011 100 100           RS11
211 0321 0314 1 100 110 011                BRN     EFPR2
212 0322           1 011 100 100  ICCFG    RS11             WAIT FOR
213 0323           1 110 100 000  ICCF1    TG7              INTERNAL
214 0324           1 011 010 100           YS11
215 0325 0323 1 101 001 111                BRN     ICCF1
216 0326           0 000 110 000           RETURN
217 0327           0 011 000 110  SBBC     M,ZTC            LOAD 10 SEC BBC
218 0330           0 101 001 100           PT5
219 0331           0 001 011 000           LDC1
220 0332           1 000 100 110           M,BXC
221 0333           1 010 101 000           MTC
222 0334           1 011 001 100           PT11
223 0335           0 110 100 010           P,ZMC            TRACK?
224 0336 0343 1 110 001 111                BRN     SBBC1    NO
225 0337           0 011 001 110           W,ZTC            YES
226 0340           0 100 001 100           PT4              LOAD 4 SEC BBC
227 0341           0 100 011 000           LDC4
228 0342           1 000 100 110           M,BXC
229 0343           0 000 110 000  SBBC1    RETURN
230 0344           0 110 001 110  PCTST    W,CTA
231 0345           1 100 101 000           DNR              RECALL OFFSET
232 0346           0 100 101 000           CTS
233 0347           1 101 001 110           W,AMCA
234 0350           0 011 001 110           W,ZTC            LOAD 2500 FOR
235 0351           1 100 001 100           PT12             PC TEST
236 0352           0 010 011 000           LDC2
237 0353           0 101 011 000           LDC5
238 0354           1 110 101 110           W,AXC
239 0355           0 000 110 000           RETURN
240 0356           0 101 000 000  AGC30    IS2
241 0357           0 000 100 000           TG0              ENABLE AGC
242 0360           1 001 000 000           IS1
243 0361           0 011 001 010  W30DS    X,ZTC
244 0362           0 001 001 100           PT1
245 0363           0 101 011 000           LDC5
246 0364           0 101 101 010  AGC31    X,CM1C
247 0365 0364 1 111 010 011                BRN     AGC31
248 0366           0 101 000 000           IS2
249 0367           1 000 100 000           TG4              DISABLE AGC
250 0370           1 001 000 000           IS1
251 0371           0 000 110 000           RETURN
252 0372           1 000 110 100  PPMLK    RGS0
253 0373           0 110 010 000           ROM 3
254 0374 0001 0 000 000 111                BRN              DIST FROM FUNBR
255 0375           1 000 110 100  PW030    RGS0
256 0376           0 000 010 000           ROM 0
257 0377           0 000 000 000           NOP
258 END
```

```
*
*
*
MODEL FIVE ASSEMBLER              BER31
                                  8-6-76

LIN CURR BRAN OPERATION CODE
 #  ADDR ADDR  BIT PATTERN
 1  #,A,L
 2  0000 0374 1 111 110 101                JSB     PW031    27 MAY 76
 3  0001      0 101 100 100  PCPR          RS5              PC PASS
 4  0002      0 001 001 110                W,AMC            PHASE COINC
 5  0003 0016 0 000 111 011                BRN     PCPR3    PASS
 6  0004      0 100 010 100                YS4              PS
 7  0005 0010 0 000 100 011                BRN     PCPR1
```

MODEL FIVE ASSEMBLER - Continued

```
 8 0006         0 100 100 100              RS4
 9 0007 0011    0 000 100 111              BRN    PCPR2
10 0010         0 100 000 100  PCPR1       SS4
11 0011         0 101 000 000  PCPR2       IS2
12 0012         1 100 100 000              TG6
13 0013         0 000 100 000              TG0           RESET INT PS
14 0014         1 010 100 000              TG5
15 0015         1 001 000 000              IS1
16 0016         0 011 001 110  PCPR3       W,ZTC         ZERO STACK
17 0017         0 100 101 000              CTS
18 0020         0 100 101 000              CTS
19 0021         0 010 001 100              PT2           LOAD LF SIGMA
20 0022         0 000 011 000              LDC0          FACTOR
21 0023         0 110 011 000              LDC6
22 0024         0 110 001 110              W,CTA
23 0025         0 011 001 110              W,ZTC
24 0026 0367   1 111 100 001              JSB    DSTC   RECALL NLF
25 0027         1 000 101 010              X,BXC
26 0030         1 010 101 000              MTC           LOAD CYCLE CTR
27 0031         0 011 001 010              X,ZTC         WITH 5
28 0032         0 010 010 100              YS2           HF
29 0033 0035   0 001 110 111              BRN    PCPR4
30 0034 0053   0 010 101 111              BRN    PCPR7
31 0035         0 001 010 100  PCPR4       YS1           LF
32 0036 0045   0 010 010 111              BRN    PCPR6  NO
33 0037         0 101 011 000              LDC5
34 0040         1 000 101 010  PCPR5       X,BXC
35 0041         1 010 101 000  PCP5A       MTC
36 0042         0 010 001 010              X,BTC         STORE N
37 0043         0 010 101 000              CXM
38 0044 0160   0 111 000 011              BRN    ACDA3
39 0045         0 011 001 110  PCPR6       W,ZTC
40 0046         0 011 001 100              PT3
41 0047         0 001 011 000              LDC1
42 0050         0 100 011 000              LDC4
43 0051         0 110 001 110              W,CTA
44 0052 0041   0 010 000 111              BRN    PCP5A
45 0053         0 111 101 010  PCPR7       X,CP1C
46 0054         1 011 001 100              PT11
47 0055         0 001 100 010              P,CM1         TRACK?
48 0056 0040   0 010 000 011              BRN    PCPR5  YES
49 0057         1 100 101 010              X,AXB         NHF=2NLF
50 0060         0 010 001 100              PT2
51 0061         0 011 011 000              LDC3
52 0062         1 110 101 010              X,AXC         LIMIT NHF TO 320
53 0063         0 001 001 010              X,AMC
54 0064 0066   0 011 011 011              BRN    PCP7A
55 0065 0067   0 011 011 111              BRN    PCP7B
56 0066         1 010 101 010  PCP7A       X,CPCC
57 0067         0 010 101 000  PCP7B       CXM           CALCULATE HF
58 0070         0 011 001 110              W,ZTC         SIGMA FACTOR
59 0071         1 100 001 100              PT12
60 0072         0 011 011 000              LDC3          IF LF GT 38KM
61 0073         1 000 011 000              LDC8          SET PPM ADDER
62 0074         0 110 001 110              W,CTA         TO ZERO
63 0075 0367   1 111 100 001              JSB    DSTC   RECALL LF IN KM
64 0076         0 111 110 100              RSD3
65 0077 0251   1 010 100 111              LIO    523    BRN HFSGM
66 0100         0 010 001 110  HFSRT       W,BTC
67 0101         1 011 101 110              W,ZTA         FROM HFSGM R3
68 0102         0 110 001 100              PT6           SQUARE PPM+ADR
69 0103 0346   1 110 011 101              JSB    MPD10
70 0104         1 011 001 110              W,SRA         SHIFT SIGMA
71 0105         1 011 001 110              W,SRA         FACTOR
72 0106         1 011 001 110              W,SRA
73 0107         1 011 001 110              W,SRA
74 0110         1 010 101 000              MTC           RECALL N
75 0111         1 000 101 010              X,BXC
76 0112 0160   0 111 000 011              BRN    ACDA3
77 0113         0 010 100 100  ABORT       RS2           HF
78 0114         1 011 001 100              PT11
79 0115         0 001 100 010              P,CM1         TRACK?
80 0116 0331   1 101 100 111              BRN    FLDS2
```

MODEL FIVE ASSEMBLER - Continued

```
 81 0117 0316 1 100 111 011           BRN    FLDSP
 82 0120      0 000 000 000           NOP
 83 0121      1 001 001 110  ACDAT    W,SRC         ACCUMULATE
 84 0122      1 001 001 110           W,SRC         DATA, SQUARE,
 85 0123      1 001 001 110           W,SRC         SIGMA FACTOR
 86 0124      1 010 001 100           PT10
 87 0125      0 110 010 100           YS6           NUFLO
 88 0126 0130 0 101 100 011           BRN    ACDA1
 89 0127      0 001 011 000           LDC1
 90 0130      1 111 001 110  ACDA1    W,APCA        ACCUM DATA
 91 0131      1 110 101 110           W,AXC
 92 0132      1 100 100 110           M,AXB
 93 0133      1 011 101 110           W,ZTA
 94 0134      0 100 001 100           PT4
 95 0135      0 110 010 010           WP,CTA
 96 0136      1 100 101 000           DNR
 97 0137      0 111 001 110           W,APCC        ACCUM SIGMA
 98 0140      1 100 101 000           DNR           FACTOR
 99 0141      1 100 101 000           DNR
100 0142      0 000 111 110           S,ZTB
101 0143      0 010 001 110           W,BTC
102 0144      0 000 110 010           WP,ZTB
103 0145      1 011 101 110           W,ZTA
104 0146      0 110 001 100           PT6
105 0147 0346 1 110 011 101           JSB    MPD10  SQUARE DATA
106 0150      1 000 101 010           X,BXC
107 0151      1 100 101 000           DNR
108 0152      1 100 101 000           DNR
109 0153      1 100 101 000           DNR
110 0154      0 111 001 110           W,APCC        ACCUM SQUARE
111 0155      1 100 101 000           DNR
112 0156      1 100 101 000           DNR
113 0157      0 110 001 110           W,CTA
114 0160      0 010 001 010  ACDA3    X,BTC
115 0161      0 101 101 010           X,CM1C        ENOUGH CYCLES?
116 0162 0165 0 111 010 111           BRN    ACDA2  NO
117 0163      0 001 110 100           RSD0          YES
118 0164 0200 1 000 000 011           LIO    401    BRN DSD10
119 0165      1 000 101 010  ACDA2    X,BXC
120 0166      0 001 110 100           RSD0
121 0167 0172 0 111 101 011           LIO    365    BRN DSDA7
122 0170      1 110 101 110  SIGMA    W,AXC         STORE ACCUM
123 0171      0 100 101 000           CTS
124 0172      0 100 001 100           PT4           CALCULATE MEAN
125 0173      0 011 010 010           WP,ZTC
126 0174      0 000 001 100           PT0
127 0175      0 101 011 000           LDC5
128 0176      0 110 001 110           W,CTA
129 0177      1 010 101 000           MTC
130 0200      1 110 101 110           W,AXC
131 0201      0 001 001 010           X,AMC
132 0202 0205 1 000 010 111           BRN    SIGM0
133 0203      1 000 101 110           W,BXC
134 0204 0326 1 101 011 011           BRN    NXFLK
135 0205      1 101 101 010  SIGM0    X,AM1A
136 0206      1 001 000 110           M,SRC         DIVIDE BY 5
137 0207      1 010 100 110           M,CPCC
138 0210 0216 1 000 111 011           BRN    SIGM2
139 0211      0 110 000 110  SIGM1    M,CTA         DIVIDE BY 2
140 0212      1 010 100 110           M,CPCC
141 0213      1 010 101 110           W,CPCC
142 0214      0 111 000 110           M,APCC
143 0215      1 001 000 110           M,SRC
144 0216      0 001 001 010  SIGM2    X,AMC
145 0217 0211 1 000 100 111           BRN    SIGM1
146 0220      1 000 101 110           W,BXC
147 0221      0 010 001 110           W,BTC
148 0222      1 011 101 110           W,ZTA
149 0223      0 011 001 100           PT3
150 0224 0346 1 110 011 101           JSB    MPD10  SQUARE MEAN
151 0225      1 100 101 000           DNR
152 0226      0 100 001 100           PT4
153 0227      1 000 110 010           WP,BXC
```

MODEL FIVE ASSEMBLER - Continued

```
154 0230       0 010 010 010           WP,BTC
155 0231       1 100 101 000           DNR
156 0232       1 111 001 110           W,APCA           ADD SGMXN TO
157 0233       1 100 101 000           DNR              MEAN SQUARED
158 0234       1 100 101 000           DNR
159 0235       0 011 001 110           W,ZTC
160 0236       1 000 110 010           WP,BXC
161 0237       1 010 101 110           W,CPCC
162 0240       1 010 101 110           W,CPCC
163 0241       0 101 001 110           W,AMCC           SUBTRACT 4SGM
164 0242       0 110 001 110           W,CTA
165 0243       1 010 101 110           W,CPCC
166 0244       1 010 101 110           W,CPCC
167 0245       1 111 001 110           W,APCA
168 0246       1 010 101 000           MTC
169 0247       1 110 101 110           W,AXC
170 0250       1 000 101 110           W,BXC
171 0251       1 101 101 010           X,AM1A
172 0252       0 011 001 010           X,ZTC
173 0253       0 000 001 100           PT0
174 0254       0 101 011 000           LDC5
175 0255 0262  1 011 001 011           BRN        SIGM7
176 0256       1 010 101 010 SIGM6     X,CPCC           MULTIPLY BY 2
177 0257       1 000 101 110           W,BXC
178 0260       1 010 101 110           W,CPCC
179 0261       1 000 101 110           W,BXC
180 0262       0 001 001 010 SIGM7     X,AMC
181 0263 0256  1 010 111 011           BRN        SIGM6
182 0264       1 100 101 110           W,AXB
183 0265       1 000 101 110           W,BXC
184 0266       1 100 101 000           DNR
185 0267       1 100 101 000           DNR
186 0270       1 100 101 000           DNR
187 0271       0 001 001 110           W,AMC
188 0272 0326  1 101 011 011           BRN        NXFLK SIGMA OK? YES
189 0273       1 100 101 000           DNR                    NO
190 0274       1 100 101 000           DNR
191 0275       0 110 001 110           W,CTA
192 0276       1 010 101 000           MTC
193 0277       0 011 001 010           X,ZTC
194 0300       0 000 001 100           PT0              LOAD 5 FOR
195 0301       0 100 011 000           LDC4             MAX N
196 0302       1 011 001 100           PT11
197 0303       0 001 100 010           P,CM1            TRACK?
198 0304 0307  1 100 011 111           BRN        SIGM8 YES
199 0305       0 010 001 100           PT2
200 0306       0 011 011 000           LDC3             305 FOR MAX N
201 0307       1 110 101 110 SIGM8     W,AXC
202 0310       1 000 001 010           X,AMB            N EQUALS MAX N
203 0311 0335  1 101 110 111           BRN        SIG11
204 0312       1 110 101 110           W,AXC
205 0313       1 011 001 100           PT11
206 0314       0 001 100 010           P,CM1            TRACK?
207 0315 0357  1 110 111 111           BRN        SIG12 YES
208 0316       1 010 101 000 FLDSP     MTC                    NO
209 0317       1 011 001 100           PT11
210 0320       0 011 000 010           P,ZTC            ZERO TRACK SB
211 0321       0 100 001 100           PT4
212 0322       0 001 011 000           LDC1
213 0323       0 010 101 000           CXM
214 0324       0 010 010 100           YS2              HF
215 0325 0330  1 101 100 011           BRN        SIG10
216 0326       0 101 110 100 NXFLK     RSD2
217 0327 0001  0 000 000 111           LIO        003   BRN NXFRQ
218 0330       0 010 000 100 SIG10     SS2              HF
219 0331       1 001 000 100 FLDS2     SS9              ZERDS
220 0332       1 000 110 100           RGS0             LINK TO
221 0333       0 000 010 000           ROM 0            ZERO DS
222 0334       0 000 000 000           NOP
223 0335       1 110 101 110 SIG11     W,AXC
224 0336       1 000 101 110           W,BXC
225 0337       0 101 101 010           X,CM1C
226 0340       1 000 101 110           W,BXC
```

MODEL FIVE ASSEMBLER - Continued

```
227 0341        1 010 101 000              MTC
228 0342        1 010 101 010              X,CPCC
229 0343        0 010 101 000              CXM
230 0344        0 001 110 100              RSD0
231 0345 0126   0 101 011 011              LIO       255        BRN SIGRT
232 0346        1 110 001 110 MPD11        W,APEA
233 0347        0 101 100 010 MPD10        P,CM1C
234 0350 0346   1 110 011 011              BRN       MPD11
235 0351        1 011 001 110              W,SRA
236 0352        0 000 111 100              PLS
237 0353        1 011 101 100              YP11
238 0354 0347   1 110 011 111              BRN       MPD10
239 0355        1 011 001 110              W,SRA
240 0356        0 000 110 000              RETURN
241 0357        0 010 000 100 SIG12        SS2                  HF
242 0360        0 001 010 100              YS1
243 0361 0363   1 111 001 111              BRN       SIG13
244 0362        0 010 100 100              RS2                  HF
245 0363        1 011 101 110 SIG13        W,ZTA                ZERO DATA
246 0364        1 001 000 100              SS9                  FOR ZERO DS
247 0365        1 000 110 100 LODLK        RGS0
248 0366        0 100 010 000              ROM 2
249 0367        0 000 000 000              NOP
250 0370        0 011 010 010 DSTC         WP,ZTC
251 0371        1 001 110 000              ATDS
252 0372        0 000 000 000              NOP
253 0373        1 011 111 000              DSTC
254 0374        0 000 110 000              RETURN
255 0375        1 000 110 100 PWO31        RGS0
256 0376        0 000 010 000              ROM 0
257 0377        0 000 000 000              NOP
258 END
```

*
*
*
*

MODEL FIVE ASSEMBLER    BER32
                        8-6-76

```
LIN CURR BRAN OPERATION CODE
 #  ADDR ADDR BIT PATTERN
 1  #,A,L
 2  0000 0374 1 111 110 101              JSB       PWO32      20 FEB 76
 3  0001      1 100 101 110 NXFRQ        W,AXB                FROM ROM 1
 4  0002      1 011 101 010              X,ZTA                ZERO N
 5  0003      0 011 001 110              W,ZTC
 6  0004      1 001 001 100              PT9
 7  0005      0 101 011 000              LDC5
 8  0006      0 100 010 100              YS4                  PS
 9  0007 0011 0 000 100 111              BRN       NXFR1
10  0010      1 111 001 110              W,APCA
11  0011      1 001 001 110 NXFR1        W,SRC
12  0012      1 001 001 110              W,SRC
13  0013      0 010 010 100              YS2                  HF
14  0014 0016 0 000 111 011              BRN       NXF1A      NO.  OFF=50
15  0015      0 010 011 000              LDC2                 YES. OFF=250
16  0016      0 101 001 110 NXF1A        W,AMCC               SUB OFFSET
17  0017      1 011 101 110              W,ZTA
18  0020      1 001 001 100              PT9
19  0021      0 110 010 010              WP,CTA               MOD 10,000
20  0022      0 011 001 110              W,ZTC
21  0023 0357 1 111 000 001              JSB       RECDS
22  0024      0 010 010 100              YS2                  HF?
23  0025 0032 0 001 101 011              BRN       NXFR2      NO
24  0026      1 110 100 110              M,AXC                YES
25  0027      1 011 110 000              DTDS                 STORE HF
26  0030      0 010 100 100              RS2
27  0031 0070 0 011 100 011              BRN       NXFR4
28  0032      0 001 010 100 NXFR2        YS1                  LF
29  0033 0072 0 011 101 011              BRN       DCOMB
30  0034      0 011 001 110              W,ZTC                SUBTRACT
31  0035      1 010 001 100              PT10                 LF FROM 10000
```

MODEL FIVE ASSEMBLER - Continued

```
 32 0036       0 111 100 010          P,CP1C
 33 0037       1 110 101 110          W,AXC
 34 0040       0 101 001 110          W,AMCC
 35 0041       0 011 000 010          P,ZTC
 36 0042       1 010 101 110          W,CPCC         CONVERT TO KM.
 37 0043       1 010 101 110          W,CPCC
 38 0044       0 110 001 110          W,CTA
 39 0045       0 100 001 110          W,SLA
 40 0046       0 100 001 110          W,SLA
 41 0047       0 100 001 110          W,SLA
 42 0050       1 100 101 110          W,AXB
 43 0051       1 010 101 000          MTC
 44 0052       0 110 001 110          W,CTA
 45 0053       0 011 001 110          W,ZTC
 46 0054       0 000 001 100          PT0
 47 0055       0 101 011 000          LDC5
 48 0056       0 001 100 100          RS1            LF
 49 0057       1 011 001 100          PT11
 50 0060       1 001 100 010          P,AM1          TRACK?
 51 0061 0063  0 011 001 111          BRN    NXFR3   YES N=5
 52 0062       1 110 101 010          X,AXC          NO. N=NLF
 53 0063       0 010 000 100 NXFR3    SS2
 54 0064       1 011 110 000          DTDS
 55 0065 0354  1 110 110 101          JSB    RECSD
 56 0066       1 000 101 110          W,BXC
 57 0067       1 011 110 000          DTDS
 58 0070       0 001 110 100 NXFR4    RSD0
 59 0071 0035  0 001 110 111          LIO    ?3      BRN DIST2
 60 0072       0 100 001 110 DCOMB    W,SLA
 61 0073       1 110 101 110          W,AXC
 62 0074       1 010 101 110          W,CPCC         CONVERT TO
 63 0075       1 010 101 110          W,CPCC         METERS
 64 0076       0 110 001 110          W,CTA
 65 0077       0 000 101 110          W,ZTB
 66 0100       1 001 001 100          PT9
 67 0101       0 100 110 010          WP,ATB
 68 0102       1 100 101 110          W,AXB
 69 0103       0 011 001 110          W,ZTC          NO
 70 0104 0357  1 111 000 001          JSB    RECDS   COMBINE HF
 71 0105       0 011 001 010          X,ZTC
 72 0106       1 110 101 110          W,AXC          AND MF
 73 0107       1 101 001 110          W,AMCA
 74 0110       0 011 001 110          W,ZTC
 75 0111       1 001 001 100          PT9
 76 0112       0 101 011 000          LDC5
 77 0113 0322  1 101 001 101          JSB    MOTSB
 78 0114 0340  1 110 000 101          JSB    M400
 79 0115       0 100 101 110          W,ATB
 80 0116 0354  1 110 110 101 DCOM1    JSB    RECSD   RECALL LF
 81 0117       1 001 001 110          W,SRC          DIVIDE LF BY 4
 82 0120       0 110 001 110          W,CTA
 83 0121       1 111 001 110          W,APCA
 84 0122       1 001 001 110          W,SRC
 85 0123       1 111 001 110          W,APCA
 86 0124       1 010 101 110          W,CPCC
 87 0125       1 010 101 110          W,CPCC
 88 0126       1 111 001 110          W,APCA
 89 0127       0 011 001 110          W,ZTC
 90 0130       1 010 001 100          PT10
 91 0131       1 110 110 010          WP,AXC
 92 0132       1 010 101 110          W,CPCC         LF UNITS X 4
 93 0133       1 010 101 110          W,CPCC
 94 0134       1 001 001 110          W,SRC
 95 0135       0 110 001 110          W,CTA
 96 0136       1 011 111 000          DSTC
 97 0137       1 001 001 110          W,SRC
 98 0140       1 000 101 110          W,BXC
 99 0141       1 001 001 110          W,SRC
100 0142       1 110 101 110          W,AXC
101 0143       1 101 001 110          W,AMCA         MF MINUS LFU
102 0144       0 011 001 110          W,ZTC
103 0145       1 010 001 100          PT10
104 0146       0 010 011 000          LDC2           200M TO C
```

MODEL FIVE ASSEMBLER - Continued

```
105 0147 0322 1 101 001 101           JSB    MCTSB
106 0150      1 011 001 110           W,SRA
107 0151 0340 1 110 000 101           JSB    M400
108 0152      0 100 101 110           W,ATB
109 0153      0 010 101 110           W,BTC
110 0154      0 100 101 000           CTS            STORE DIST
111 0155      1 100 001 100           PT12
112 0156      0 001 011 000           LDC1
113 0157      0 000 000 000           NOP
114 0160 0357 1 111 000 001           JSB    RECDS   RECALL PPM
115 0161      1 001 000 110           M,SRC
116 0162      0 110 001 110           W,CTA
117 0163      0 011 001 110           W,ZTC
118 0164      1 011 001 100           PT11           SUBTRACT PPM
119 0165      0 001 011 000           LDC1           FROM 110
120 0166      0 001 011 000           LDC1
121 0167      1 110 101 110           W,AXC
122 0170      1 000 001 100           PT8
123 0171      0 011 010 010           WP,ZTC         ZERO RS
124 0172      1 101 000 110           M,AMCA
125 0173      0 110 111 110           S,ZMC          PPM NEG?
126 0174 0177 0 111 111 111           BRN    DCOM2   NO
127 0175      1 111 000 110           M,APCA         YES
128 0176      1 111 000 110           M,APCA
129 0177      1 110 101 110  DCOM2    W,AXC
130 0200      1 011 101 110           W,ZTA
131 0201      1 001 001 100           PT9
132 0202      0 111 110 100           RSD3
133 0203 0365 1 111 010 111           LIO    753     BRN MPYL1
134 0204      1 011 000 110  DCPRT    M,SRA          SHIFT PPM ADDER
135 0205      1 011 000 110           M,SRA
136 0206      1 011 000 110           M,SRA
137 0207      1 100 101 000           DNR            RECALL DIST
138 0210      1 110 101 110           W,AXC
139 0211      1 101 000 110           M,AMCA         SUBTRACT PPM
140 0212 0340 1 110 000 101           JSB    M400
141 0213      0 100 001 110           W,SLA
142 0214      0 100 001 110           W,SLA
143 0215      1 010 101 000           MTC
144 0216      1 001 001 110           W,SRC          ADD STATUS BITS
145 0217      0 101 001 100           PT5
146 0220      0 011 011 000           LDC3           LOAD SD ANNUN
147 0221      1 001 001 110           W,SRC
148 0222      1 001 001 110           W,SRC
149 0223      0 110 010 010           WP,CTA
150 0224 0354 1 110 110 101           JSB    RECSD
151 0225      1 110 101 110           W,AXC
152 0226      0 110 001 110           W,CTA
153 0227      1 011 110 000           DTDS
154 0230      1 010 101 000           MTC            RECALL STATUS
155 0231      1 000 001 100           PT8            SUBFUNCTION SB
156 0232      0 110 100 010           P,ZMC          PROJECTION?
157 0233 0366 1 111 011 011           BRN    UNCLK   NO
158 0234 0370 1 111 100 011           BRN    ANGLK   YES
159 0235      0 100 100 100  PROJ     RS4            FROM ANGLE MEAS
160 0236      1 010 101 000           MTC
161 0237      1 011 001 100           PT11
162 0240      0 110 100 010           P,ZMC          TRACK?
163 0241 0243 1 010 001 111           BRN    PROJ1
164 0242      0 100 000 100           SS4            2ITER
165 0243      1 011 111 000  PROJ1    DSTC
166 0244      0 101 001 100           PT5            ROUND TO CC
167 0245      1 011 101 110           W,ZTA
168 0246      0 110 010 010           WP,CTA
169 0247      1 111 001 110           W,APCA
170 0250      1 011 110 010           WP,ZTA
171 0251      0 010 100 100           RS2            LEVEL IN TRIG
172 0252 0372 1 111 101 011           BRN    TRGLK
173 0253      0 100 101 000  PROTR    CTS            STORE TAN(COT)
174 0254      1 000 101 110           W,BXC          CALCULATE
175 0255      0 010 001 110           W,BTC          SIN(COS)
176 0256      1 011 101 110           W,ZTA
177 0257      0 100 001 100           PT4
```

MODEL FIVE ASSEMBLER - Continued

```
178 0260        0 111 110 100           RSD3              SQUARE TAN(COT)
179 0261 0362   1 111 001 011           LIO     745       BRN MPYL2
180 0262        0 011 001 110 PROR2     W,ZTC
181 0263        1 010 001 100           PT10
182 0264        0 001 011 000           LDC1
183 0265        0 111 001 110           W,APCC            1+TAN(COT) SQD
184 0266        1 001 001 110           W,SRC
185 0267 0275   1 011 111 001           JSB     SQRT
186 0270        0 110 001 110           W,CTA             SIN(COS) TO A
187 0271 0354   1 110 110 101           JSB     RECSD     RECALL SL DIST
188 0272        0 111 110 100           RSD3
189 0273 0001   0 000 000 111           LIO     003       BRN PROCT
190 0274        0 000 000 000           NOP
191 0275        0 000 000 000           NOP
192 0276        0 110 001 110 SQRT      W,CTA
193 0277        1 010 101 110           W,CPCC
194 0300        1 010 101 110           W,CPCC
195 0301        1 111 001 110           W,APCA
196 0302        1 011 001 110           W,SRA
197 0303        0 011 001 110           W,ZTC
198 0304        1 000 001 100           PT8
199 0305        0 101 011 000           LDC5
200 0306        1 001 001 100           PT9
201 0307 0311   1 100 100 111           BRN     SQRT2
202 0310        0 111 100 010 SQRT1     P,CP1C
203 0311        1 101 001 110 SQRT2     W,AMCA
204 0312 0310   1 100 100 011           BRN     SQRT1
205 0313        1 111 001 110           W,APCA
206 0314        0 000 011 100           PRS
207 0315        1 001 010 010           WP,SRC
208 0316        0 100 001 110           W,SLA
209 0317        0 000 101 100           YP0
210 0320 0311   1 100 100 111           BRN     SQRT2
211 0321        1 001 001 110           W,SRC
212 0322        0 000 110 000           RETURN
213 0323        1 101 001 110 MOTSB     W,AMCA
214 0324        1 001 111 110           S,AM1
215 0325 0327   1 101 011 111           BRN     MOTS1
216 0326 0333   1 101 101 111           BRN     MOTS2
217 0327        1 111 001 110 MOTS1     W,APCA
218 0330        1 111 001 110           W,APCA
219 0331        1 001 111 110           S,AM1
220 0332 0336   1 101 111 011           BRN     MOTS3
221 0333        1 101 001 110 MOTS2     W,AMCA
222 0334        0 000 000 000           NOP
223 0335 0337   1 101 111 111           BRN     MOTS4
224 0336        1 111 001 110 MOTS3     W,APCA
225 0337        1 110 001 110 MOTS4     W,APBA
226 0340        0 000 110 000           RETURN
227 0341        0 011 001 110 M400      W,ZTC
228 0342        1 011 001 100           PT11
229 0343        0 100 011 000           LDC4
230 0344        1 001 111 110           S,AM1
231 0345 0353   1 110 101 111           BRN     M4002
232 0346        0 001 001 110           W,AMC
233 0347 0351   1 110 100 111           BRN     M4001
234 0350        0 000 110 000           RETURN
235 0351        1 101 001 110 M4001     W,AMCA
236 0352        0 000 110 000           RETURN
237 0353        1 111 001 110 M4002     W,APCA
238 0354        0 000 110 000           RETURN
239 0355        1 100 001 100 RECSD     PT12
240 0356        0 011 011 000           LDC3
241 0357        0 000 000 000           NOP
242 0360        0 011 010 010 RECDS     WP,ZTC
243 0361        1 001 110 000           ATDS
244 0362        0 000 000 000           NOP
245 0363        1 011 111 000           DSTC
246 0364        0 000 110 000           RETURN
247 0365 0235   1 001 110 111           BRN     PROJ      FROM ANGLE MEAS
248 0366        1 000 110 100 UNCLK     RGS0              TO UNITS CONV
249 0367        0 100 010 000           ROM 2
250 0370        1 000 110 100 ANGLK     RGS0              TO ANG-LVL
```

MODEL FIVE ASSEMBLER - Continued

```
251 0371      1 000 010 000         ROM 4
252 0372      1 000 110 100 TRGLK   RGS0              TO TRIG
253 0373      1 100 010 000         ROM 6
254 0374 0253 1 010 101 111 TRGRT   BRN      FROTR    FROM TRIG
255 0375      1 000 110 100 PW032   RGS0
256 0376      0 000 010 000         ROM 0
257 0377      0 000 000 000         NOP
258 END
*
*
```

MODEL FIVE ASSEMBLER

BGR33

```
LIN  CURR BRAN OPERATION CODE
 #   ADDR ADDR BIT PATTERN
  1  #,A,L
  2  0000 0374 1 111 110 101         JSB      PW033   27 MAY 76
  3  0001      1 001 001 110 PROCT   W,SRC            DIST PROJ CONT
  4  0002      1 001 001 110         W,SRC            SHIFT SIN(COS)
  5  0003      0 100 001 110         W,SLA
  6  0004      0 100 001 110         W,SLA
  7  0005      0 100 001 110         W,SLA
  8  0006      0 010 001 100         PT2
  9  0007      0 011 010 010         WP,ZTC           ZERO STATUS
 10  0010      1 100 101 110         W,AXB            PREPARE FOR DIV
 11  0011      0 110 001 110         W,CTA
 12  0012      0 011 001 110         W,ZTC
 13  0013      1 011 001 100         PT11
 14  0014 0315 1 100 111 001         JSB      DIV     COMPUTE HD(VD)
 15  0015      1 000 101 110         W,BXC
 16  0016      1 100 101 000         DNR
 17  0017      1 011 101 110         W,ZTA
 18  0020      0 100 001 100         PT4              COMPUTE OTHER
 19  0021 0332 1 101 101 101         JSB      MPY     PROJECTION
 20  0022      0 100 001 110         W,SLA
 21  0023      0 100 001 110         W,SLA
 22  0024      0 100 001 110         W,SLA
 23  0025      1 100 101 110         W,AXB
 24  0026      0 100 001 110         W,SLA
 25  0027      0 100 001 110         W,SLA
 26  0030      1 010 101 000         MTC
 27  0031      1 001 001 110         W,SRC
 28  0032      1 001 001 110         W,SRC
 29  0033      1 001 001 110         W,SRC
 30  0034      0 011 001 100         PT3              LOAD HD ANNUN
 31  0035      0 100 011 000         LDC4
 32  0036      0 100 001 100         PT4
 33  0037      0 110 010 010         WP,CTA           ADD STATUS BITS
 34  0040      0 100 110 010         WP,ATB
 35  0041      0 011 001 110         W,ZTC
 36  0042      1 100 001 100         PT12
 37  0043      0 100 011 000         LDC4             LOAD HD DS ADR
 38  0044      0 000 000 000         NOP
 39  0045      0 111 010 100         YS7              GT50
 40  0046 0050 0 010 100 011         BRN      PROC1
 41  0047      1 100 101 110         W,AXB            HD TO A
 42  0050 0354 1 110 110 101 PROC1   JSB      STDS    STORE HD
 43  0051      1 110 101 110         W,AXC            HD TO B
 44  0052      1 100 101 110         W,AXB            VD TO A
 45  0053      1 011 001 110         W,SRA
 46  0054      0 110 010 100         YS6              NSIN
 47  0055 0057 0 010 111 111         BRN      PROC2
 48  0056      1 101 111 110         S,AM1A           LOAD SIGN OF VD
 49  0057      0 010 001 100 PROC2   PT2
 50  0060      1 111 130 010         P,AP1A           LOAD VD ANNUN
 51  0061      1 100 001 100         PT12
 52  0062      0 101 011 000         LDC5
 53  0063      0 000 000 000         NOP
 54  0064 0354 1 110 110 101         JSB      STDS    STORE VD
 55  0065      1 100 101 110         W,AXB
 56  0066      1 010 101 000         MTC
 57  0067      1 011 001 100         PT11
```

MODEL FIVE ASSEMBLER - Continued

```
 58 0070        0 110 100 010            P,ZMC         TRACK?
 59 0071 0076  0 011 111 011            BRN     PROC4  NO
 60 0072       1 100 101 110            W,AXB          YES
 61 0073 0220  1 001 000 011            BRN     PRD10  VERT
 62 0074       0 101 110 100  UNCL3     RSD2
 63 0075 0366  1 111 011 011            LIO     755    BRN UNCLK
 64 0076       1 011 001 110  PROC4     W,SRA          CORRECT FOR
 65 0077       1 011 001 110            W,SRA          CURVATURE AND
 66 0100       1 011 101 010            X,ZTA          REFRACTION
 67 0101       0 100 101 110            W,ATB          CALCULATE
 68 0102       0 010 001 110            W,BTC          E=6.732HD
 69 0103       1 111 001 110            W,APCA
 70 0104       0 111 001 110            W,APCC
 71 0105       1 011 001 110            W,SRA
 72 0106       1 111 001 110            W,APCA
 73 0107       1 011 001 110            W,SRA
 74 0110       1 010 101 110            W,CPCC
 75 0111       1 111 001 110            W,APCA
 76 0112       1 110 001 110            W,APBA
 77 0113       1 011 001 110            W,SRA
 78 0114       1 111 001 110            W,APCA         E TO A
 79 0115       1 110 101 110            W,AXC
 80 0116       1 001 001 110            W,SRC
 81 0117       0 100 101 000            CTS            STORE E
 82 0120       1 011 101 110            W,ZTA
 83 0121       0 101 001 100            PT5
 84 0122 0332  1 101 101 101            JSB     MPY    EXHD
 85 0123       1 011 001 110            W,SRA
 86 0124       1 011 111 000            DSTC           RECALL VD
 87 0125       0 011 001 100            PT3
 88 0126       0 011 010 010            WP,ZTC         ZERO STATUS BIT
 89 0127       0 100 101 000            CTS            STORE VD
 90 0130       0 110 111 110            S,ZMC          ADD EXHD TO VD
 91 0131 0140  0 110 000 011            BRN     PROC6  WITH PROPER SGN
 92 0132       0 001 000 110            M,AMC
 93 0133 0135  0 101 110 111            BRN     PROC5
 94 0134       1 110 101 110            W,AXC
 95 0135       1 101 000 110  PROC5     M,AMCA
 96 0136       0 000 000 000            NOP
 97 0137 0141  0 110 000 111            BRN     PROC7
 98 0140       1 111 001 110  PROC6     W,APCA
 99 0141       1 011 111 000  PROC7     DSTC           ADD STATUS TO
100 0142       0 011 001 100            PT3            VD
101 0143       0 110 010 010            WP,CTA
102 0144       1 110 101 110            W,AXC
103 0145       1 011 110 000            DTDS           STORE COR VD
104 0146       1 100 101 000            DNR
105 0147       1 100 101 000            DNR            RECALL E1
106 0150       0 110 001 110            W,CTA          CALCULATE
107 0151       0 100 101 110            W,ATB          E1=2.1655E
108 0152       1 010 101 110            W,CPCC
109 0153       1 010 101 110            W,CPCC
110 0154       0 111 001 110            W,APCC
111 0155       0 110 001 110            W,CTA
112 0156       1 011 001 110            W,SRA
113 0157       1 111 001 110            W,APCA
114 0160       1 011 001 110            W,SRA
115 0161       1 110 001 110            W,APBA
116 0162       1 111 001 110            W,APCA
117 0163       1 011 001 110            W,SRA
118 0164       1 110 001 110            W,APBA
119 0165       1 011 001 110            W,SRA
120 0166       1 110 001 110            W,APBA
121 0167       1 110 001 110            W,APBA
122 0170       1 100 101 000            DNR
123 0171       1 100 101 000            DNR
124 0172       1 100 101 000            DNR            RECALL VD
125 0173       1 110 101 110            W,AXC
126 0174       1 100 101 110            W,AXB          E1 TO C
127 0175       1 010 000 110            M,SRB          VD TO B
128 0176       1 011 101 110            W,ZTA
129 0177       0 101 001 100            PT5
130 0200 0277  1 100 000 001            JSB     MPYS   CALC E1 X VD
```

MODEL FIVE ASSEMBLER - Continued

```
131 0201        1 110 111 110          S,AXC
132 0202        1 100 001 100          PT12
133 0203        0 100 011 000          LDC4
134 0204        0 000 000 000          NOP
135 0205 0347  1 110 100 001           JSB     RECDS   RECALL HD
136 0206        0 100 001 100          PT4
137 0207        0 011 010 010          WP,ZTC          ZERO STATUS
138 0210        1 110 101 110          W,AXC
139 0211 0341  1 110 001 001           JSB     GNAD    ADD HD-E1VD
140 0212        1 011 111 000 PROC9    DSTC
141 0213        0 100 001 100          PT4
142 0214        0 110 010 010          WP,CTA          ADD STATUS TO
143 0215        1 110 101 110          W,AXC           HD
144 0216        1 011 110 000          DTDS            STORE HD
145 0217        1 000 101 110          W,BXC
146 0220        0 011 001 110 PRO10    W,ZTC
147 0221        1 100 001 100          PT12
148 0222        0 101 011 000          LDC5
149 0223        0 000 000 000          NOP
150 0224 0347  1 110 100 001           JSB     RECDS   YES
151 0225        0 110 001 110          W,CTA           RECALL VERT
152 0226        0 100 001 110          W,SLA
153 0227        1 011 111 010          XS,ZTA
154 0230        0 110 111 110          S,ZMC
155 0231 0233  1 001 101 111           BRN     PR10A
156 0232       -1 101 111 010          XS,AN1A
157 0233        1 010 101 000 PR10A    MTC
158 0234        0 011 001 100          PT3
159 0235        0 110 100 010          P,ZMC
160 0236 0240  1 010 000 011           BRN     PRO11
161 0237        1 111 101 110          W,AP1A
162 0240        1 110 101 110 PRO11    W,AXC
163 0241        1 011 110 000          DTDS
164 0242        1 110 101 110          W,AXC
165 0243        1 000 001 100          PT8
166 0244        0 111 100 010          P,CP1C
167 0245 0247  1 010 011 111           BRN     PRO12
168 0246 0074  0 011 110 011           BRN     UNCL3
169 0247        1 100 101 110 PRO12    W,AXB
170 0250 0074  0 011 110 011           BRN     UNCL3
171 0251        1 001 001 110 HFSGM    W,SRC           FROM ROM1
172 0252        0 001 001 110          W,AMC           GT 38KM
173 0253 0255  1 010 110 111           BRN     HFSG1   NO
174 0254        0 011 001 110          W,ZTC           YES
175 0255        1 001 001 110 HFSG1    W,SRC
176 0256        1 001 001 110          W,SRC
177 0257        0 110 001 110          W,CTA
178 0260        0 100 101 110          W,ATB
179 0261        1 010 101 110          W,CPCC          CALC HF SGM
180 0262        1 111 001 110          W,APCA
181 0263        1 010 101 000          MTC
182 0264        1 010 101 010          X,CPCC
183 0265        0 001 111 010          XS,CM1          NHF GT 40
184 0266 0270  1 011 100 011           BRN     HFSG2   YES. USE 3PPM
185 0267        1 100 101 110          W,AXB           NO. USE 1PPM
186 0270        1 011 001 110 HFSG2    W,SRA
187 0271        0 011 001 110          W,ZTC
188 0272        1 000 001 100          PT8
189 0273        0 010 011 000          LDC2            ADD 2MM
190 0274        0 111 001 110          W,APCC
191 0275        1 000 101 110          W,BXC
192 0276        0 011 110 100          RSD1
193 0277 0100  0 100 000 011           LIO             BRN HFSRT
194 0300        0 010 011 110 MPYS     S,BTC
195 0301        0 000 111 110          S,ZTB
196 0302        0 000 000 000          NOP
197 0303 0333  1 101 101 111           BRN
198 0304        1 100 001 100 TKRL1    PT12            SET SD DS REG
199 0305        0 011 011 000          LDC3            TO ZERO IF
200 0306        0 000 000 000          NOP             NO ANNUN IN D3
201 0307 0347  1 110 100 001           JSB     RECDS
202 0310        0 011 001 100          PT3
203 0311        0 001 100 010          P,CM1
```

MODEL FIVE ASSEMBLER - Continued

```
204 0312 0370 1 111 100 011           BRN     TKRLK
205 0313      0 011 001 110           W,ZTC
206 0314      1 011 110 000           DTDS
207 0315 0370 1 111 100 011           BRN     TKRLK
208 0316      0 011 001 110 DIV       W,ZTC
209 0317      0 000 000 000           NOP
210 0320 0322 1 101 001 011           BRN     DIV2
211 0321      0 111 100 010 DIV1      P,CP1C
212 0322      1 100 001 110 DIV2      W,AMBA
213 0323 0321 1 101 000 111           BRN     DIV1
214 0324      1 110 001 110           W,APBA
215 0325      0 000 011 100           PRS
216 0326      0 100 001 110           W,SLA
217 0327      0 010 101 100           YP2
218 0330 0322 1 101 001 011           BRN     DIV2
219 0331      0 000 110 000           RETURN
220 0332      1 110 001 110 MPY1      W,APBA
221 0333      0 101 100 010 MPY       P,CM1C
222 0334 0332 1 101 101 011           BRN     MPY1
223 0335      1 011 001 110           W,SRA
224 0336      0 000 111 100           PLS
225 0337      1 100 101 100           YP12
226 0340 0333 1 101 101 111           BRN     MPY
227 0341      0 000 110 000           RETURN
228 0342      0 110 111 110 SGNAD     S,ZMC
229 0343 0346 1 110 011 011           BRN     SGNA1
230 0344      1 111 000 110           M,APCA
231 0345      0 000 110 000           RETURN
232 0346      1 101 000 110 SGNA1     M,AMCA
233 0347      0 000 110 000           RETURN
234 0350      0 011 010 010 RECDS     WP,ZTC
235 0351      1 001 110 000           ATDS
236 0352      0 000 000 000           NOP
237 0353      1 011 111 000           DSTC
238 0354      0 000 110 000           RETURN
239 0355      0 011 010 010 STDS      WP,ZTC
240 0356      1 001 110 000           ATDS
241 0357      1 110 101 110           W,AXC
242 0360      1 011 110 000           DTDS
243 0361      0 000 110 000           RETURN
244 0362 0332 1 101 101 101 MPYL2     JSB     MF
245 0363      0 101 110 100           RSD2
246 0364 0262 1 011 001 011           LIO             BRN PROR2
247 0365 0332 1 101 101 101 MPYL1     JSB     MF
248 0366      0 101 110 100           RSD2
249 0367 0204 1 000 010 011           LIO     41      BRN DCPRT
250 0370      1 000 110 100 TKRLK     RGS0            TO TKRA
251 0371      0 010 010 000           ROM 1
252 0372      0 001 110 100 PPMRT     RSD0            FROM PPMRS
253 0373 0033 0 001 101 111           LIO     067     BRN DISTR
254 0374      0 000 000 000           NOP
255 0375      1 000 110 100 PW033     RGS0
256 0376      0 000 010 000           ROM 0
257 0377      0 000 000 000           NOP
258 END
*                    SECTION Y
*                    QUAD ROM 4
MODEL FIVE ASSEMBLER

BOR4O 8-6-76

LIN CURR BRAN OPERATION CODE
 #  ADDR ADDR  BIT PATTERN
 1  #,A,L
 2  0000 0374 1 111 110 101           JSB     RG0P0   24 MAY 76
 3  0001      1 000 110 100 RETN      RGS0            RETURN TO OPKBD
 4  0002      0 010 010 000           ROM 1           RET ST TST
 5  0003      0 010 000 100           SS2             ENV COR TEST
 6  0004      1 111 110 100           RSD7            
 7  0005 0076 0 011 111 011           LIO     175     BRN OSTST
 8  0006      1 111 110 100           RSD7            TIGER TEST
 9  0007 0034 0 001 110 011           LIO     071     BRN TIGRT
10  0010      1 111 110 100           RSD7            DIST FROM TST
```

MODEL FIVE ASSEMBLER - Continued

```
11 0011 0001 0 000 000 111          LIO     003     BRN DISPR
12 0012      0 000 110 100          CLS             RETURN KEY
13 0013 0307 1 100 100 001          JSB     W600
14 0014      0 000 101 000          DSTO
15 0015 0024 0 001 010 011          BRN     RETL1
16 0016      0 011 011 110 STLK0    S,ZTC           SELF TEST
17 0017      1 100 001 100          PT12
18 0020      0 011 000 010          P,ZTC
19 0021      0 111 100 010          P,CP1C
20 0022      0 010 101 000          CXM
21 0023 0027 0 001 011 111          BRN     STLK2
22 0024      1 011 101 110 RETL1    W,ZTA
23 0025      1 001 000 100          SS9             ZERO DISPLAY
24 0026 0001 0 000 000 111          BRN     RETN
25 0027      1 111 110 100 STLK2    RSD7
26 0030 0347 1 110 100 001          LIO     720     JSB ENRDS
27 0031 0111 0 100 100 111          BRN     SELFT
28 0032      0 101 000 100          SS5             HF
29 0033      0 100 000 100          SS4             MF
30 0034      1 011 110 100          RSD5            LF
31 0035 0001 0 000 000 111          LIO     003     BRN DISTS
32 0036      0 010 000 100          SS2             LEVEL
33 0037 0044 0 010 010 011          BRN     ANGLK
34 0040      0 100 000 100          SS4             REF
35 0041 0044 0 010 010 011          BRN     ANGLK
36 0042      0 111 000 100          SS7             F2T
37 0043      0 110 000 100          SS6             F1T
38 0044      1 101 110 100 ANGLK    RSD6            COARSE
39 0045 0111 0 100 100 111          LIO     223     BRN ANGTS
40 0046      0 001 000 100          SS1             DIGITAL
41 0047 0044 0 010 010 011          BRN     ANGLK
42 0050      1 011 001 100          PT11            TRACK
43 0051 0057 0 010 111 111          BRN     PREF1
44 0052      0 000 000 000          NOP
45 0053 0060 0 011 000 011          BRN     PREF2
46 0054      0 011 001 100 EXTDS    PT3             EXT ONLY
47 0055 0057 0 010 111 111          BRN     PREF1
48 0056      0 101 001 100          PT5             INT ONLY
49 0057      0 001 011 000 PREF1    LDC1
50 0060      0 010 101 000 PREF2    CXM
51 0061      0 101 000 000 TKBLP    IS2
52 0062 0004 0 000 010 011          LIO     011     ANG REF
53 0063      1 100 100 000          TG6             TGRP2
54 0064      0 110 100 000          TG3             2ND AR OFF
55 0065      1 010 100 000          TG5             TGRP1
56 0066      0 100 100 000          TG2             DISABLE PC PD
57 0067      1 000 100 000          TG4             HOLD AGC
58 0070      1 001 000 000          IS1
59 0071 0332 1 101 101 101          JSB     SSW0
60 0072      0 010 101 000          CXM
61 0073      1 001 000 100          SS9             FOR RET FROM
62 0074      1 111 110 100 TKBL1    RSD7            KEYDN
63 0075 0151 0 110 101 001          LIO     324     JSB KEYDN
64 0076      1 011 010 100          YS11
65 0077 0074 0 011 110 011          BRN     TKBL1
66 0100      0 000 110 100 TKBL2    CLS
67 0101      0 000 000 000          NOP
68 0102      1 000 101 000          DSOF
69 0103      1 010 101 000          MTC
70 0104      1 100 001 100          PT12            FOR SELF TST
71 0105      0 011 010 000          TKRA
72 0106      0 011 001 110 TKRLK    W,ZTC
73 0107      0 010 101 000          CXM
74 0110 0100 0 100 000 011          BRN     TKBL2
75 0111      1 001 000 100 SELFT    SS9             SELF TEST
76 0112      0 101 000 000          IS2
77 0113 0143 0 110 010 001          LIO     310
78 0114      1 010 100 000          TG5             SELF TEST LATCH
79 0115 0103 0 100 010 001          LIO     210
80 0116      1 001 000 000          IS1
81 0117      0 100 000 100          SS4             LF
82 0120      0 101 100 100          RS5             HF
83 0121 0307 1 100 100 001          JSB     W600    WAIT FOR BAL MTR
```

MODEL FIVE ASSEMBLER - Continued

```
 84 0122        0 111 100 100          RS7             FOR PD TEST
 85 0123 0321  1 101 001 001  SELF3    JSB    SET S
 86 0124       1 011 110 100           RSD5
 87 0125 0162  0 111 001 011           LIO    345      BRN FQSEL
 88 0126       1 100 001 100  STDS1    PT12
 89 0127       0 110 000 100           SS6             PC
 90 0130       0 010 100 100  SELF4    RS2             INT PS
 91 0131 0313  1 100 110 001           JSB    ERD
 92 0132       1 011 110 100  SELF5    RSD5
 93 0133 0052  0 010 101 011           LIO    125      BRN DSDAT
 94 0134       0 010 010 100  STDS2    YS2
 95 0135 0137  0 101 111 111           BRN    SELF6
 96 0136 0142  0 110 001 011           BRN    SELF7
 97 0137       0 100 101 110  SELF6    W,ATB
 98 0140       0 010 000 100           SS2             INT PS
 99 0141 0132  0 101 101 011           BRN    SELF5
100 0142       1 000 001 110  SELF7    W,AMB
101 0143 0145  0 110 010 111           BRN    SELF8
102 0144       1 100 101 110           W,AXB
103 0145       1 100 001 110  SELF8    W,AMBA
104 0146       0 011 001 110           W,ZTC
105 0147       1 100 001 100           PT12
106 0150       0 101 011 000           LDC5
107 0151       0 000 000 000           NOP
108 0152       1 011 001 110           W,SRA
109 0153       0 001 000 110           M,AMC
110 0154 0156  0 110 111 011           BRN    SELF9
111 0155       1 110 100 110           M,AXC
112 0156       0 101 000 110  SELF9    M,AMCC
113 0157       1 100 001 100           PT12
114 0160       0 110 010 100           YS6             PC
115 0161 0170  0 111 100 011           BRN    SEL11
116 0162       0 110 100 010           P,ZMC
117 0163 0165  0 111 010 111           BRN    SEL10
118 0164       0 001 000 100           SS1
119 0165       1 011 001 100  SEL10    PT11
120 0166       0 110 100 100           RS6
121 0167 0130  0 101 100 011           BRN    SELF4
122 0170       0 001 100 010  SEL11    P,CM1
123 0171 0173  0 111 101 111           BRN    SE11A
124 0172       0 111 000 100           SS7             PD TEST OK
125 0173       1 010 001 100  SE11A    PT10
126 0174 0336  1 101 111 101           JSB    ERTST
127 0175       1 011 010 100           YS11
128 0176 0123  0 101 001 111           BRN    SELF3    LOOP
129 0177       0 100 010 100           YS4              LF
130 0200 0206  1 000 011 011           BRN    SE12A
131 0201       0 101 010 100           YS5              HF
132 0202 0204  1 000 010 011           BRN    SEL12
133 0203       0 100 100 100           RS4              LF
134 0204       0 101 000 100  SEL12    SS5              HF
135 0205 0123  0 101 001 111           BRN    SELF3    LOOP
136 0206       0 111 010 100  SE12A    YS7              PD SB
137 0207 0224  1 001 010 011           BRN    SE12B
138 0210 0332  1 101 101 101           JSB    340
139 0211       0 011 011 000           LDC3
140 0212       0 010 101 000           CXM
141 0213       0 101 000 000           IS2
142 0214 0004  0 000 010 011           LIO    001      SIMMER
143 0215       1 001 000 000           IS1
144 0216 0307  1 100 100 001           JSB    010
145 0217       1 000 100 100           RS8             ERRAC
146 0220       1 011 100 100           RS11
147 0221       0 110 100 000           TG3             GOOD FLAG
148 0222       1 011 010 100           YS11
149 0223 0225  1 001 010 111           BRN    SE12C
150 0224       1 000 000 100  SE12B    SS8             ERRAC
151 0225       1 100 001 100  SE12C    PT12
152 0226 0336  1 101 111 101           JSB    ERTST
153 0227       1 011 010 100           YS11
154 0230 0206  1 000 011 011           BRN    SE12A
155 0231       0 010 100 100  SEL13    RS2             LEVEL
156 0232       0 101 100 100  SEL14    RS5             VERT
```

MODEL FIVE ASSEMBLER - Continued

```
157 0233 0332 1 101 101 101 SEL15    JSB    SSW0
158 0234      0 111 100 010          P,CP1C
159 0235      0 010 101 000          CXM
160 0236 0321 1 101 001 001 SE15A    JSB    SETRG
161 0237      0 110 100 100          RS6            F1
162 0240      0 111 100 100          RS7            F2
163 0241      0 100 000 100          SS4
164 0242      1 101 110 100          RSD6
165 0243 0001 0 000 000 111          LIO    003     BRN SANG1
166 0244      1 100 101 000 STAR     DNR            TEST REG
167 0245 0313 1 100 110 001          JSB    ERDIG
168 0246      0 100 010 100          YS4            END
169 0247 0251 1 010 100 111          BRN    SEL16
170 0250 0253 1 010 101 111          BRN    SEL17
171 0251      1 101 110 100 SEL16    RSD6
172 0252 0002 0 000 001 011          LIO    005     BRN SANG2
173 0253      0 000 011 100 SEL17    PRS
174 0254 0336 1 101 111 101          JSB    ERTST
175 0255      1 011 010 100          YS11           CYCLE
176 0256 0236 1 001 111 011          BRN    SE15A
177 0257      0 010 010 100          YS2            LEVEL
178 0260 0263 1 011 001 111          BRN    SEL18
179 0261      1 001 001 100          PT9
180 0262 0300 1 100 000 011          BRN    SEL22
181 0263      0 101 010 100 SEL18    YS5
182 0264 0306 1 100 011 011          BRN    SEL23
183 0265      0 010 000 100 SEL20    SS2
184 0266      1 011 100 100          RS11
185 0267      1 000 100 000          TG4            COMP SW
186 0270      1 011 010 100          YS11
187 0271 0273 1 011 101 111          BRN    SEL21
188 0272 0232 1 001 101 011          BRN    SEL14
189 0273      1 010 101 000 SEL21    MTC
190 0274      0 100 001 100          PT4
191 0275      0 001 011 000          LDC1
192 0276      0 010 101 000          CXM
193 0277      1 000 001 100          PT8
194 0300      1 011 100 100 SEL22    RS11
195 0301      1 000 000 100          SS8
196 0302      1 001 100 100          RS9            FOR TRK TST
197 0303      1 110 101 110          W,AXC
198 0304 0337 1 110 000 001          JSB    ENDTS
199 0305 0111 0 100 100 111          BRN    SELFT
200 0306      0 101 000 100 SEL23    SS5
201 0307 0233 1 001 101 111          BRN    SEL15
202 0310      0 011 001 110 W600     W,ZTC          WAIT FOR BAL
203 0311      0 111 100 110          M,CP1C         METER TO
204 0312      0 101 101 110 W6001    W,CM1C         SETTLE
205 0313 0312 1 100 101 011          BRN    W6001
206 0314      1 100 101 000 ERDIG    DNR
207 0315      0 001 010 100          YS1            ERROR
208 0316 0331 1 101 100 111          BRN    SETR1
209 0317      0 011 000 010          P,ZTC
210 0320      1 000 000 100          SS8
211 0321 0331 1 101 100 111          BRN    SETR1
212 0322      0 011 001 110 SETRG    W,ZTC
213 0323      1 100 001 100          PT12
214 0324      0 001 011 000          LDC1
215 0325      0 001 011 000          LDC1
216 0326      0 001 011 000          LDC1
217 0327      0 001 011 000          LDC1
218 0330      1 000 100 100          RS8            ERRAC
219 0331      0 100 101 000 SETR1    CTS
220 0332      0 000 110 000 SETR2    RETURN
221 0333      1 010 101 000 SSW0     MTC
222 0334      0 011 011 110          S,ZTC
223 0335      0 000 001 100          PT0
224 0336      0 000 110 000          RETURN
225 0337      1 011 000 100 ERTST    SS11           CONTINUE
226 0340      0 110 001 110 ENDTS    W,CTA          DATA TO A REG
227 0341      1 010 101 000          MTC
228 0342      0 011 011 110          S,ZTC          SET ROM #
229 0343      0 010 101 000          CXM
```

MODEL FIVE ASSEMBLER - Continued

```
230 0344      1 110 101 110              W,AXC          TEST KBD DIGIT
231 0345      0 100 001 110              W,SLA          TO C13
232 0346      1 110 101 110              W,AXC
233 0347      1 000 010 100              YS8            ERRAC
234 0350 0332 1 101 101 011              BRN    SETR2
235 0351      0 110 111 110              S,ZMC          TEST KBD
236 0352 0355 1 110 110 111              BRN    ERTS1
237 0353      1 111 110 100              RSD7
238 0354 0243 1 010 001 111              LIO    507     BRN DTDSP
239 0355      1 011 010 100 ERTS1        YS11
240 0356 0373 1 111 101 111              BRN    ERTS2
241 0357      0 010 100 100              RS2            FOR FLDSP SR
242 0360      1 010 101 000              MTC            LOAD ERROR
243 0361      0 000 001 100              PT0            CODE IN ANNUN
244 0362      0 110 001 110              W,CTA
245 0363      0 100 001 110 ERT1A        W,SLA
246 0364      0 000 111 100              PLS
247 0365      0 110 101 100              YP6
248 0366 0363 1 111 001 111              BRN    ERT1A
249 0367      1 110 100 010              P,AXC
250 0370      0 010 101 000              CXM
251 0371      0 011 110 100              RSD1
252 0372 0316 1 100 111 011              LIO    635     BRN FLDSP
253 0373      0 101 110 100 ERTS2        RSD2
254 0374 0366 1 111 011 011              LIO    755     BRN UNCLK
255 0375      1 000 110 100 RG0P0        RGS0
256 0376      0 000 010 000              ROM 0
257 0377      0 000 000 000              NOP
258 END
```

*

MODEL FIVE ASSEMBLER

BERAT 8-6-76

```
LIN CURR BRAN  OPERATION CODE
 #  ADDR ADDR  BIT PATTERN
 1  #,A,L
 2  0000 0374  1 111 110 101              JSB    PW01    24 MAY 76
 3  0001 0361  1 111 001 001 DISTS        JSB    SSW1
 4  0002       0 010 101 000              CXM
 5  0003       1 111 110 100              RSD7
 6  0004 0335  1 101 111 001              LIO    674     JSB ENFDS
 7  0005       0 101 000 000              IS2
 8  0006       1 000 100 000              TG4            RESET SELF TEST
 9  0007 0103  0 100 010 001              LIO    210
10  0010       1 001 000 000              IS1
11  0011 0342  1 110 001 101 DIST1        JSB    EF10T
12  0012 0366  1 111 011 101              JSB    PREAC
13  0013 0257  1 011 000 001              JSB    ENAGC
14  0014 0326  1 101 011 101              JSB    ICCFT
15  0015 0307  1 100 100 001              JSB    INTGF
16  0016       1 011 010 100              YS11
17  0017 0021  0 001 000 111              BRN    DIST2
18  0020 0162  0 111 001 011              BRN    FQSEL
19  0021       1 111 110 100 DIST2        RSD7
20  0022 0151  0 110 101 001              LIO    324     JSB KEYDN
21  0023 0011  0 000 100 111              BRN    DIST1
22  0024       0 011 001 110 DISR1        W,ZTC
23  0025       0 001 001 100              PT1
24  0026       0 001 011 000              LDC1
25  0027       1 000 101 110              W,BXC
26  0030       0 110 100 100              RS6            PC
27  0031       1 011 100 100              RS11
28  0032       1 100 100 000              TG6
29  0033       1 011 010 100              YS11
30  0034 0036  0 001 111 011              BRN    DIST3
31  0035       0 110 000 100              SS6            PC
32  0036       0 111 100 100 DIST3        RS7            EXTPS
33  0037       1 011 100 100              RS11
34  0040       1 010 100 000              TG5
35  0041       1 011 010 100              YS11
```

MODEL FIVE ASSEMBLER - Continued

```
 36 0042 0044 0 010 010 011              BRN    DIST4
 37 0043      0 111 000 100              SS7             EXTPS
 38 0044      0 010 100 100  DIST4       RS2             INTPS
 39 0045      1 011 100 100              RS11
 40 0046      1 000 100 000              TG4
 41 0047      1 011 010 100              YS11
 42 0050 0052 0 010 101 011              BRN    DSDAT
 43 0051      0 010 000 100              SS2             INTPS
 44 0052      0 001 100 100  DSDAT       RS1             ERROR
 45 0053      0 101 000 000              IS2
 46 0054      0 100 100 000              TG2             RESET PC PD
 47 0055      1 100 100 000              TG6
 48 0056      0 010 100 000              TG1             RESET PS
 49 0057      1 001 000 000              IS1
 50 0060      0 111 010 100              YS7             EXTPS
 51 0061 0064 0 011 010 011              BRN    DSDA1
 52 0062      0 101 000 000              IS2
 53 0063      0 100 100 000              TG2
 54 0064      0 101 000 000  DSDA1       IS2
 55 0065      1 010 100 000              TG5
 56 0066      1 001 000 000              IS1
 57 0067 0342 1 110 001 101              JSB    EF10T
 58 0070 0366 1 111 011 101              JSB    PREAC
 59 0071      1 001 010 100              YS9
 60 0072 0074 0 011 110 011              BRN    DSDA2
 61 0073 0101 0 100 000 111              BRN    DSDA3
 62 0074 0312 1 100 101 101  DSDA2       JSB    PCPD
 63 0075      1 010 101 000              MTC
 64 0076      0 011 001 100              PT3
 65 0077      0 001 100 010              P,CM1           EXT ONLY
 66 0100 0131 0 101 100 111              BRN    DSDA8
 67 0101      0 010 010 100  DSDA3       YS2             INT PS
 68 0102 0110 0 100 100 011              BRN    DSDA4
 69 0103      0 101 000 000              IS2
 70 0104      1 100 100 000              TG6
 71 0105      0 000 100 000              TG0
 72 0106      1 010 100 000              TG5             SET INT PS
 73 0107      1 001 000 000              IS1
 74 0110      1 001 010 100  DSDA4       YS9             SELF TEST
 75 0111 0122 0 101 001 011              BRN    DSD5A
 76 0112      0 110 010 100              YS6             PC
 77 0113 0126 0 101 011 011              BRN    DSDA6
 78 0114      0 010 010 100              YS2             INTPS
 79 0115 0126 0 101 011 011              BRN    DSDA6
 80 0116 0326 1 101 011 101              JSB    ICCFT
 81 0117 0130 0 101 100 011              BRN    DSDA7
 82 0120 0326 1 101 011 101  DSDA5       JSB    ICCFT
 83 0121 0131 0 101 100 111              BRN    DSDA8
 84 0122      0 101 001 100  DSD5A       PT5
 85 0123      0 110 100 010              P,ZMC           INT ONLY
 86 0124 0120 0 101 000 011              BRN    DSDA5
 87 0125 0304 1 100 010 101              JSB    DSPDC
 88 0126 0326 1 101 011 101  DSDA6       JSB    ICCFT
 89 0127 0366 1 111 011 101              JSB    PREAC
 90 0130 0312 1 100 101 101  DSDA7       JSB    PCPD
 91 0131 0273 1 011 110 001  DSDA8       JSB    ACCRT
 92 0132      1 111 110 100              RSD7
 93 0133 0203 1 000 010 001              LIO    410     JSB INDAT
 94 0134      1 001 010 100              YS9             SELF TEST
 95 0135 0140 0 110 000 011              BRN    DISR2
 96 0136      1 001 110 100              RSD4
 97 0137 0134 0 101 110 011              LIO    271     BRN STDS2
 98 0140      1 011 001 110  DISR2       W,SRA
 99 0141      1 011 001 110              W,SRA
100 0142      1 100 001 100              PT12
101 0143      1 111 100 010              P,AP1A
102 0144      1 011 100 100              RS11
103 0145      0 010 100 000              TG1             OVFLO
104 0146      1 011 010 100              YS11
105 0147 0151 0 110 100 111              BRN    DIST5
106 0150      1 011 010 010              P,ZTA
107 0151      1 110 001 110  DIST5       W,APBA
108 0152      1 101 101 010              X,AM1A
```

MODEL FIVE ASSEMBLER - Continued

```
109 0153        0 100 101 110        W,ATB
110 0154        1 001 101 010        X,AM1
111 0155 0052   0 010 101 011        BRN     DSDAT
112 0156        1 000 001 100        PT8
113 0157        1 111 110 100        RSD7
114 0160 0242   1 010 001 101        LIO     506         JSB DTDSP
115 0161 0024   0 001 010 011        BRN     DISR1
116 0162        0 001 100 100  FQSEL RS1                 ERROR
117 0163 0342   1 110 001 101        JSB     EF10T
118 0164 0366   1 111 011 101        JSB     PREAC
119 0165 0361   1 111 001 001        JSB     SSW1        RECALL STATUS
120 0166        1 001 010 100        YS9                 SELF TEST
121 0167 0171   0 111 100 111        BRN     FQSE0
122 0170 0174   0 111 110 011        BRN     FQS0A
123 0171        0 101 000 000  FQSE0 IS2
124 0172        0 000 100 000        TG0                 ENABLE AGC
125 0173        1 001 000 000        IS1
126 0174        0 100 010 100  FQS0A YS4
127 0175 0214   1 000 110 011        BRN     FQSE2
128 0176        0 101 010 100        YS5
129 0177 0205   1 000 010 111        BRN     FQSE1
130 0200        0 101 000 000        IS2
131 0201 0333   1 101 110 001        LIO     670
132 0202        1 001 000 000        IS1
133 0203        0 001 011 000        LDC1
134 0204 0220   1 001 000 011        BRN     FQSE3
135 0205        0 101 000 000  FQSE1 IS2
136 0206 0323   1 101 010 001        LIO     650         MF
137 0207        1 001 000 000        IS1
138 0210        0 000 011 000        LDC0
139 0211 0220   1 001 000 011        BRN     FQSE3
140 0212        0 000 000 000        NOP
141 0213        0 000 000 000        NOP
142 0214        0 101 000 000  FQSE2 IS2
143 0215 0313   1 100 110 001        LIO     630         LF
144 0216        1 001 000 000        IS1
145 0217        0 010 011 000        LDC2
146 0220        0 010 101 000  FQSE3 CXM
147 0221 0262   1 011 001 101        JSB     W30DS
148 0222 0326   1 101 011 101        JSB     ICCFT
149 0223 0257   1 011 000 001        JSB     ENAGC
150 0224        0 011 000 110        M,ZTC               LOAD 6 CYCL CTR
151 0225        0 011 001 100        PT3                 WAIT FOR LSD
152 0226        0 101 011 000        LDC5
153 0227 0342   1 110 001 101  FQSE5 JSB     EF10T
154 0230 0366   1 111 011 101        JSB     PREAC
155 0231 0326   1 101 011 101        JSB     ICCFT
156 0232        1 001 010 100        YS9                 SELF TEST
157 0233 0235   1 001 110 111        BRN     FQS5A
158 0234 0066   1 111 011 101        JSB     PREAC       TO RESET GF
159 0235 0257   1 011 000 001  FQS5A JSB     ENAGC
160 0236 0307   1 100 100 001        JSB     INTGF
161 0237        0 101 100 110        M,CM1C
162 0240 0227   1 001 011 111        BRN     FQSE5
163 0241        1 011 010 100        YS11
164 0242 0247   1 010 011 111        BRN     FQSE7
165 0243        1 001 010 100  FQSE6 YS9
166 0244 0251   1 010 100 111        BRN     FQSE8
167 0245        1 001 110 100        RSD4
168 0246 0126   0 101 011 011        LIO     255         BRN STDS1
169 0247        0 001 000 100  FQSE7 SS1                 ERROR
170 0250 0243   1 010 001 111        BRN     FQSE6
171 0251        0 001 010 100  FQSE8 YS1
172 0252 0024   0 001 010 011        BRN     DISR1
173 0253        1 111 110 100        RSD7
174 0254 0151   0 110 101 001        LIO     324         JSB KEYDN
175 0255        0 011 000 110        M,ZTC
176 0256        0 001 100 100        RS1
177 0257 0227   1 001 011 111        BRN     FQSE5
178 0260        0 101 000 000  ENAGC IS2
179 0261        0 000 100 000        TG0                 AGC ON
180 0262        1 001 000 000        IS1
181 0263        0 011 001 010  W30DS X,ZTC
```

MODEL FIVE ASSEMBLER - Continued

```
182 0264        0 001 001 100          PT1
183 0265        0 101 011 000          LDC5              30MS
184 0266        0 101 101 010 ENAG1    X,CM1C
185 0267 0266   1 011 011 011          BRN      ENAG1
186 0270        0 101 000 000          IS2
187 0271        1 000 100 000          TG4               AGC OFF
188 0272        1 001 000 000          IS1
189 0273        0 000 110 000          RETURN
190 0274        1 011 100 100 ACCRT    RS11
191 0275        0 100 100 000 ACCR1    TG2               ACCRDY FLG
192 0276        1 011 010 100          YS11
193 0277 0301   1 100 000 111          BRN      ACCR2
194 0300 0305   1 100 010 111          BRN      DSPDC
195 0301        0 000 100 000 ACCR2    TG0               EXTFLG
196 0302        1 011 010 100          YS11
197 0303 0275   1 011 110 111          BRN      ACCR1
198 0304        0 000 000 000          NOP
199 0305        0 101 000 000 DSPDC    IS2
200 0306        0 100 100 000          TG2
201 0307        1 001 000 000          IS1
202 0310        1 011 100 100 INTGF    RS11
203 0311        0 110 100 000          TG3               GOOD FLG
204 0312        0 000 110 000          RETURN
205 0313        0 110 010 100 PCPD     YS6               PC
206 0314 0322   1 101 001 011          BRN      PCPD1
207 0315        0 101 000 000          IS2
208 0316        1 110 100 000          TG7               PDEN
209 0317        0 010 100 000          TG1               PC ENABLE
210 0320        1 001 000 000          IS1
211 0321        0 000 110 000          RETURN
212 0322        0 101 000 000 PCPD1    IS2
213 0323        1 110 100 000          TG7               PDEN
214 0324        0 110 100 000          TG3               PD ENABLE
215 0325        1 001 000 000          IS1
216 0326        0 000 110 000          RETURN
217 0327        0 011 001 010 ICCFT    X,ZTC
218 0330        0 001 001 100          PT1
219 0331        1 001 011 000          LDC9
220 0332        1 011 100 100 ICCF1    RS11
221 0333        1 110 100 000          TG7
222 0334        1 011 010 100          YS11
223 0335 0337   1 101 111 111          BRN      ICCF2
224 0336        0 000 110 000          RETURN
225 0337        0 101 101 010 ICCF2    X,CM1C
226 0340 0332   1 101 101 011          BRN      ICCF1
227 0341        0 001 000 100 ICCF3    SS1               ERROR
228 0342        0 000 110 000          RETURN
229 0343        0 011 001 010 EF10T    X,ZTC
230 0344        0 001 001 100          PT1
231 0345        1 001 011 000          LDC9
232 0346        0 101 101 010 EF101    X,CM1C
233 0347 0351   1 110 100 111          BRN      EF102
234 0350 0341   1 110 000 111          BRN      ICCF3
235 0351        1 011 100 100 EF102    RS11
236 0352        0 000 100 000          TG0
237 0353        1 011 010 100          YS11
238 0354 0357   1 110 111 111          BRN      EF103
239 0355        0 010 001 100          PT2
240 0356 0346   1 110 011 011          BRN      EF101
241 0357        0 010 101 100 EF103    YP2
242 0360 0346   1 110 011 011          BRN      EF101
243 0361        0 000 110 000          RETURN
244 0362        1 010 101 000 SSW1     MTC
245 0363        0 011 011 110          S,ZTC
246 0364        0 111 111 110          S,CP1C
247 0365        0 000 001 100          PT0
248 0366        0 000 110 000          RETURN
249 0367        0 101 000 000 PREAC    IS2
250 0370        1 100 100 000          TG6
251 0371        1 110 100 000          TG7               PRESET ACC
252 0372        1 010 100 000          TG5
253 0373        1 001 000 000          IS1
254 0374        0 000 110 000          RETURN
```

MODEL FIVE ASSEMBLER - Continued

```
255 0375      1 000 110 100 PW01    RGS0
256 0376      0 000 010 000         ROM 0
257 0377      0 000 000 000         NOP
258 END
```

---

*
MODEL FIVE ASSEMBLER

BER42
8-6-76

```
LIN CURR BRAN OPERATION CODE
 #  ADDR ADDR BIT PATTERN
  1 #,A,L
  2 0000 0374 1 111 110 101         JSB    PW02   20 FEB 76
  3 0001 0313 1 100 110 001 SANG1   JSB    ANINT
  4 0002 0260 1 011 000 101 SANG2   JSB    SSW2
  5 0003      0 010 101 000         CXM
  6 0004      0 001 000 100         SS1           ERROR
  7 0005 0325 1 101 011 001         JSB    PRACC
  8 0006      1 110 101 110         W,AXC
  9 0007      0 100 101 000         CTS           STORE PROM
 10 0010      0 101 000 000         IS2
 11 0011      1 100 100 000         TG6
 12 0012      0 000 100 000         TG0
 13 0013      0 100 100 000         TG2
 14 0014      1 010 100 000         TG5
 15 0015      1 001 000 000         IS1
 16 0016      1 011 100 100         RS11          WAIT FOR
 17 0017      0 000 100 000 SANG3   TG0           EXT FLG
 18 0020      1 011 010 100         YS11
 19 0021 0017 0 000 111 111         BRN    SANG3
 20 0022      1 011 100 100         RS11          FOR ACCRDY
 21 0023 0266 1 011 011 101         JSB    W50AI  FLG TEST
 22 0024 0332 1 101 101 101         JSB    INDLK
 23 0025 0307 1 100 100 001         JSB    SUBPR
 24 0026      1 100 101 110         W,AXB
 25 0027 0317 1 101 000 001         JSB    RSPS
 26 0030 0272 1 011 101 101         JSB    ANGIN
 27 0031      1 011 010 100         YS11
 28 0032 0034 0 001 110 011         BRN    SANG4
 29 0033      0 001 100 100         RS1           ERROR
 30 0034 0332 1 101 101 101 SANG4   JSB    INDLK
 31 0035 0307 1 100 100 001         JSB    SUBPR
 32 0036      1 000 001 110         W,AMB
 33 0037 0041 0 010 000 111         BRN    SANG5
 34 0040      1 100 101 110         W,AXB
 35 0041      1 100 001 110 SANG5   W,AMBA
 36 0042      0 011 001 110         W,ZTC         LOAD
 37 0043      1 100 001 100         PT12          500
 38 0044      0 101 011 000         LDC5
 39 0045      0 000 000 000         NOP
 40 0046      0 001 001 110         W,AMC
 41 0047 0051 0 010 100 111         BRN    SANG6
 42 0050      1 110 101 110         W,AXC
 43 0051      0 101 001 110 SANG6   W,AMCC        ERROR TO C
 44 0052      1 010 101 110         W,CPCC        DOUBLE ERROR
 45 0053      0 011 010 010         WP,ZTC
 46 0054      0 110 101 110         W,ZMC
 47 0055 0057 0 010 111 111         BRN    SANG7
 48 0056      0 001 000 100         SS1           ERROR
 49 0057      1 100 001 100 SANG7   PT12
 50 0060      0 100 010 100         YS4           REF.
 51 0061 0064 0 011 010 011         BRN    SANG8
 52 0062      0 100 100 100         RS4
 53 0063 0106 0 100 011 011         BRN    SAN14
 54 0064      1 011 001 100 SANG8   PT11
 55 0065      0 010 010 100         YS2           LEVEL
 56 0066 0076 0 011 111 011         BRN    SAN11
 57 0067      0 101 100 100         YS5
 58 0070 0074 0 011 110 011         BRN    SAN10
 59 0071      0 000 011 100 SANG9   PRS
 60 0072      0 100 000 100         SS4
```

MODEL FIVE ASSEMBLER - Continued

```
 61 0073 0107 0 100 011 111        BRN    ..15
 62 0074      0 101 000 100 SAN10  SS5
 63 0075 0106 0 100 011 011        BRN    SAN14
 64 0076      0 110 010 100 SAN11  YS6
 65 0077 0105 0 100 010 111        BRN    SAN13
 66 0100      1 010 001 100        PT10
 67 0101      0 111 010 100        YS7
 68 0102 0104 0 100 010 011        BRN    SAN12
 69 0103 0071 0 011 100 111        BRN    SANG9
 70 0104      0 111 000 100 SAN12  SS7
 71 0105      0 110 000 100 SAN13  SS6
 72 0106 0334 1 101 110 101 SAN14  JSB    TRSEL
 73 0107      1 001 110 100 SAN15  RSD4
 74 0110 0244 1 010 010 011        LIO    511     BRN STAR
 75 0111 0260 1 011 000 101 ANGTS  JSB    SSW2
 76 0112      1 001 011 000        LDC9
 77 0113      0 010 101 000        CXM
 78 0114      1 111 110 100        RSD7
 79 0115 0335 1 101 111 001        LIO    674     JSB ENFDS
 80 0116      0 000 101 110        W,ZTB           ZERO LVPROM
 81 0117      0 010 010 100        YS2             LEVEL
 82 0120 0130 0 101 100 011        BRN    ANGT0
 83 0121      0 101 000 000        IS2
 84 0122 0304 1 100 010 011        LIO    611     LVPROM
 85 0123      1 001 000 000        IS1
 86 0124 0325 1 101 011 001        JSB    PRACC
 87 0125      0 100 001 110        W,SLA
 88 0126      0 100 001 110        W,SLA
 89 0127      1 100 101 110        W,AXB
 90 0130 0313 1 100 110 001 ANGT0  JSB    ANINT
 91 0131      0 001 010 100        YS1             DIG
 92 0132 0176 0 111 111 011        BRN    ANGT1
 93 0133      1 011 100 100 DIGT   RS11
 94 0134      1 100 100 000        TG6
 95 0135      0 101 000 000        IS2
 96 0136      1 100 100 000        TG6             TGRP2
 97 0137      1 001 000 000        IS1
 98 0140      0 011 001 010        X,ZTC
 99 0141      0 010 001 100        PT2
100 0142      0 100 011 000        LDC4
101 0143      0 101 101 010        X,CM1C
102 0144 0143 0 110 001 111 DIGT1  BRN    DIGT1
103 0145      1 011 010 100        YS11
104 0146 0151 0 110 100 111        BRN    DIGT2
105 0147      0 000 100 000        TG0             VDSEN
106 0150 0152 0 110 101 011        BRN    DIGT3
107 0151      0 100 100 000 DIGT2  TG2
108 0152      1 011 100 100 DIGT3  RS11
109 0153      1 111 110 100        RSD7
110 0154 0204 1 000 010 101        LIO    412     JSB INDIG
111 0155      0 111 111 000        TTC
112 0156      1 001 001 110        W,SRC
113 0157      1 011 101 110        W,ZTA
114 0160      1 100 001 100        PT12
115 0161      0 111 110 000 DIGT4  CTT
116 0162      0 101 000 000        IS2
117 0163      0 100 001 000        SLT
118 0164      1 001 000 000        IS1
119 0165      0 111 111 000        TTC
120 0166      0 110 111 110        S,ZMC
121 0167 0171 0 111 100 111        BRN    DIGT5
122 0170      1 111 100 010        P,AP1A
123 0171      0 000 100 100 DIGT5  PRS
124 0172      0 011 011 110        S,ZTC
125 0173      0 100 101 100        YP4
126 0174 0161 0 111 000 111        BRN    DIGT4
127 0175 0251 1 010 100 111        BRN    ANGRT
128 0176 0266 1 011 011 101 ANGT1  JSB    W50AI
129 0177 0332 1 101 101 101        JSB    INDLK
130 0200      1 110 101 110        W,AXC
131 0201      0 100 101 000        CTS
132 0202      0 101 100 100 ANGLP  RS5             STORE ANG REF
133 0203      1 011 100 100        RS11
```

MODEL FIVE ASSEMBLER - Continued

```
134 0204        1 100 100 000            TG6
135 0205        1 011 010 100            YS11
136 0206 0210   1 000 100 011            BRN     ANGT2
137 0207        0 101 000 100            SS5
138 0210        1 000 000 100 ANGT2      SS8
139 0211        1 011 100 100            RS11
140 0212        1 010 100 000            TG5
141 0213        1 011 010 100            YS11            PROM ONLY
142 0214 0216   1 000 111 011            BRN     ANGT3
143 0215        1 000 100 100            RS8
144 0216        0 100 010 100 ANGT3      YS4             REF
145 0217 0225   1 001 010 111            BRN     ANGT4
146 0220        0 011 001 110            W,ZTC
147 0221        0 100 101 000            CTS
148 0222        0 000 001 100            PT0
149 0223        1 000 011 000            LDC8
150 0224 0226   1 001 011 011            BRN     ANGT5
151 0225 0334   1 101 110 101 ANGT4      JSB     TRSEL
152 0226        0 000 001 100 ANGT5      PT0
153 0227        0 110 000 010            P,CTA
154 0230        1 010 101 000            MTC             LOAD ANNUN DIG
155 0231        1 110 100 010            P,AXC
156 0232        0 010 101 000            CXM
157 0233 0325   1 101 011 001            JSB     PRACC
158 0234        1 000 010 100 ANGT6      YS8             DATA
159 0235 0241   1 010 000 111            BRN     ANGT7
160 0236 0266   1 011 011 101            JSB     WS
161 0237 0332   1 101 101 101            JSB
162 0240 0306   1 100 011 101            JSB     SUB
163 0241        0 010 001 110 ANG6A      W,BTC
164 0242        0 101 010 100            YS5             VERT
165 0243 0246   1 010 011 011            BRN     ANGT7
166 0244        0 011 000 110            M,ZTC
167 0245        1 001 001 110            W,SRC
168 0246        0 011 011 110 ANGT7      S,ZTC
169 0247        1 111 001 110            W,APCA          ADD LVPROM
170 0250        1 001 001 100            PT9
171 0251        1 111 110 100 ANGRT      RSD7
172 0252 0242   1 010 001 101            LIO     506     JSB DTDSP
173 0253        0 001 010 100 ANGR1      YS1             DIG
174 0254 0202   1 000 001 011            BRN     ANGLP
175 0255 0133   0 101 101 111            BRN     DIGT
176 0256        0 000 000 000            NOP
177 0257        0 000 000 000            NOP
178 0260        0 000 000 000            NOP
179 0261        1 010 101 000 SSW2       MTC
180 0262        1 101 001 100            PT13
181 0263        0 010 011 000            LDC2
182 0264        0 000 000 000            NOP
183 0265        0 000 001 100            PT0
184 0266        0 000 110 000            RETURN
185 0267        0 011 001 010 W50AI      X,ZTC
186 0270        0 111 111 010            XS,CP1C
187 0271        0 101 101 010 W50A1      X,CM1C
188 0272 0271   1 011 100 111            BRN     W50A1
189 0273        0 101 000 000 ANGIN      IS2
190 0274        1 100 100 000            TG6
191 0275        1 110 100 000            TG7
192 0276        1 010 100 000            TG5
193 0277        1 110 100 000            TG7
194 0300        1 001 000 000            IS1
195 0301        0 110 001 100            PT6
196 0302        0 000 011 100 ANGI1      PRS
197 0303        0 000 101 100            YP0
198 0304 0302   1 100 001 011            BRN     ANGI1
199 0305        0 100 100 000            TG2
200 0306        0 000 110 000            RETURN
201 0307        1 111 111 110 SUBAR      S,AP1A
202 0310        1 100 101 000 SUBPR      DNR
203 0311        1 101 001 110            W,AMCA
204 0312        0 100 101 000            CTS
205 0313        0 000 110 000            RETURN
206 0314        0 101 000 000 ANINT      IS2
```

MODEL FIVE ASSEMBLER - Continued

```
14 0014         0 001 000 010           P,AMC
15 0015 0017    0 000 111 111           BRN     DISP1
16 0016         0 011 000 010           P,ZTC
17 0017         0 101 000 000   DISP1   IS2
18 0020         0 111 110 000           CTT
19 0021         0 100 001 000           SLT
20 0022         1 000 000 000           TTP
21 0023         1 001 000 000           IS1
22 0024         1 001 001 010           X,SRC
23 0025         0 010 101 000           CXM
24 0026 0172    0 111 101 101           JSB     PRACC
25 0027 0203    1 000 010 001           JSB     INDAT
26 0030         0 100 001 110           W,SLA
27 0031         1 010 001 100           PT10
28 0032 0242    1 010 001 101           JSB     DTDSP
29 0033 0001    0 000 000 111           BRN     DISPR
30 0034 0343    1 110 010 001   TIGRT   JSB     SSW3
31 0035 0151    0 110 101 001           JSB     KEYDN           IS2
32 0036         0 100 100 100           RS4                     DIS-PER
33 0037         1 100 100 000           TG6
34 0040         1 011 010 100           YS11
35 0041 0046    0 010 011 011           BRN     TIGR1
36 0042         0 101 000 000           IS2
37 0043 0377    1 111 111 111           LIO     777
38 0044         1 001 000 000           IS1
39 0045 0061    0 011 000 111           BRN     TIGR3
40 0046         1 010 100 000   TIGR1   TG5
41 0047         1 011 010 100           YS11
42 0050 0052    0 010 101 011           BRN     TIGR2
43 0051         0 100 000 100           SS4                     IS2
44 0052         1 011 100 100   TIGR2   RS11
45 0053         1 000 100 000           TG4
46 0054         1 011 010 100           YS11
47 0055 0061    0 011 000 111           BRN     TIGR3
48 0056         0 101 000 000           IS2
49 0057         1 100 100 000           TG6
50 0060         1 001 000 000           IS1
51 0061         0 100 010 100   TIGR3   YS4
52 0062 0064    0 011 010 011           BRN     TIGR4
53 0063         0 101 000 000           IS2
54 0064         1 110 100 000   TIGR4   TG7
55 0065         0 000 100 000           TG0
56 0066         0 010 100 000           TG1
57 0067         0 100 100 000           TG2
58 0070         0 110 100 000           TG3
59 0071         1 000 100 000           TG4
60 0072         1 010 100 000           TG5
61 0073         1 100 100 000           TG6
62 0074         1 001 000 000           IS1
63 0075 0034    0 001 110 011           BRN     TIGRT
64 0076 0343    1 110 010 001   OSTST   JSB     SSW3
65 0077         1 011 100 100           RS11
66 0100         0 000 100 000   ACCT1   TG0     EXTFLG
67 0101         1 011 010 100           YS11
68 0102 0100    0 100 000 011           BRN     ACCT1
69 0103 0172    0 111 101 101           JSB     PRACC
70 0104         1 011 100 100           RS11
71 0105         1 110 100 000   ACCT2   TG7             ICCFG
72 0106         1 011 010 100           YS11
73 0107 0105    0 100 010 111           BRN     ACCT2
74 0110         1 011 100 100           RS11
75 0111         1 010 100 000           TG5             UP/DN
76 0112         1 011 010 100           YS11
77 0113 0115    0 100 110 111           BRN     ACCT3
78 0114 0172    0 111 101 101           JSB     PRACC
79 0115         0 101 000 000   ACCT3   IS2
80 0116         1 110 100 000           TG7             PDEN
81 0117         1 100 100 000           TG6
82 0120         1 001 000 000           IS1
83 0121         0 010 010 100           YS2             RS
84 0122 0125    0 101 010 111           BRN     ACC3A
85 0123         1 010 100 000           TG5             RSOSEN
86 0124 0126    0 101 011 011           BRN     ACC3B
```

MODEL FIVE ASSEMBLER - Continued

```
207 0315 0004 0 000 010 011           LIO    011
208 0316      0 100 100 000           TG2           SELECT
209 0317      0 110 100 000           TG3           PHASE DET
210 0320      0 101 000 000 RSPS      IS2
211 0321      1 100 100 000           TG6
212 0322      0 010 100 000           TG1           RESET PS
213 0323      1 010 100 000           TG5
214 0324      1 001 000 000           IS1
215 0325      0 000 110 000           RETURN
216 0326      0 101 000 000 PRACC     IS2
217 0327      1 100 100 000           TG6
218 0330      1 110 100 000           TG7
219 0331      1 010 100 000           TG5
220 0332      1 001 000 000           IS1
221 0333      1 111 110 100 INDLK     RSD7
222 0334 0204 1 000 010 011           LIO    411   BRN INDAT
223 0335      0 011 001 110 TRSEL     W,ZTC
224 0336      0 010 010 100           YS2           LEVEL
225 0337 0343 1 110 001 111           BRN    TRSE1 NO
226 0340      0 101 010 100           YS5           VERT
227 0341 0360 1 111 000 011           BRN    GAMA
228 0342 0361 1 111 000 111           BRN    BETA
229 0343      0 110 010 100 TRSE1     YS6           F1
230 0344 0355 1 110 110 111           BRN    TRSE3 NO
231 0345      0 111 010 100           YS7           F2
232 0346 0352 1 110 101 011           BRN    TRSE2 NO
233 0347      0 101 010 100           YS5
234 0350 0366 1 111 011 011           BRN    HF2
235 0351 0363 1 111 001 111          *BRN    VF2
236 0352      0 101 010 100 TRSE2     YS5
237 0353 0367 1 111 011 111           BRN    HF1
238 0354 0364 1 111 010 011           BRN    VF1
239 0355      0 101 010 100 TRSE3     YS5
240 0356 0365 1 111 010 111           BRN    HC
241 0357 0362 1 111 001 011           BRN    VC
242 0360      0 111 101 110 GAMA      W,CP1C
243 0361      0 111 101 110 BETA      W,CP1C
244 0362      0 111 101 110 VC        W,CP1C
245 0363      0 111 101 110 VF2       W,CP1C
246 0364      0 111 101 110 VF1       W,CP1C
247 0365      0 111 101 110 HC        W,CP1C
248 0366      0 111 101 110 HF2       W,CP1C
249 0367      0 101 000 000 HF1       IS2
250 0370      0 111 110 000           CTT
251 0371      0 100 001 000           SLT
252 0372      1 000 000 000           TTP
253 0373      1 001 000 000           IS1
254 0374      0 000 110 000           RETURN
255 0375      1 000 110 100 PWO2      RGS0
256 0376      0 000 010 000           ROM 0
257 0377      0 000 000 000           NOP
258 END
```

MODEL FIVE ASSEMBLER

BER 43 8-6-76

```
LIN CURR BRAN  OPERATION CODE
 #  ADDR ADDR  BIT PATTERN
  1 #,A,L
  2 0000 0374 1 111 110 101           JSB    PW03  18 MAY 76
  3 0001 0343 1 110 010 001 DISPR     JSB    SSW3
  4 0002      1 010 101 000           MTC
  5 0003      0 110 001 010           X,CTA
  6 0004      0 100 001 010           X,SLA
  7 0005      1 011 111 010           XS,ZTA
  8 0006      0 001 001 100           PT1
  9 0007      0 011 011 000           LDC3
 10 0010      1 110 010 010           X,AXC
 11 0011      1 000 011 000           LDC8
 12 0012      0 001 001 100           PT1
 13 0013      0 111 100 010           P,CP1C
```

MODEL FIVE ASSEMBLER - Continued

```
 87 0125           1 100 100 000 ACC3A   TG6            ECOSEN
 88 0126           0 101 000 000 ACC3B   IS2
 89 0127           1 010 100 000         TG5
 90 0130           1 001 000 000         IS1
 91 0131           0 111 001 100         PT7            5MS CTR
 92 0132           0 000 011 100 ACCT4   PRS
 93 0133           0 000 101 100 ACCT5   YP0
 94 0134 0132 0 101 101 011              BRN    ACCT4
 95 0135           1 001 010 100 ACCT6   YS9            SELF TEST
 96 0136 0140 0 110 000 011              BRN    ACCT7
 97 0137 0204 1 000 010 011              BRN    INDAT
 98 0140           1 011 100 100 ACCT7   RS11
 99 0141           1 100 100 000         TG6            NO DISPLAY
100 0142           1 011 010 100         YS11
101 0143 0145 0 110 010 111              BRN    ACCT8
102 0144 0115 0 100 110 111              BRN    ACCT3
103 0145 0203 1 000 010 001 ACCT8        JSB    INDAT
104 0146           1 011 001 110         W,SRA
105 0147           1 000 001 100         PT8
106 0150 0242 1 010 001 101              JSB    DTDSP
107 0151 0076 0 011 111 011              BRN    OSTST
108 0152           1 011 100 100 KEYDN   RS11
109 0153           0 000 100 100         RS0
110 0154           1 100 001 100         PT12
111 0155           0 000 011 100 KEYD1   PRS
112 0156           1 100 101 100         YP12
113 0157 0155 0 110 110 111              BRN    KEYD1
114 0160           0 000 010 100         YS0
115 0161 0167 0 111 011 111              BRN    KEYD2
116 0162           1 010 010 100         YS10
117 0163 0360 1 111 000 011              BRN    RETDC
118 0164           1 011 000 100         SS11
119 0165           1 001 010 100         YS9            SELF TST
120 0166 0171 0 111 100 111              BRN    KEYD3
121 0167           1 010 000 100 KEYD2   SS10
122 0170 0360 1 111 000 011              BRN    RETDC
123 0171           1 001 110 100 KEYD3   RSD4
124 0172 0106 0 100 011 011              LIO    215    BRN TKRLK
125 0173           0 101 000 000 PRACC   IS2            ENTER FROM STRS
126 0174           0 100 100 000         TG2
127 0175           1 100 100 000         TG6
128 0176           1 110 100 000         TG7
129 0177           1 010 100 000         TG5
130 0200           1 001 000 000         IS1
131 0201           1 001 010 100         YS9
132 0202 0374 1 111 110 011              BRN    RETD3
133 0203 0115 0 100 110 111              BRN    ACCT3
134 0204           1 011 000 100 INDAT   SS11
135 0205           0 011 001 110 INDIG   W,ZTC
136 0206           0 111 110 000         CTT
137 0207           0 101 000 000         IS2
138 0210           1 100 100 000         TG6
139 0211           1 101 001 000         TDEC
140 0212           1 001 000 000         IS1
141 0213           0 111 111 000         TTC
142 0214           1 011 010 100         YS11
143 0215 0233 1 001 101 111              BRN    INDA1
144 0216           0 110 100 000         TG3            ACCINL
145 0217           0 101 000 000         IS2
146 0220           0 100 101 000         IXT
147 0221           0 101 001 000         SRT
148 0222           0 101 001 000         SRT
149 0223           0 101 001 000         SRT
150 0224           0 101 001 000         SRT
151 0225           0 101 001 000         SRT
152 0226           0 101 001 000         SRT
153 0227           0 101 001 000         SRT
154 0230           0 101 001 000         SRT
155 0231           1 001 000 000         IS1
156 0232           0 010 100 000         TG1
157 0233           0 101 000 000 INDA1   IS2            ACCINH
158 0234           0 100 101 000         IXT
159 0235           1 010 100 000         TG5
```

MODEL FIVE ASSEMBLER - Continued

```
160 0236        0 010 001 000           XOR
161 0237        1 001 000 000           IS1
162 0240        0 111 111 000           TTC
163 0241        0 000 000 000           NOP
164 0242 0357   1 110 111 111           BRN     RETDA
165 0243        1 011 000 100 DTDSP     SS11
166 0244        1 010 101 000           MTC             ANNUN TO A
167 0245        0 110 001 010           X,CTA
168 0246        0 101 000 000           IS2
169 0247        1 100 100 000           TG6             2ND AR ON
170 0250        1 000 100 000           TG4
171 0251        1 001 000 000           IS1
172 0252        1 000 101 000           DSOF
173 0253        0 011 001 110           W,ZTC
174 0254        0 101 111 110           S,CM1C          BLANK SIGN
175 0255        0 101 110 010           WP,CM1C         BLANK UNUSED DI
176 0256        0 011 001 100           PT3             UNBLANK ANNUN
177 0257        0 010 011 000           LDC2
178 0260        1 000 101 110           W,BXC
179 0261        0 100 101 000           CTS             STORE B
180 0262        0 011 001 110           W,ZTC
181 0263        0 101 000 000           IS2
182 0264        0 110 100 000           TG3             2ND AR OFF
183 0265        1 001 000 000           IS1
184 0266        0 011 001 100           PT3
185 0267        0 100 010 010           WP,SLA          SHIFT ANNUN
186 0270        0 100 010 010           WP,SLA
187 0271        0 100 010 010           WP,SLA
188 0272        1 110 101 110           W,AXC           DATA PLUS ANNUN
189 0273        0 110 001 110           W,CTA           TO C AND A REG
190 0274        0 101 000 000           IS2
191 0275        1 000 100 000           TG4
192 0276        1 001 000 000           IS1
193 0277        1 101 001 100           PT13
194 0300        0 101 100 010 DTDS1     P,CM1C          LOAD DATA IN
195 0301 0300   1 100 000 011           BRN     DTDS1   2ND AR
196 0302        0 000 011 100           PRS
197 0303        0 010 101 100           YP2
198 0304 0300   1 100 000 011           BRN     DTDS1
199 0305        0 011 101 110           W,ZNCC
200 0306        1 110 101 110           W,AXC
201 0307        0 000 101 000           DSTO
202 0310        0 101 000 000 DTDS2     IS2
203 0311        0 110 100 000           TG3             2ND AR OFF
204 0312        1 010 100 000           TG5
205 0313        1 001 000 000           IS1
206 0314        1 110 101 110           W,AXC
207 0315        1 100 101 000           DNR
208 0316        1 000 101 110           W,BXC           RECALL B
209 0317        1 001 010 100           YS9
210 0320 0326   1 101 011 011           BRN     DTDS3
211 0321        1 011 100 100           RS11
212 0322        1 100 100 000           TG6             STOP ON ERROR
213 0323        1 011 010 100           YS11
214 0324 0152   0 110 101 011           BRN     KEYDN
215 0325 0332   1 101 101 011           BRN     TKBLK
216 0326        1 010 101 000 DTDS3     MTC
217 0327        1 011 001 100           PT11
218 0330        0 001 100 010           P,CM1           TRACK?
219 0331 0152   0 110 101 011           BRN     KEYDN   YES
220 0332        0 011 000 110 TKBLK     M,ZTC           ZERO EXT-INT SB
221 0333        0 010 101 000           CXM
222 0334        1 001 110 100           RSD4
223 0335 0061   0 011 000 111           LIO     143     BRN TKBLP
224 0336        0 101 000 000 ENFDS     IS2
225 0337 0037   0 010 000 001           LIO     100
226 0340        0 000 100 000           TG0
227 0341        0 100 100 000           TG2
228 0342        1 001 000 000           IS1
229 0343 0360   1 111 000 011           BRN     RETDC
230 0344        1 010 101 000 SSW3      MTC
231 0345        0 011 011 110           S,ZTC
232 0346        0 101 111 110           S,CM1C
```

MODEL FIVE ASSEMBLER - Continued

```
233 0347      0 010 101 000         CXM
234 0350      0 101 000 000  ENRDS  IS2
235 0351 0037 0 010 000 001         LIO      100
236 0352      0 000 100 000         TG0
237 0353      0 010 100 000         TG1
238 0354 0003 0 000 010 001         LIO      010
239 0355      1 010 100 000         TG5
240 0356      1 001 000 000         IS1
241 0357      1 110 101 110  RETDA  W,AXC
242 0360      1 010 101 000  RETDC  MTC
243 0361      0 101 111 110         S,CM1C
244 0362 0365 1 111 010 111         BRN      RETD1
245 0363      1 001 110 100  RQRT   RSD4
246 0364      0 000 110 000         RETURN
247 0365      0 101 111 110  RETD1  S,CM1C
248 0366 0371 1 111 100 111         BRN      RETD2
249 0367      1 011 110 100         RSD5
250 0370      0 000 110 000         RETURN
251 0371      0 101 111 110  RETD2  S,CM1C
252 0372 0374 1 111 110 011         BRN      RETD3
253 0373      1 101 110 100         RSD6
254 0374      0 000 110 000  RETD3  RETURN
255 0375      1 000 110 100  PW03   RGS0
256 0376      0 000 010 000         ROM 0
257 0377      0 000 000 000         NOP
258 END
```

I claim:

1. A telescope comprising:

a concave second surface mirror having a negative refractive lens element, said mirror aligned upon an optical axis; and a convergent meniscus lens having a concave surface thereof facing the concave surface of said mirror, said lens aligned upon the optical axis and comprising a doublet having a biconvex element, a biconcave element facing said mirror, and a spherical reflective convex surface interposed between the elements and facing said mirror.

2. A telescope as in claim 1 wherein the optical surfaces of said mirror and of said lens are spherical.

3. A telescope as in claim 2 wherein the elements of said lens have the same index of refraction.

4. A telescope as in claim 3 further comprising means for extracting an image from said telescope comprising an optical path in the center of said mirror.

* * * * *